(12) United States Patent
Pharr

(10) Patent No.: US 6,985,143 B2
(45) Date of Patent: Jan. 10, 2006

(54) SYSTEM AND METHOD RELATED TO DATA STRUCTURES IN THE CONTEXT OF A COMPUTER GRAPHICS SYSTEM

(75) Inventor: Matthew Pharr, San Francisco, CA (US)

(73) Assignee: NVIDIA Corporation, Santa Clara, CA (US)

(*) Notice: Subject to any disclaimer, the term of this patent is extended or adjusted under 35 U.S.C. 154(b) by 462 days.

(21) Appl. No.: 10/157,579

(22) Filed: May 28, 2002

(65) Prior Publication Data

US 2003/0193527 A1    Oct. 16, 2003

Related U.S. Application Data

(60) Provisional application No. 60/373,068, filed on Apr. 15, 2002.

(51) Int. Cl.
*G06T 15/00* (2006.01)

(52) U.S. Cl. .................. 345/421; 345/611; 345/613; 345/614

(58) Field of Classification Search ............... 345/419, 345/420, 421, 422, 423, 426, 611, 612, 613
See application file for complete search history.

(56) References Cited

U.S. PATENT DOCUMENTS 5,987,173 A    11/1999 Kohno et al.

FOREIGN PATENT DOCUMENTS

WO    PCT/US02/16798    5/2002

OTHER PUBLICATIONS

Carpenter, The A-buffer, an Antialiased Hidden Surface Method, 1984, ACM, pp. 103-108.*
Cormen, Thomas H. et al., *Introduction to Algorithms* (Cambridge, MA: The MIT Press; New York: McGraw-Hill Book Co., 1990), pp. 245-259.
de Berg, Mark et al., *Computational Geometry: Algorithms and Applications* (Berlin: Springer-Verlag, 1997), pp. 20-29, 96-99, 223-229.

* cited by examiner

*Primary Examiner*—Almis R. Jankus
(74) *Attorney, Agent, or Firm*—Townsend and Townsend and Crew LLP

(57) ABSTRACT

A system and method of maintaining computer graphics data sets in a line tree data structure. A data set is defined by a reference range with endpoint references r0 and r1 and is associated with a segment of a sampling line that analytically represents a part of an object. A data set contains data at the endpoint references r0 and r1 including values for depth, color, transparency, and depth range. Targeted data sets are defined as data sets containing certain reference values and are retrieved using a data set retrieval procedure. After retrieval, a targeted data set is compared to a new data set by a data set update procedure to determine whether the targeted data set remains, the new data set replaces the targeted data set, or modified data sets are required to be created and inserted into the line tree data structure.

23 Claims, 31 Drawing Sheets

Pixel 2030

Pixel 2040

| | r0 | r1 |
|---|---|---|
| t value | t0 = .5 | t1 = .7 |
| depth (z) | 2.3 | 3.8 |
| color | 1 | 4 |
| transparency | 0 | .8 |
| depth range | 2.3 to 3.8 inclusive | |

SYSTEM AND METHOD RELATED TO DATA STRUCTURES IN THE CONTEXT OF A COMPUTER GRAPHICS SYSTEM

The present application claims priority, under 35 U.S.C. 119(e), to U.S. Provisional Patent Application Ser. No. 60/373,068, filed Apr. 15, 2002, and U.S. patent application Ser. No. 09/865,990, filed May 25, 2001. Both of these applications are incorporated herein by reference.

This invention relates generally to the art of computer graphics, and more specifically to the field of maintaining computer graphics data in a line tree data structure.

BACKGROUND OF THE INVENTION

One form of computer graphics is to develop a sequence of video image frames of an object scene from object scene information. The sources of object scene information include data stored in computer databases and data output by computer programs. The object scene information includes visual characteristics of an object scene, such as color and movement. Typically, one or more programs comprising a renderer process object scene information.

More specifically, a video image frame includes a color value for each pixel of a display device. Pixels are the smallest resolution element of the display device. A color of a given pixel is determined by processing object scene information in the general area of the pixel.

Computer graphics systems typically develop each video image frame of computer animated video by point sampling the general location of a given pixel in an object scene. Essentially, a renderer processes object scene information to calculate a color value of an object scene at an infinitesimal point within the object scene. The renderer then averages color values of a set of point samples in the general area of a pixel to compute a color for the pixel.

Other computer graphics systems reconstruct a view of an object scene by area averaging. Unlike the point sampling described above, area averaging calculates an actual view of an object scene in the general area of a pixel. The systems then compute a color value for the pixel from the view. The process is substantially more time consuming than point sampling, however, because these systems calculate a view of an entire area (instead of a set of points within the area).

Line sampling can also be used to reconstruct a view of an object scene as described in detail below.

In implementing any of the above methods to reconstruct a view of an object scene, sampling data must be maintained and updated continuously to reflect the changes in the object scene. A conventional method for data maintenance is to proceed through a linked list of ordered data sets from the beginning of the list to the end of the list. Updating data sets using this method, however, can be inefficient. For example, under the conventional method, if a data set located toward the end of the linked list requires updating, each data set located prior to the data set must be examined before the data set can be updated.

The conventional method of data maintenance requires extended processing time and consumes valuable resources when updating data sets. In addition, conventional methods for data maintenance may consume memory resources unnecessarily if extraneous sampling data is retained.

Therefore, a method of maintaining sampling data where data sets can be efficiently stored, retrieved, and updated is needed. A data storage method is required that would not consume valuable processing resources or use memory resources unnecessarily by storing extraneous sampling data.

SUMMARY OF THE INVENTION

The present invention is a system and method of maintaining computer graphics data where data sets are stored, retrieved, and updated in a line tree data structure. The line tree data structure includes a root node and a plurality of subordinate nodes including a plurality of leaf nodes where each leaf node stores a single data set. A data set contains object parameter values for an associated segment of a sampling line that analytically represents a part of an object.

A data set is defined by a reference range with a starting endpoint reference $r0$ and an ending endpoint reference $r1$, the reference range corresponding to a parameterized t range spanned by the associated segment. The t range has a starting t value $t0$ corresponding to the starting endpoint reference $r0$ and an ending t value $t1$ corresponding to the ending endpoint reference $r1$. Preferably, each node of the line tree data structure stores the reference range spanned by all its child nodes.

The data set contains data at the starting endpoint reference $r0$ and the ending endpoint reference $r1$ including data set values for depth, color, and transparency that correspond to the object parameter values for depth, color, and transparency of the associated segment. The data set also contains a data set depth range that corresponds to an object depth range of the associated segment. The data set depth range spans from the data set value for depth at $r0$ to the data set value for depth at $r1$.

When a new data set is generated, targeted data sets are retrieved using a data set retrieval procedure and the line tree data structure is updated using a data set update procedure. Targeted data sets are any data sets stored in the line tree data structure containing a reference range overlapping a reference range of the new data set.

The data set retrieval procedure begins by setting the root node as an initial current node. The contents of each child node of a current node are then checked to determine if the child node contains a targeted data set. If the child node contains a targeted data set and the child node is a leaf node, the targeted data set is retrieved from the child node. If the child node contains a targeted data set but is not a leaf node, the child node is set as a current node. The process is repeated until all targeted data sets contained in the line tree data structure are located and retrieved.

After the data set retrieval procedure, the data set update procedure compares each targeted data set to the new data set and updates the line tree data structure based on the comparison. Preferably, the comparison is based on the data set depth range of a targeted data set and the data set depth range of the new data set. Based on the comparison, the targeted data set remains in the line tree data structure, the new data set replaces the targeted data set in the line tree data structure, or a modified data set or modified data sets are required to be created and inserted into the line tree data structure.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1A:
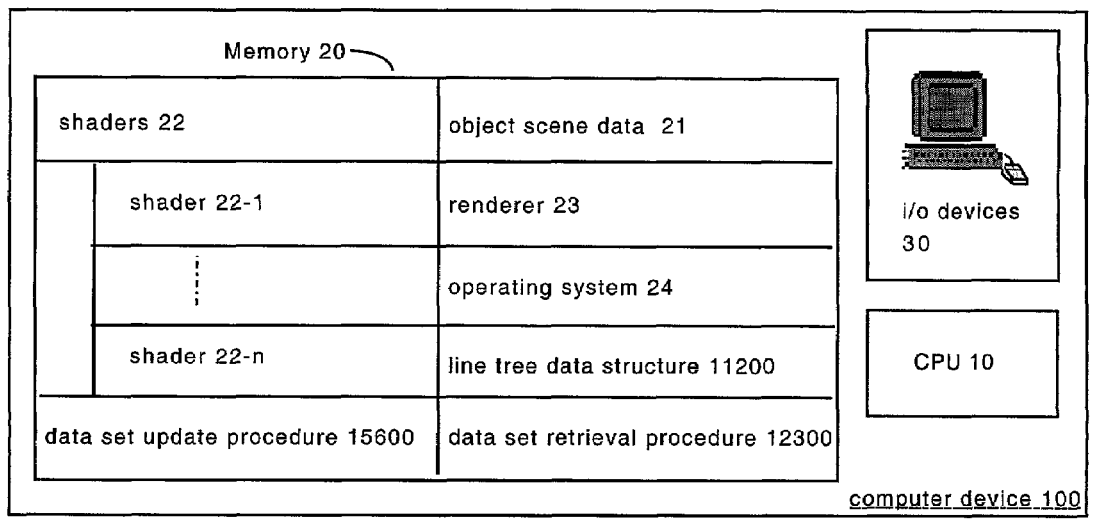
FIG. 1A is a block diagram of a computer system in accordance with an embodiment of the present invention.

FIG. 1A shows computer device 100. Computer device 100 is configured to execute the various embodiments of the present invention described below. Included in computer device 100 is central processing unit (CPU) 10, memory 20, and i/o devices 30. CPU 10 executes instructions as directed by operating system 24 and other programs maintained in memory 20 and sends control signals to various hardware components included in computer device 100.

Figure 1B:
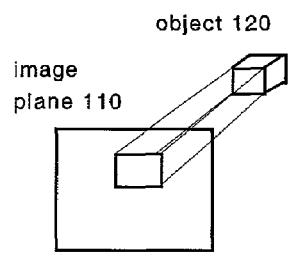
FIG. 1B illustrates the projection of an object onto an image plane in accordance with an embodiment of the present invention.

Memory 20 also includes object scene data 21. Object scene data 21 is static information that describes one or more object scenes. An object scene is one of many that, for example, comprise the scenes of computer animated video. For example, object scene data 21 may describe the actions and physical or visual attributes of characters (i.e., objects) in an object scene. In particular, object scene data 21 specifies locations of objects within an object scene through the use of x, y and z coordinates. The x and y coordinates represent the horizontal and vertical positions with respect to image plane 110 (of FIG. 1B). The z coordinate represents the distance of a point on an object from image plane 110. As illustrated in FIG. 1B, image plane 110 functions as a projection screen for object 120. Thus, image plane 110 facilitates a transformation of three-dimensional objects to a two-dimensional representation. Image plane 110 is analogous to a monitor or video display included in i/o devices 30. Positions on image plane 110 map to positions on a monitor or video display. Thus, references to pixels on image plane 110 are effectively references to pixels of a monitor or video display.

Object scene data 21 also includes, as noted above, information about the movement of an object during a period of time associated with an image frame. Typically, the time period associated with an image frame is proportional to the shutter speed of a camera. In other words, the amount of time for which a camera exposes a frame of film. Any movement that occurs during this time period results in a blurred video frame or picture. To capture object movement, object scene data 21 provides the position of an object at the beginning of the period of time associated with the image frame and its trajectory and velocity during the time period. This permits the calculation of the position of an object at any point during the period of time associated with the image frame.

Shaders 22 comprise one or more programs called shaders that also describe objects in an object scene. Shaders 22 are executable programs that typically provide information about the surfaces of objects in an object scene. For example, shaders 22 may be directed to calculate a color value of a location on the surface of an object in an object scene. The calculation of a color value preferably includes the consideration of an object's reflective and refractive qualities such as the extent of light diffusion upon reflection by the surface and the extent of light dispersion upon transmission through the surface.

Also included in memory 20 is renderer 23. Renderer 23 processes object scene data 21 in conjunction with shaders 22 to render computer animated video or still images as described below.

Memory 20 also includes data sets contained in a line tree data structure 11200 and data maintenance procedures including a data set retrieval procedure 12300 and a data set update procedure 15600.

Also included in memory 20, but not illustrated in FIG. 1A, is space for temporary storage of data produced and required by renderer 23 during the process of rendering computer animated video and still images. Object scene data 21 and shaders 22 describe an object scene that renderer 23 samples in order to reconstruct an image or computer animated video. Renderer 23 stores a result of the rendering process in memory 20 and/or outputs it to i/o devices 30.

Figure 1C:
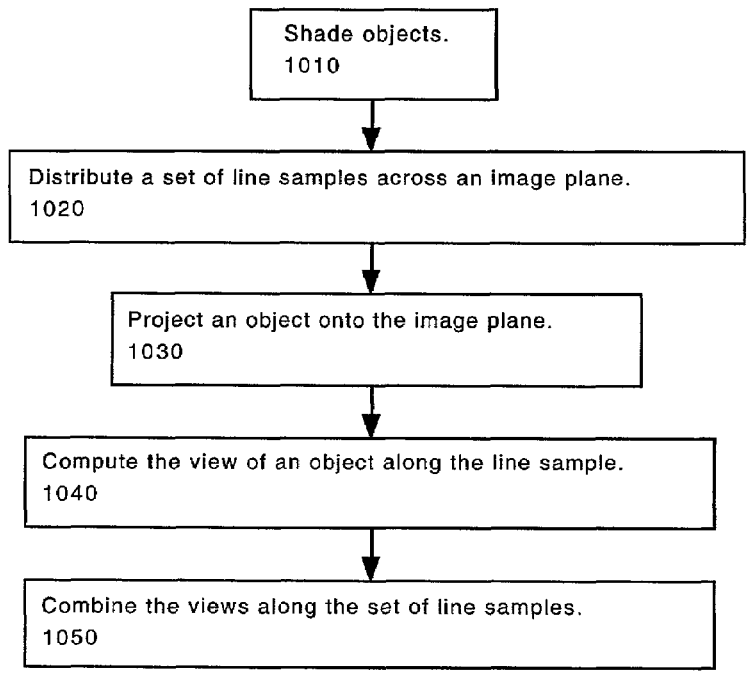
FIG. 1C illustrates processing steps for line sampling an object scene in accordance with an embodiment of the present invention.

In more detail, renderer 23 shades objects in an object scene (step 1010, FIG. 1C). Typically, this step includes processing object scene data 21 to determine which objects in an object scene are at least partially visible from image plane 110. To make this determination, renderer 23 queries object scene data 21 to ascertain the z-depth value of a given object. The z-depth value is the minimum distance of an object from image plane 110. Renderer 23 derives the z-depth value from the z coordinate discussed above.

Renderer 23 also maintains in memory 20 "z-far" values associated with various regions of image plane 110. A z-far value represents the furthest distance of a visible object from image plane 110. Initially, each z-far value is set to infinity. Accordingly, every object in an object scene has a z-depth value that is less than the initial z-far values. However, as objects in an object scene are processed (as described in more detail below) an entire region of image plane 110 is associated with an object. After this occurs, renderer 23 sets the z-far value associated with that region to a finite value. Examples of such regions include: a sub-pixel, a group of sub-pixels, a pixel, a group of pixels, and image plane 110 itself.

Once a z-far value associated with a given region is set to a finite value, renderer 23 compares the z-depth value of an object within this region before processing the object. If the z-depth value exceeds the z-far value, the object is not visible from image plane 110.

To improve the efficiency of the processing steps described below, renderer 23 may transform some objects to less complex representations. For example, renderer 23 transforms some objects to polygonal mesh representations. A polygonal mesh is a collection of edges, vertices, and polygons. Additionally, renderer 23 transforms some objects or object representations to patches of nonuniform rational B-Splines ("NURB"). A NURB is a curve that interpolates data. Thus, given a set of points, a curve is generated passing through all the points. A NURB patch is a polynomial representation. Thus, a NURB patch uses functions of a higher-degree than a polygonal mesh representation, which uses linear functions. The NURB patch representation is temporary, however, as it is diced to create grids of various pixel-sized shapes such as micropolygons.

After determining which objects are visible from image plane 110 and, if necessary, converting some of the objects to grids of micropolygons, renderer 23 computes one or more color values for various parts of an object. In the case of a grid of micropolygons, renderer 23 determines a color value for each micropolygon in the grid of micropolygons.

The process typically begins with renderer 23 directing shaders 22 to calculate a color value for an object at a given location. As noted above, shaders 22 describe surface properties of an object, which affect the color value of an object. In response, shaders 22 often request renderer 23 to trace a ray (e.g., ray of light) to determine what is visible along the ray. The result of the tracing step is a factor in the determination of a color value for an object. The surface of the object that renderer 23 is shading may have various color-related properties that are processed in conjunction with light source and shadow data and the objects reflected or refracted by the object being shaded to arrive at the color value.

An object scene typically includes light sources that cast light source rays directly or indirectly onto objects included in the object scene. Additionally, an object in an object scene often obstructs light source rays such that shadows are cast on other objects in the object scene. The presence of shadows, or lack thereof, affects the color value computed for an object. Accordingly, renderer 23 accounts for this effect by positioning points on a light source and tracing a light source ray from each point to an object being shaded. While tracing each light source ray, renderer 23 processes object scene data 21 to determine if the ray intersects another object. If so, a shadow is cast on the object being shaded. As indicated above, renderer 23 takes this into account when computing a color value for an object.

Another aspect of the shading process relates to refraction and reflection. Refraction is the turning or bending of a ray of light as it passes through an object. Reflection is the redirecting of light by an object. Because of the diffuse nature of most objects, objects tend to spread about or scatter light rays by reflection or refraction when the light source rays intersect the objects. To avoid processing all the possible directions of reflected or refracted light source rays, renderer 23 selects an angle of reflection or refraction. Once the angle is selected for the ray of refracted or reflected light, renderer 23 traces a ray of light from the object being shaded at the selected angle into the object scene. Renderer 23 determines which object(s) in the object scene are struck by the ray of light. Any such objects may then reflect or refract the traced ray of light. Thus, renderer 23 repeats this process of selecting an angle of reflection or refraction, and continues tracing. A color value assigned to the light source ray is affected by the object(s) that are struck by the light source ray.

Eventually, renderer 23 combines information from a variety of sources to compute a color value. Additionally, renderer 23 obtains a transparency value of the object from object scene data 21. To summarize step 1010, renderer 23 shades objects in an object scene that are at least partially visible from image plane 110. Memory 20 maintains information related to this step for subsequent processing.

In the next processing step, renderer 23 distributes a set of line samples across image plane 110 (step 1020). Renderer 23 uses a non-regular sequence of numbers when distributing line samples to eliminate or minimize "aliasing."

Figure 2A:
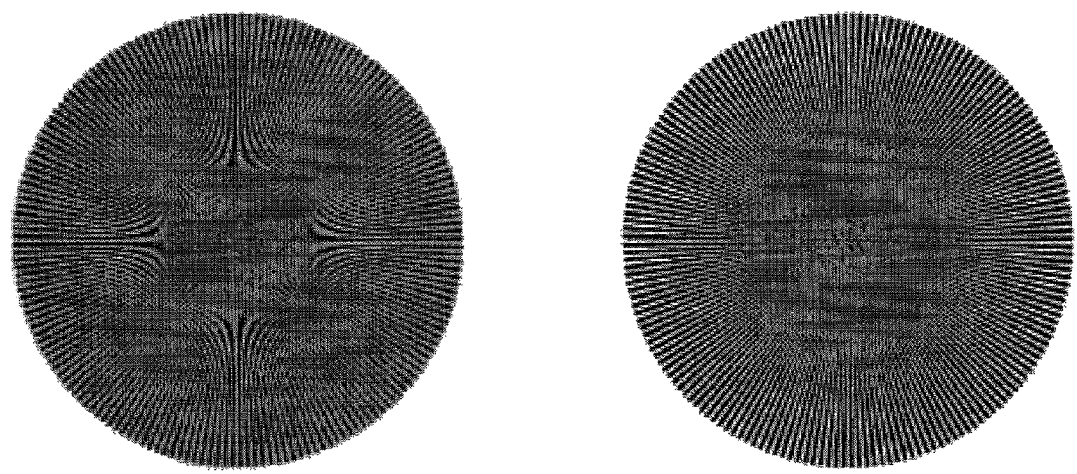
FIG. 2A illustrates sampling based on a non-regular sequence of numbers and sampling based on a regular sequence of numbers.

Aliasing often results when an object scene containing sharp changes is approximated with discrete samples. The failure to include an element of non-regularity (e.g., a non-regular sequence of numbers) into the sampling process aggravates the aliasing problem. More specifically, sampling based on a regular sequence of numbers results in low-frequency patterns that are not part of the sampled image and easily detectable by the human eye. Sampling based on a non-regular sequence of numbers results in high-frequency patterns that are not as easily detectable by the human eye. FIG. 2A illustrates sampling based on regular and non-regular sequences of numbers. The image on the left is a product of sampling based on a regular sequence of numbers and the image on the right is a product of sampling based on a random sequence of numbers. In the image on the right, the center portion of the image is fuzzy or gray, but the center portion of the image on the left includes swirling patterns. The swirling patterns are an example the low-frequency patterns mentioned above, and are a manifestation of aliasing. The fuzzy or gray portion of the image on the right are an example of the high-frequency patterns mentioned above, and are also a manifestation of aliasing. However, persons skilled in the art generally agree that for most applications, high-frequency patterns are much preferable to low-frequency patterns.

The non-regular sequence of numbers used to avoid or minimize low frequency patterns is preferably a pseudo-random sequence of numbers ("PRSN") or a low discrepancy sequence of numbers ("LDSN"). A PRSN matches that of a random sequence of numbers over a finite set of numbers. A LDSN avoids certain drawbacks of a PRSN. Mainly, a PRSN often includes a short sequence of clustered numbers (e.g., 1, 4, 4, 4, 2, etc.) that results in neighboring line samples having a similar position. A LDSN by definition is not random. Instead, a LDSN is a uniform distribution of numbers that is not regular, but that does not have the number-clustering associated with random sequences of numbers. In other words, a LDSN is more uniform than a PRSN.

Some embodiments of the present invention include a LDSN or PRSN in memory 20. In these embodiments, renderer 23 steps through a sequence of numbers maintained in memory 20 to obtain numbers for sampling information in object scene data 21. The sequence of numbers is thus ideally large enough to avoid short term repetitiveness. In other embodiments, renderer 23 directs CPU 10 and operating system 24 to compute a sequence of numbers as needed.

Another element of preferred embodiments of the present invention is subdividing a pixel to position one or more line samples within each sub-pixel. In this regard, confining one or more line samples to sub-pixels provides for a more uniform or stratified distribution of line samples (i.e., minimizes line sample clustering). A more uniform distribution of line samples minimizes the possibility of line samples missing objects or changes in an object.

Figure 2B:
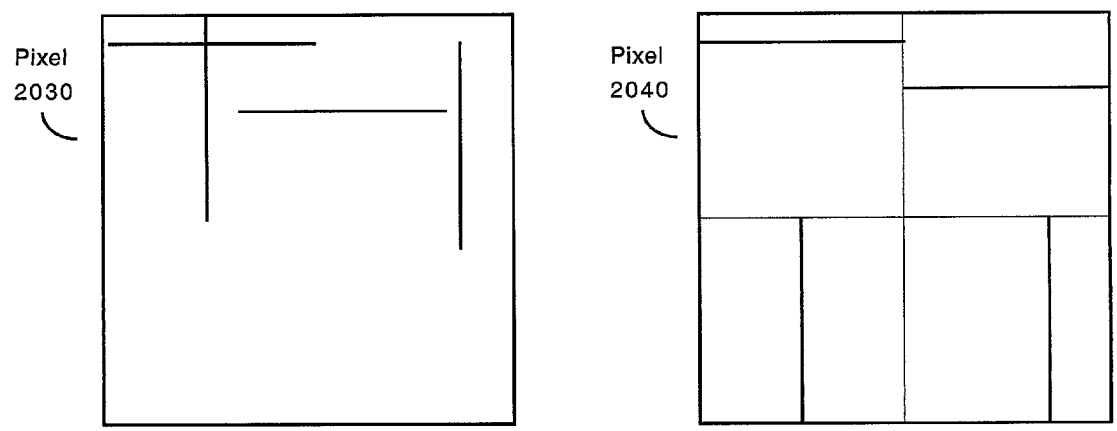
FIG. 2B illustrates a two distributions of line samples, wherein the distribution on the right uses sub-pixels to further ensure a stratified distribution.

Consider pixel 2030 of FIG. 2B. Because pixel 2030 lacks subdivisions, line samples can cluster within a region of pixel 2030. In this example, the line samples distributed within pixel 2030 miss all objects or changes in the object scene confined to the lower region of pixel 2030. In contrast, pixel 2040 includes four sub-pixels. Renderer 23 distributes a single line sample within each of these sub-pixels. Accordingly, the line samples are less likely to miss objects or changes in the object scene that are confined to the lower region of pixel 2030.

Figure 3A:
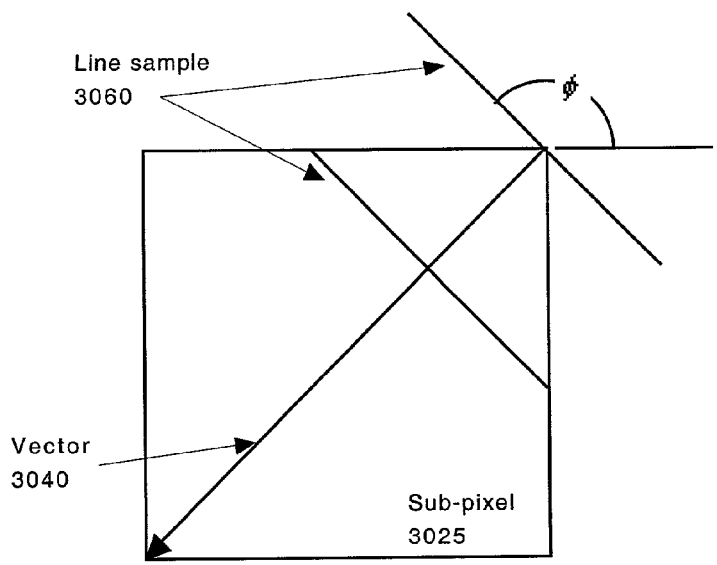
FIG. 3A illustrates an embodiment of the present invention in which an orientation and translation amount are selected in accordance with an embodiment of the present invention.

In another embodiment of the present invention, renderer 23 selects an orientation and translation amount by reference to a non-regular sequence of numbers to position a line sample. FIG. 3A illustrates line sample 3060 sampling sub-pixel 3025 in accordance with this embodiment of the present invention. Renderer 23 selects an orientation above a horizontal axis of sub-pixel 3025. In FIG. 3A, the selected orientation is 135-degrees and represented as φ. Initially, renderer 23 positions line sample 3060 at a translation origin of sub-pixel 3025 as illustrated by the lightly-shaded line sample 3060 in FIG. 3A. From this position, renderer 23 extends vector 3040 perpendicularly from line sample 3060. Renderer 23 then selects a translation amount. Renderer 23 translates line sample 3060 along vector 3040 by the selected translation amount to a position within sub-pixel 3025 as illustrated by the darkly-shaded line sample 3060 in FIG. 3A. In effect, renderer 23 selects a plane with the selected orientation through which line sample 3060 passes. Renderer 23 preferably maintains the 135-degree orientation of line sample 3060 as it translates line sample 3060 along vector 3040.

Figure 3B:
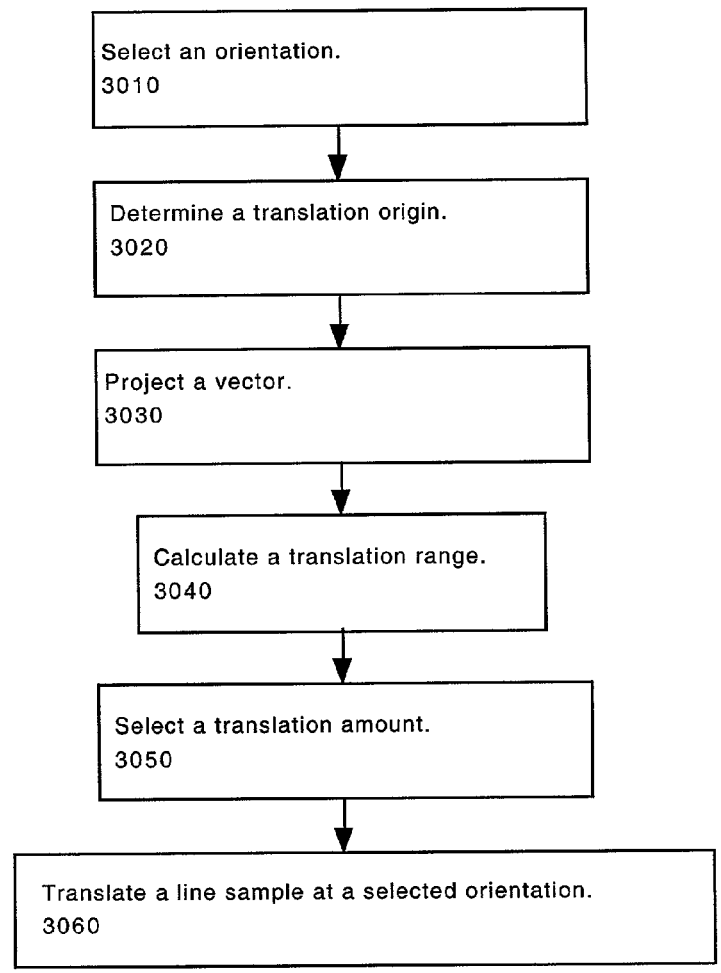
FIG. 3B illustrates processing steps in an embodiment of the present invention in which an orientation and translation amount are selected by reference to a non-regular sequence of numbers.

Attention now turns to a more detailed description of this embodiment of the invention. In a first processing step, renderer 23 selects an orientation by reference to a non-regular sequence of numbers (step 3010, FIG. 3B). Preferably, the sequence of numbers is a PRSN or LDSN. Typically, each number in the sequence of numbers is a fractional number between zero and one. Renderer 23 multiplies this number by a range of numbers suitable for the task at hand. In this embodiment, the range of acceptable orientations is 0 to 180-degrees. Accordingly, renderer 23 multiplies a number from the non-regular sequence of numbers by 180.

Figure 3C:
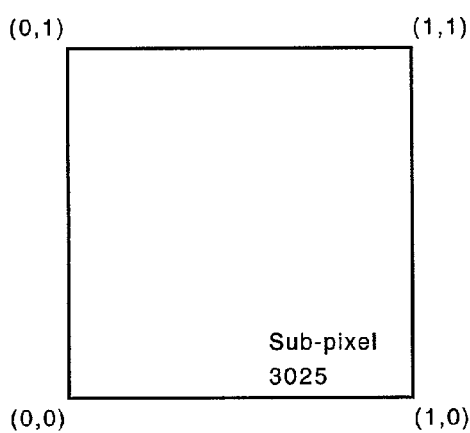
FIG. 3C illustrates a sub-pixel consistent with an embodiment of the present invention.

In a next step, renderer 23 determines a translation origin of the sub-pixel (step 3020). The orientation selected in step 3010 dictates the outcome of this step. FIG. 3C illustrates the four translation origins of sub-pixel 3025. Note that in this illustration, the dimensions of sub-pixel 3025 are set to one as an arbitrary unit of measure.

Figure 3D:
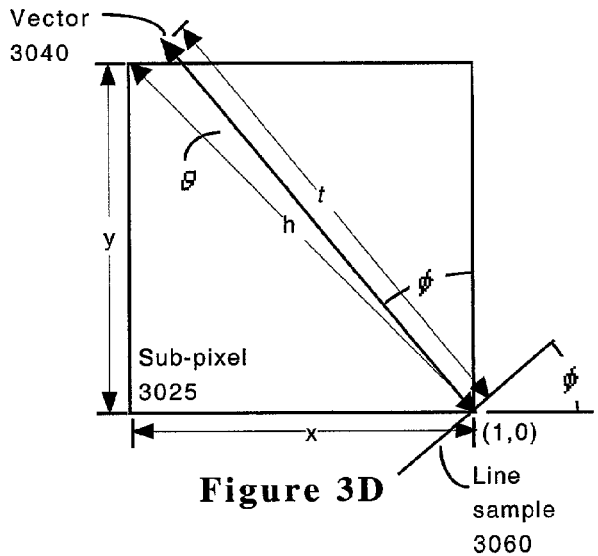
FIG. 3D illustrates an embodiment of the present invention in which an orientation and translation amount are selected in accordance with an embodiment of the present invention and a line sample is translated along a vector originating in the (1,0) translation origin.

For an orientation greater than or equal to 0-degrees but less than 45-degrees, renderer 23 selects translation origin (1,0). This means that renderer 23 translates a line sample 3060 having an orientation within this range from a position beginning at translation origin (1,0) as illustrated in FIG. 3D (φ is equal to 30-degrees). For an orientation greater than or equal to 45-degrees but less than 90-degrees, renderer 23 selects translation origin (0,1). For an orientation greater than or equal to 90-degrees but less than 135-degrees, renderer 23 selects translation origin (0,0). And for an orientation greater than or equal to 135-degrees but less than 180-degrees, renderer 23 selects translation origin (1,1). Table 1 summarizes these translation origin selection rules.

TABLE 1

| Orientation (φ) | Translation origin |
|---|---|
| 0 ≦ φ < 45 | (1, 0) |
| 45 ≦ φ < 90 | (0, 1) |
| 90 ≦ φ < 135 | (0, 0) |
| 135 ≦ φ < 180 | (1, 1) |

In a next step, renderer 23 projects vector 3040 into sub-pixel 3025 from translation origin (1,0) in a direction that is perpendicular to line sample 3060 (step 3030). Specifically, for the example illustrated in FIG. 3D, vector 3040 has an orientation of 120-degrees above the horizontal axis of sub-pixel 3025.

Renderer 23 then calculates a translation range for line sample 3060 (step 3040). The size of the sub-pixel and the selected orientation dictate the translation range. Specifically, the translation range assures that at least a portion of line sample 3060 crosses sub-pixel 3025 after renderer 23 translates line sample 3060.

In FIG. 3D, t represents the translation range of line sample 3060. Because vector 3040 is perpendicular to line sample 3060, the angle between the vertical axis of sub-pixel 3025 that passes through translation origin (1,0) and vector 3040 is equal to φ as well. Additionally, the angle between hypotenuse h and the vertical axis of sub-pixel 3025 that passes through translation origin (1,0) is 45-degrees. Thus θ is equal to 45-degrees minus φ as indicated in FIG. 3D.

Renderer 23 therefore calculates translation range t with the following equation:

$$t = h \times \cos(\theta) \tag{1}$$

where $h = \overline{\sqrt{x^2 + y^2}}$, x = the width of sub-pixel 3025, y = the height of sub-pixel 3025, and

θ = 45° − φ

Thus, $$t = \overline{x^2+y^2} \times \cos(\theta) \quad (2)$$

where θ=45°−φ

Once translation range t is determined, renderer 23 multiplies translation range t by a number from a non-regular sequence of numbers (step 3050). As noted above, each number from the non-regular sequence of numbers is between zero and one, so the actual translation amount is a fraction of translation range t.

Renderer 23 then translates line sample 3060 along vector 3040 by an amount determined in step 3050 (step 3060). Preferably, renderer 23 does not alter the orientation of line sample 3060 during the translation process. Additionally, renderer 23 preferably extends line sample 3060 to the borders of sub-pixel 3025 as illustrated in FIG. 3D.

Figure 3E:
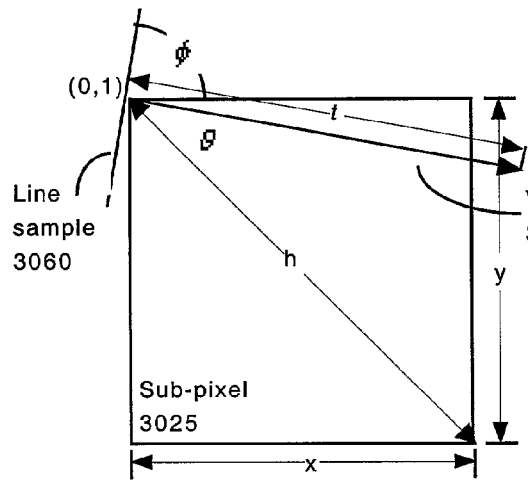
FIG. 3E illustrates an embodiment of the present invention in which an orientation and translation amount are selected in accordance with an embodiment of the present invention and a line sample is translated along a vector originating in the (0,1) translation origin.

The process of determining translation range t is essentially the same for the other three origins. The only distinction worth noting is that θ is different for each translation origin. For example, FIG. 3E shows line sample 3060 with an orientation of 60-degrees above a horizontal axis of sub-pixel 3025. Consistent with Table 1, line sample 3060 initially passes through the (0,1) translation origin. Consistent with the illustration of angles in FIG. 3E, the equation for determining the translation range t is as follows:

$$t = \overline{x^2+y^2} \times \cos(\theta) \quad (3)$$

where θ=φ−45°

Figure 3F:
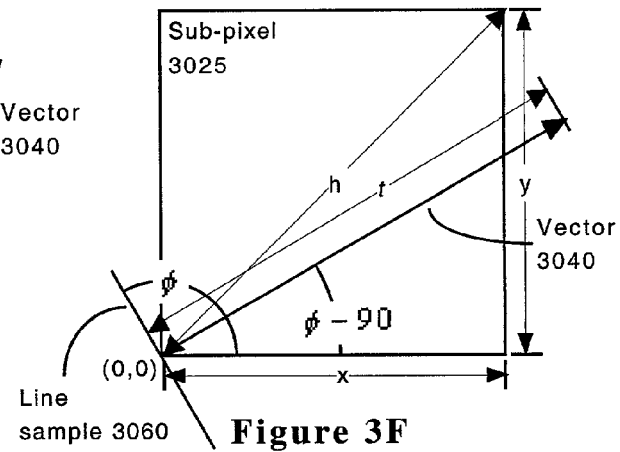
FIG. 3F illustrates an embodiment of the present invention in which an orientation and translation amount are selected in accordance with an embodiment of the present invention and a line sample is translated along a vector originating in the (0,0) translation origin.

Similarly, FIG. 3F shows line sample 3060 with an orientation of 110-degrees. Consistent with Table 1, line sample 3060 initially passes through the (0,0) translation origin. Consistent with the illustration of angles in FIG. 3F, the equation for determining the translation range t is as follows:

$$t = \overline{x^2+y^2} \times \cos(\theta) \quad (4)$$

where θ=135°−φ

Figure 3G:
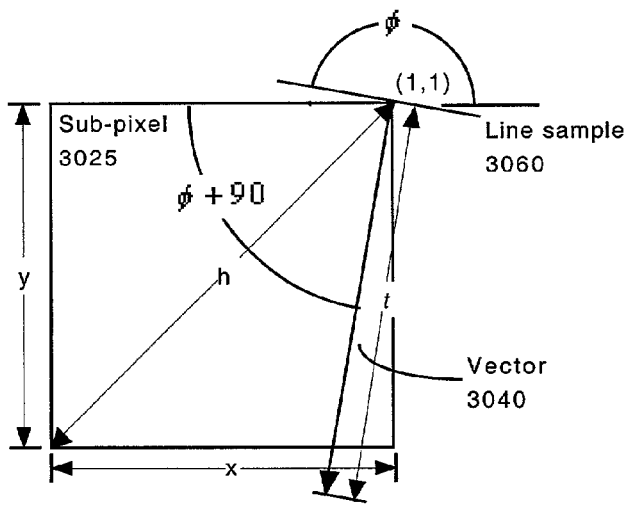
FIG. 3G illustrates an embodiment of the present invention in which an orientation and translation amount are selected in accordance with an embodiment of the present invention and a line sample is translated along a vector originating in the (1,1) translation origin.

Finally, FIG. 3G shows line sample 3060 with an orientation of 110-degrees. Consistent with Table 1, line sample 3060 initially passes through the (1,1) translation origin. FIG. 3G also shows line sample 3060 translated a translation range t. Consistent with the illustration of angles in FIG. 3G, the equation for determining the translation range t is as follows:

$$t = \overline{x^2+y^2} \times \cos(\theta) \quad (5)$$

where θ=φ−135°

In another embodiment, renderer 23 selects an orientation and an area by reference to a non-regular sequence of numbers. Renderer 23 selects an orientation above a horizontal axis of sub-pixel 3025. Renderer 23 then selects an area formed by a line sample translated along a vector perpendicular to the line sample. Additionally, renderer 23 calculates a translation amount based on the selected area. Renderer 23 then translates line sample 3060 along vector 3040 by the calculated amount to a position within sub-pixel 3025. Renderer 23 preferably maintains the 135-degree orientation of line sample 3060 as it translates line sample 3060 along vector 3040.

Attention now turns to a more detailed description of this embodiment. In a first processing step, renderer 23 selects an orientation by reference to a non-regular sequence of numbers (step 4010, FIG. 4). Preferably, the sequence of numbers is a PRSN or a LDSN. Typically, each number in the sequence of numbers is a fractional number between zero and one. Renderer 23 multiplies this number by a range of numbers suitable for the task at hand. In this embodiment, the range of acceptable orientations is 0 to 180-degrees. Accordingly, renderer 23 selects an orientation by multiplying a number from the non-regular sequence of numbers by 180.

Figure 4A:
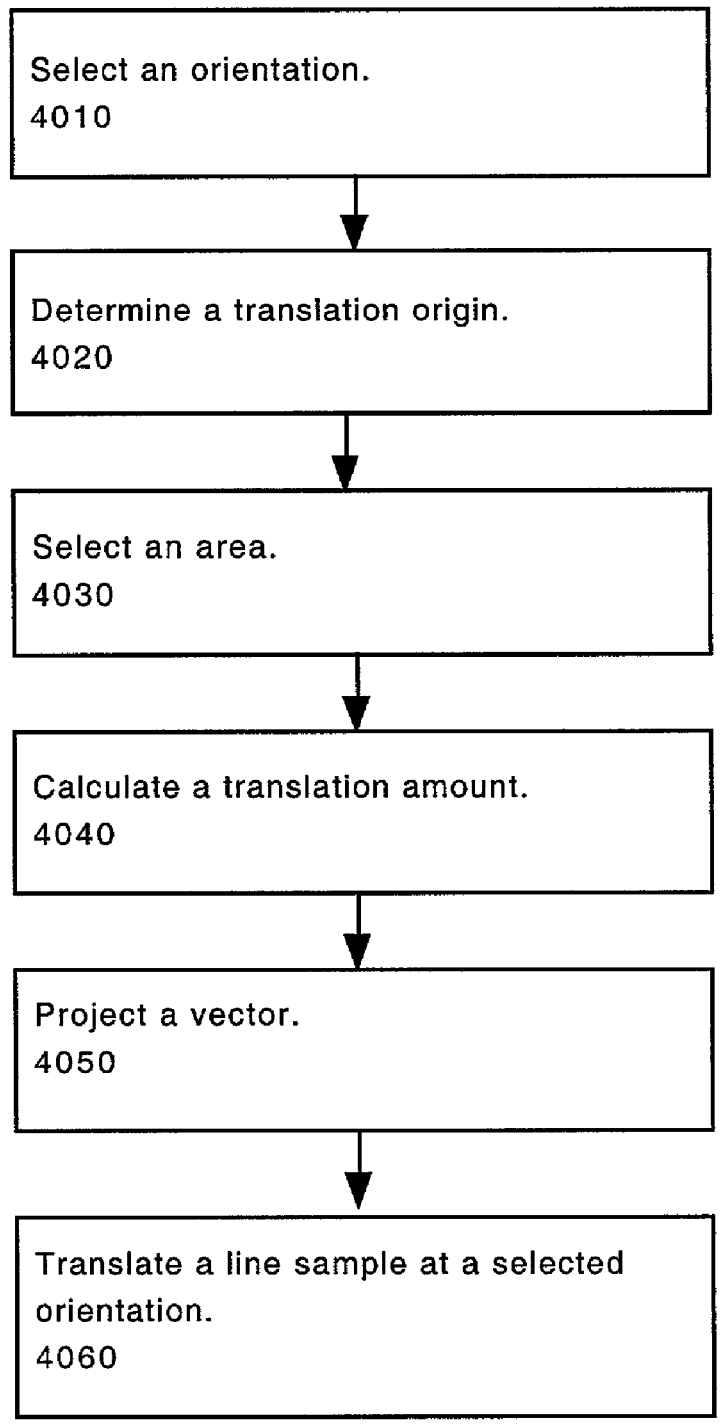
FIG. 4A illustrates processing steps in an embodiment of the present invention in which an orientation and an area are selected by reference to a non-regular sequence of numbers.
Figure 4B:
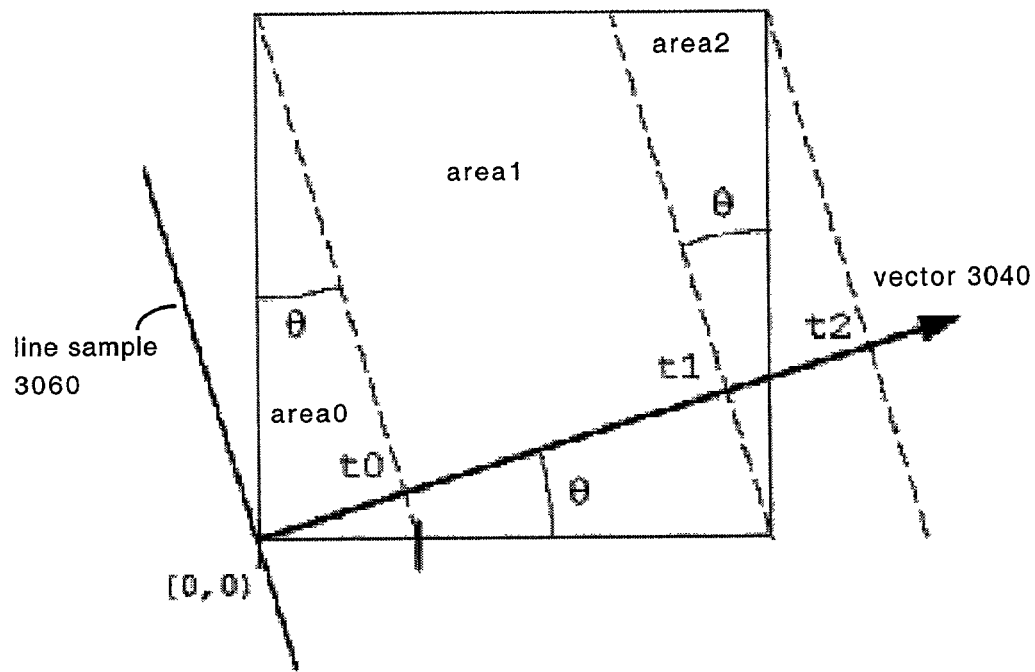
FIG. 4B illustrates a general case for a line sample orientation and area selection, including analytic regions used to derive a translation amount from a selected area, where the selected orientation is in a range of 90 and 135-degrees in a preferred embodiment of the invention.
Figure 4C:
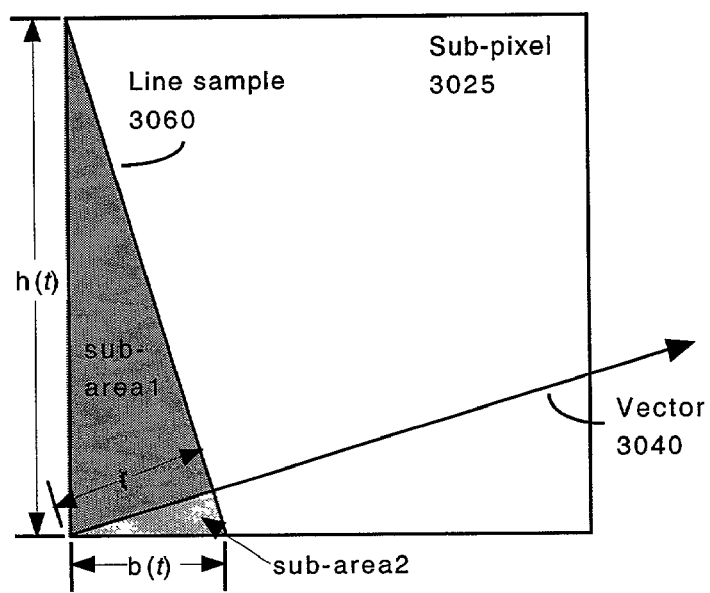
FIG. 4C illustrates regions of an area formed by a line sample and a sub-pixel that facilitate the derivation of an area-to-translation amount transformation in a preferred embodiment of the invention.
Figure 4D:
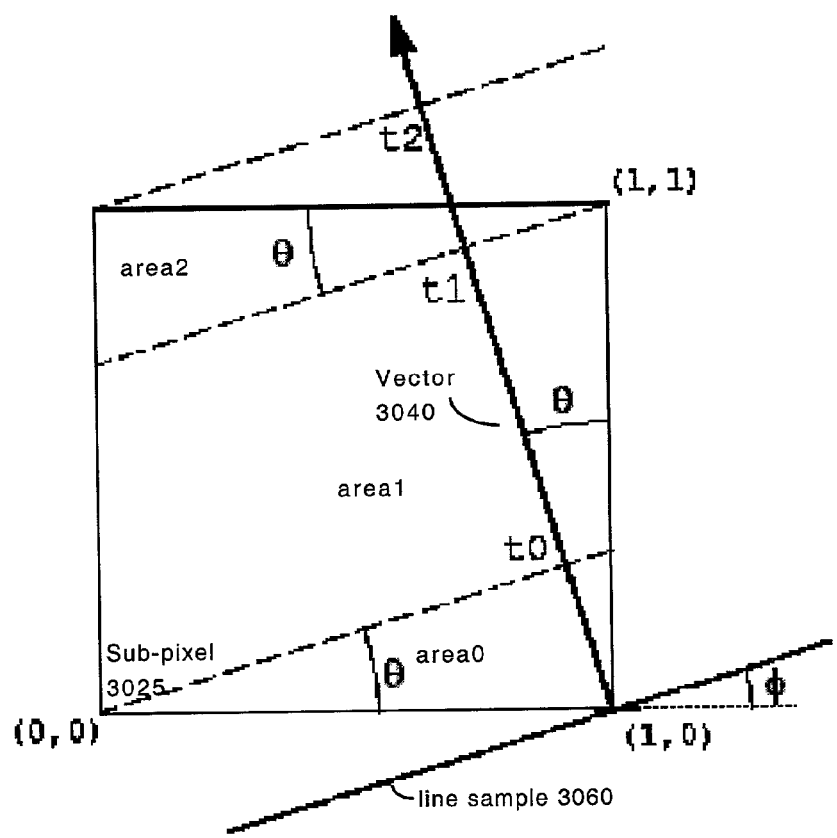
FIG. 4D illustrates a general case for a line sample orientation and area selection, including analytic regions used to derive a translation amount from a selected area, where the selected orientation is in a range of 0 and 45-degrees in a preferred embodiment of the invention.

In a next step, renderer 23 selects a translation origin of the sub-pixel (step 4020). The orientation selected in step 4010 determines the outcome of this step. For an orientation greater than or equal to 0-degrees and less than 45-degrees, renderer 23 selects translation origin (1,0). This means that renderer 23 translates line sample 3060 having an orientation within this range from a position beginning at translation origin (1,0) as illustrated in FIG. 4D. For an orientation greater than or equal to 45-degrees and less than 90-degrees, renderer 23 selects translation origin (0,1). For an orientation greater than or equal to 90-degrees and less than 135-degrees, renderer 23 selects translation origin (0,0). And for an orientation greater than or equal to 135-degrees and less than 180-degrees, renderer 23 selects translation origin (1,1). Thus, this embodiment of the invention adheres to the translation origin selection rules listed in Table 1.

Renderer 23 then selects an area by reference to a non-regular sequence of numbers (step 4030). Preferably, the sequence of numbers is a PRSN or a LDSN. Typically, each number in the sequence of numbers is a fractional number between zero and one. Renderer 23 multiplies this number by a range of numbers suitable for the task at hand. In this example, the area of a sub-pixel is one square unit. Accordingly, renderer 23 selects an area in this example by multiplying a number from the non-regular sequence of numbers by 1.

From the area selected in step 4030, renderer 23 calculates a translation amount (step 4040). To facilitate the calculation of a translation amount, renderer 23 subdivides sub-pixel 3025 to form the regions area 0, area 1, and area 3, which are illustrated in FIG. 4B. In particular, FIG. 4B illustrates a general case for an orientation between 90 and 135-degrees above a horizontal axis of sub-pixel 3025. If 0<t≦t0, line sample 3060 and sub-pixel 3025 form triangle area 0. If t0<t≦t1, line sample 3060 and sub-pixel 3025 form parallelogram area 1. And if t1<t≦t2, line sample 3060 and sub-pixel 3025 form triangle area 2, which is equal in size to area 0. The area of area 0, area 1, and area 2, which FIG. 4B illustrates, is a function of t—the amount by which renderer 23 translates line sample 3060 along vector 3040. A function, area(t), that calculates the total area formed by line sample 3060 and sub-pixel 3025 is, therefore, the sum of three functions: area 0(t), area 1(t), and area 2(t).

To develop function area(t), first consider area 0(t) for 0<t≦t0, wherein the intersection of line sample 3060 and sub-pixel 3025 form area 0 as illustrated in FIG. 4B. The triangle is itself formed by two right triangles as illustrated by sub-area1 and sub-area 2, the shaded regions of area 0 in FIG. 4C. A portion of sub-pixel 3025, a portion of line sample 3060, and a portion of vector 3040 form sub-area 1. The portion of vector 3040 that forms sub-area 1 is equal in length to t. Further, the slope s of h(t) relative to line sample 3060 is equal to the rise over the run of h(t), i.e., t divided by the length of that portion of line sample 3060 that forms sub-area 1. Using substitution, this portion of line sample 3060 is therefore equal in length to $$\frac{t}{s}.$$

Plugging this information into the Pythagorean Theorem solves for the length of h(t):

$$h(t)^2 = t^2 + \frac{t^2}{s^2} \Rightarrow h(t) = t\sqrt{1 + \frac{1}{s^2}} \tag{6}$$

where $s = \cot(\theta)$

A portion of sub-pixel 3025, a portion of line sample 3060, and a portion of vector 3040 also form sub-area 2. And as illustrated in FIG. 4C, the portion of vector 3040 that forms sub-area 2 is also equal in length to t. Similarly, the slope s of b(t) is equal to the rise over the run of b(t), i.e., the length of the portion of line sample 3060 that forms sub-area 2 divided by t. Using substitution, this portion of line sample 3060 is therefore equal in length to t×s. Plugging this information into the Pythagorean Theorem solves for the length of b(t):

$$b(t)^2 = t^2 + t^2 s^2 \Rightarrow b(t) = t\sqrt{1 + s^2} \tag{7}$$

where $s = \cot(\theta)$

Recall that line sample 3060, b(t), and h(t) form area 0(t). Plugging equations (6) and (7) into an equation solving for the area of a right triangle produces function area 0(t):

$$area0(t) = \frac{b(t)h(t)}{2} = \frac{1}{2}t^2\sqrt{2 + s^2 + \frac{1}{s^2}} = \frac{1}{2}t^2\left(s + \frac{1}{s}\right) \tag{8}$$

As illustrated in FIG. 4C, h(t) is equal to the height of sub-pixel 3025 when t is equal to t0 since line sample 3060 passes through translation origin (0,1) at that t. Thus, the following equation solves for t at t0:

$$h(t) = t\sqrt{1 + \frac{1}{s^2}} \Rightarrow t = \frac{s}{\sqrt{1 + s^2}} \tag{9}$$

where $t = t0$

Further, plugging equation (9) into equation (8) solves area 0(t) at t0 as follows:

$$area0(t) = \frac{1}{2}\frac{s^2\left(s + \frac{1}{s}\right)}{(1 + s^2)} = \frac{1}{2}\frac{s^2\left(s + \frac{1}{s}\right)}{s\left(s + \frac{1}{s}\right)} = \frac{s}{2} \tag{10}$$

where $t = t0$

Additionally, b(t) is equal to the width of sub-pixel 3025 when t is equal to t1 since line sample 3060 passes through translation origin (1,0) at that t, as illustrated in FIG. 4C. Thus, the following equation solves t at t1:

$$b(t) = t\sqrt{1 + s^2} \Rightarrow t = \frac{1}{\sqrt{1 + s^2}} \tag{11}$$

where $t = t1$

And because of the similarity between area 0 and area 2:

$$t2 - t1 = t0 \Rightarrow t2 = t0 + t1 = \frac{s + 1}{\sqrt{1 + s^2}} \tag{12}$$

Thus, $$\text{area } 2(t) = \text{area } 0 - \text{area } 0(t2 - t) \tag{13}$$

where t > t1

Using equation (8), equation (13) is rewritten as follows:

$$area2(t) = area0 - \frac{1}{2}(t2 - t)^2\left(s + \frac{1}{s}\right) \tag{14}$$

where $t > t1$

Further, the area 1(t) is swept out linearly as t increases from t0 to t1. Area1(t) is therefore solved as follows:

$$area1(t) = \frac{t - t0}{t1 - t0}(1 - 2area0) \tag{15}$$

where $t > t0$ $\frac{t - t0}{t1 - t0}$ is the percentage of area 1 swept out by line sample 3060, and (1−2area 0) is the area of area 1 in terms of area 0.
Using equation (10), equation (15) is rewritten as follows:

$$area1(t) = \frac{t - t0}{t1 - t0}(1 - s) \tag{16}$$

where $t > t0$ $\frac{t - t0}{t1 - t0}$ is the percentage of area 1 swept out by line sample 3060, and (1−s) is the area of area 1 in terms of s.
Thus function area(t) is written as follows:

$$area(t) = \begin{cases} \frac{1}{2}t^2\left(s + \frac{1}{s}\right), & 0 \le t < t0 \\ \frac{s}{2} + \frac{t - t0}{t1 - t0}(1 - s), & t0 \le t \le t1 \\ 1 - \frac{1}{2}(t2 - t)^2\left(s + \frac{1}{s}\right), & t1 < t \le t2 \end{cases} \tag{17}$$

Inverting area(t) gives:

$$t(A) = \begin{cases} \dfrac{\sqrt{2sA}}{\sqrt{1+s^2}}, & 0 \le A < \dfrac{s}{2} \\[2mm] \dfrac{\left(A + \dfrac{s}{2}\right)}{\sqrt{1+s^2}}, & \dfrac{s}{2} \le A \le 1 - \dfrac{s}{2} \\[2mm] \dfrac{s+1-\sqrt{2s(1-A)}}{\sqrt{1+s^2}}, & 1 - \dfrac{s}{2} < A < 1 \end{cases} \quad (18)$$

where

A is an area selected in step 4030,
φ is the orientation selected in step 4010, and
s=cot(θ)
θ=φ−90°

Thus, renderer 23 plugs the area selected in step 4030 into equation 18 to calculate a translation amount. Other techniques for deriving a translation amount are of course possible and within the scope of the present invention.

Having found t(A) (i.e., equation 18) for orientations between 90 and 135-degrees above a horizontal axis of sub-pixel 3025, renderer 23 exploits symmetries to solve for orientations between 0 and 45-degrees, 45 and 90-degrees, and 135 and 180-degrees. Renderer 23 can thus use t(A) to compute translation range t for line sample 3060 regardless of its orientation. Renderer 23 need only change the initial translation point for line sample 3060 and θ.

Consider line sample 3060 with an orientation, φ, between 0 and 45-degrees above a horizontal axis of sub-pixel 3025, as illustrated in FIG. 4D. In effect, FIG. 4B is rotated counter-clockwise by 90-degrees. Note, however, that θ now equals φ. Otherwise, t(A) is the same for this range of orientations.

Figure 4E:
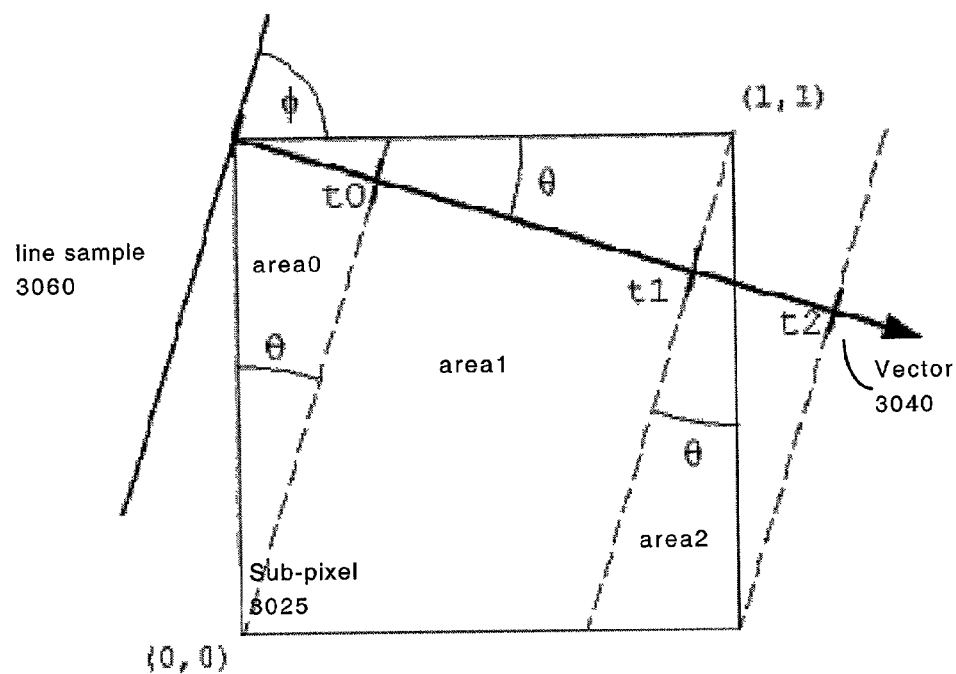
FIG. 4E illustrates a general case for a line sample orientation and area selection, including analytic regions used to derive a translation amount from a selected area, where the selected orientation is in a range of 45 and 90-degrees in a preferred embodiment of the invention.

Similarly, renderer 23 may translate line sample 3060 with an orientation between 45 and 90-degrees from (0,1) by t(A) as illustrated in FIG. 4E—effectively flipping FIG. 4B about the horizontal axis. In this case, θ equals 90°−φ. Otherwise, t(A) is the same for this range of orientations as well.

Figure 4F:
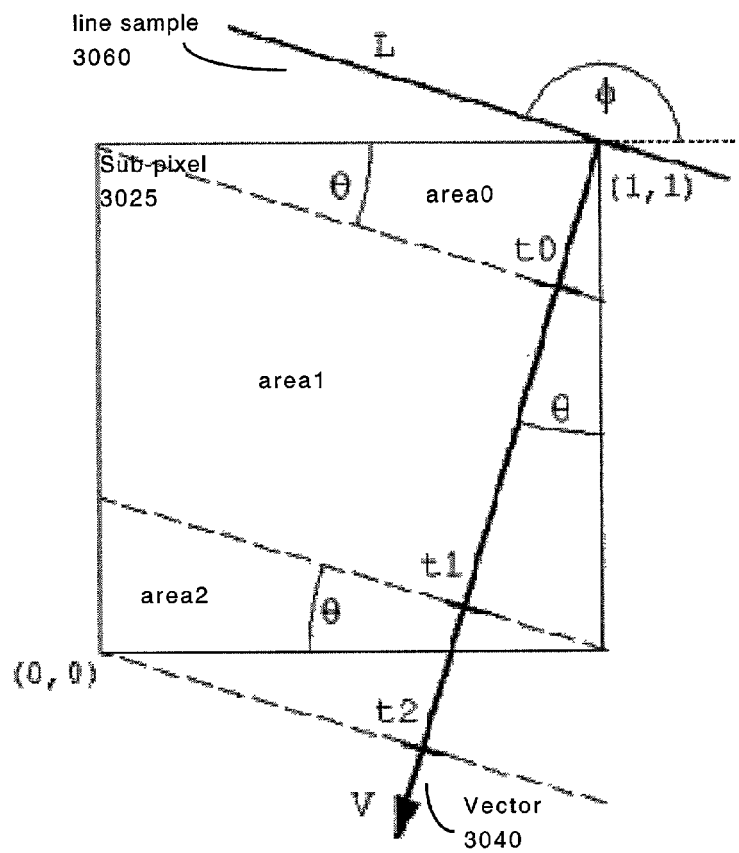
FIG. 4F illustrates a general case for a line sample orientation and area selection, including analytic regions used to derive a translation amount from a selected area, where the selected orientation is in a range of 135 and 180-degrees in a preferred embodiment of the invention.

Further, renderer 23 may translate line sample 3060 with an orientation between 135 and 180-degrees from (1,1) as illustrated in FIG. 4F—effectively flipping and rotating FIG. 4B. In this case, θ equals 180°−φ. Otherwise, t(A) is the same for this range of orientations as well. Table 1 is therefore extended to produce Table 2 as follows:

TABLE 2

| Orientation (φ) | θ | Translation Origin |
|---|---|---|
| 0° ≤ φ < 45° | φ | (1, 0) |
| 45° ≤ φ < 90° | 90 − φ | (0, 1) |
| 90° ≤ φ < 135° | φ + 90 | (0, 0) |
| 135° ≤ φ < 180° | 180 − φ | (1, 1) |

In a next step, renderer 23 projects vector 3040 into sub-pixel 3025 from translation origin (1,0) in a direction perpendicular to line sample 3060 (step 4050).

Renderer 23 then translates line sample 3060 along vector 3040 by an amount determined in step 4040 (step 4060). Preferably, renderer 23 does not alter the orientation of line sample 3060 during the translation process. Additionally, renderer 23 preferably extends line sample 3060 to the borders of sub-pixel 3025.

Figure 4G:
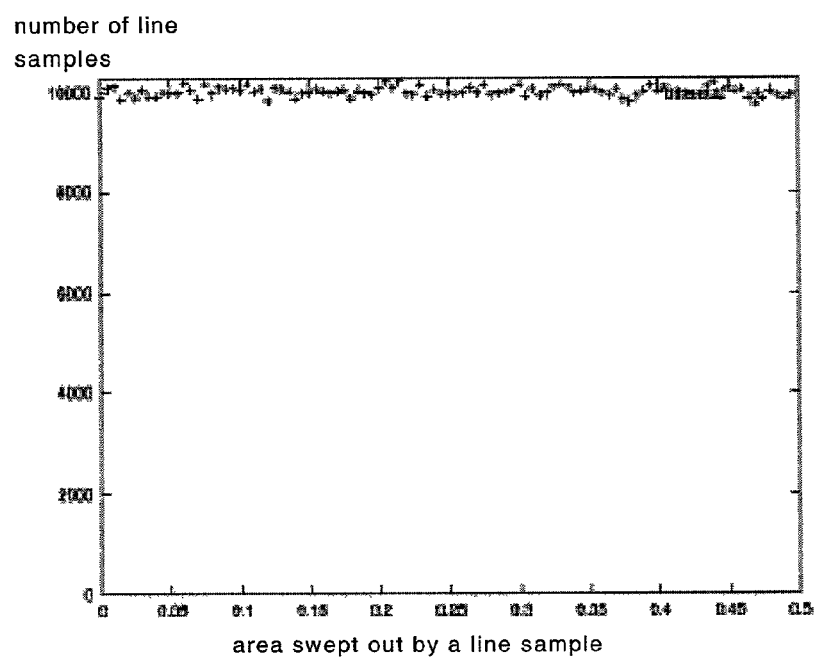
FIG. 4G illustrates pixel area sampling rates resulting from an embodiment of the present invention.

Using the above derived equations, renderer 23 uniformly samples the area of sub-pixel 3025. FIG. 4G illustrates the effectiveness of the above derived equations. 1,000,000 line samples were positioned by a randomly selected orientation and area using the above-described techniques. FIG. 4G evidences the uniformity with which renderer 23 samples the area of sub-pixels in this embodiment of the invention. Specifically, in this embodiment of the present invention, the number of line samples with a given area is consistent across a range of areas.

In still another embodiment of the invention, renderer 23 employs a type of stratified sampling to ensure uniform sampling. Renderer 23 subdivides a two-dimensional domain of orientation and translation to produce a number of sub-domains reflecting the number of sub-pixels in each pixel. Each sub-domain represents an orientation range and a translation range defined by the size of the sub-domain relative to the two-dimensional domain of orientation and translation and the position of sub-domain within the two-dimensional domain of orientation and translation. Thus, each sub-domain has a unique set of possible orientation and translation pairs.

From each sub-domain, renderer 23 selects an orientation and translation pair. And because each orientation and translation pair is selected from a separate sub-domain, renderer 23 does not select a set of clustered orientation and translation pairs. This step ultimately results in line samples with a more uniform distribution of orientations and translation amounts. Renderer 23 then assigns the orientation and translation pair to a sub-pixel by reference to a non-regular sequence of numbers (e.g., PRSN, LDSN). The use of a non-regular sequence of numbers prevents the assignment of an orientation and translation pair with a limited range to the same sub-pixel repeatedly. Renderer 23 then positions line samples by reference to the orientation and translation pair.

Figure 5A:
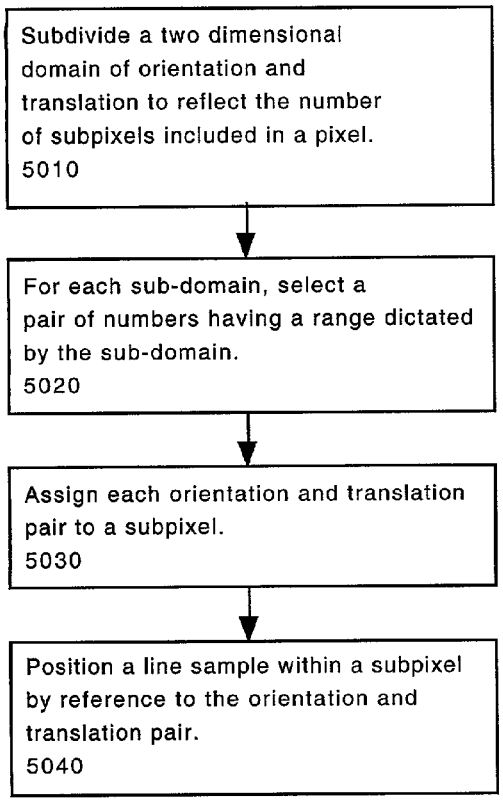
FIG. 5A illustrates processing steps that ensure a stratified distribution of line samples in a preferred embodiment of the invention.
Figure 5B:
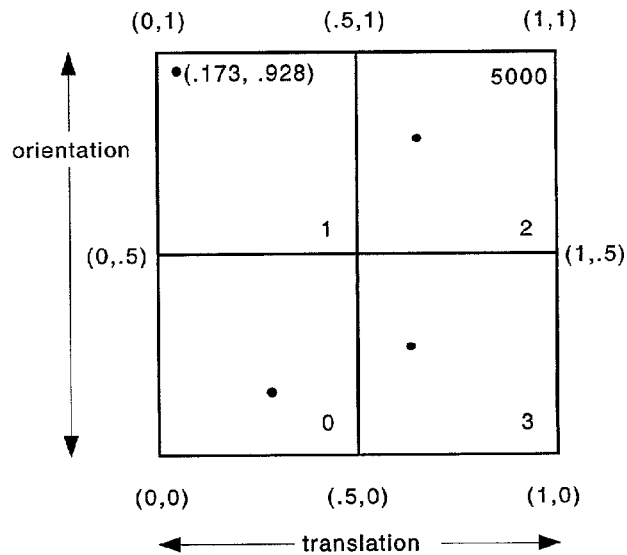
FIG. 5B illustrates the selection of orientation and translation pairs wherein each orientation and translation pair is limited to a two-dimensional area such that a uniform distribution is achieved.

Attention now turns to a more detailed description of this embodiment. In a first processing step, renderer 23 subdivides a two-dimensional domain of orientation and translation to produce a number of sub-domains (step 5010, FIG. 5A). The two-dimensional domain of orientation and translation preferably includes a number of sub-domains that is equal to the number of sub-pixels or included in each pixel. Each of the sub-domains eventually produces a position for a line sample in each sub-pixel. FIG. 5B illustrates an example of a two-dimensional domain of orientation and translation 5000 in accordance with this embodiment of the invention. Note that the axes of the two-dimensional domain of orientation and translation 5000 range from zero to one. Thus, in the particular example, the selected orientation and translation range is actually a percentage amount. As described below, renderer 23 eventually multiplies the orientation and translation pairs against maximum orientation and translation amounts.

In the next processing step, renderer 23 selects an orientation and translation pair having a range dictated by the size and positioning of a sub-domain (step 5020). In the two-dimensional domain of orientation and translation 5000 of FIG. 5B, each sub-domain has a specified size. For example, sub-domain 1 has a range of 0.5 to 1.0 along the orientation axis and a range of 0.0 to 0.5 along the translation. Accordingly, an orientation and translation pair selected from sub-domain 1 will be limited to a range of 0.5 to 1.0 or 0.0 to 0.5. For either range, the difference between the upper and lower range is 0.5. Accordingly, renderer 23 selects the pair of numbers by multiplying this difference by a number from a non-regular sequence of numbers. The result of this step is added to the lower range along the translation and the orientation axises.

The following steps illustrate the procedure for selecting an orientation and translation pair for sub-domain 1 in accordance with a preferred embodiment of the present invention:

Translation Axis:

0.5*0.345=0.173

0.0+0.173=0.173 where 0.5 is the orientation range of the sub-domain
where 0.345 is a number from a non-regular sequence of numbers
where 0.173 is the x coordinate Orientation Axis:

0.5*0.856=0.428

0.428+0.5=0.928 where 0.5 is the orientation range of the sub-domain
where 0.856 is a number from a non-regular sequence of numbers
where 0.928 is the y coordinate Renderer 23 preferably repeats step 5020 for each sub-domain in the two-dimensional domain of orientation and translation as illustrated in FIG. 5B. In FIG. 5B, the points are positioned according to an orientation and translation pair.

In a next processing step, renderer 23 assigns the orientation and translation pairs selected in step 5020 to a sub-domain (step 5030). As noted above, the dimensions and location of a sub-domain limit an orientation and translation pair selected therefrom. Thus, an orientation and translation pair from sub-domain 1 will never have an x coordinate greater than 0.5. Similarly, the y coordinate will never be less than 0.5. However, renderer 23 uses the orientation and translation pairs to select an orientation and a translation amount for a line sample. Specifically, renderer 23 multiplies a number from the orientation and translation pair against a range of possible orientations for a line sample (i.e., 0 to 180-degrees). Because, for example, the translation value is never less than 0.5, an orientation selected by this value is never less than 90-degrees. Aliasing can therefore result if renderer 23 repeatedly assigns the orientation and translation pair from sub-domain 1 to the same sub-pixel.

To avoid this problem, renderer 23 assigns the orientation and translation pairs to a sub-pixel by reference to a non-regular sequence of numbers. This step minimizes aliasing by preventing the same sub-pixel from having the same orientation range each time renderer 23 positions a line sample within the sub-pixel.

Renderer 23 preferably accomplishes this by repeating the following sequences of steps for each sub-pixel in a pixel:

select a number from a sequence of non-regular numbers;
where the number is between 0 and 1;

multiply the number from the sequence of non-regular numbers by the number of sub-pixels included in a pixel;

extract an integer value from the result of the multiplying step;

where renderer 23 extracts the number by, for example, rounding or truncating; and assign an orientation and translation pair to a sub-pixel by reference to the result of the extracting step.

Figure 5C:
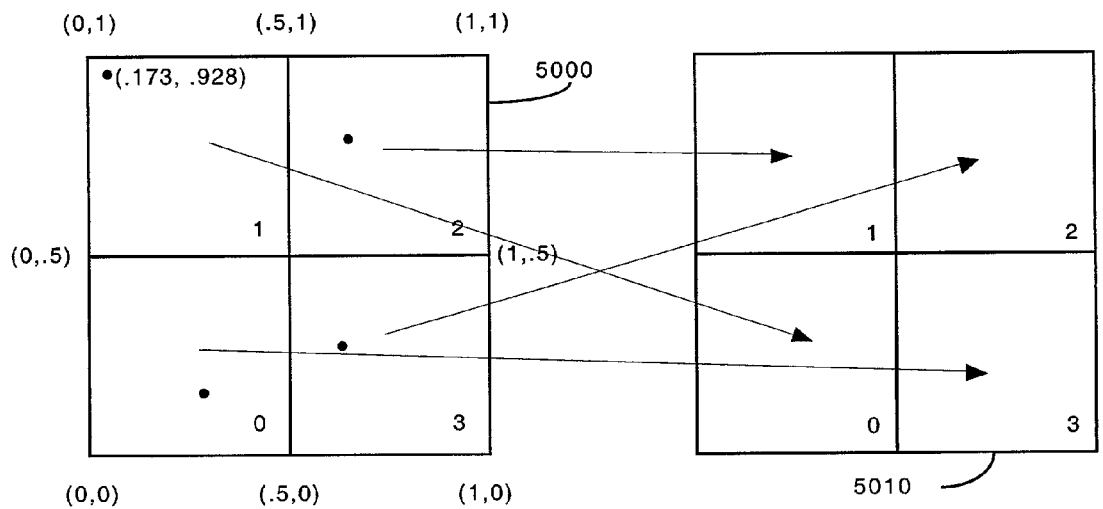
FIG. 5C illustrates the assignment of orientation and translation pairs to sub-pixels by reference to a non-regular sequence of numbers in an embodiment of the invention.

FIG. 5C illustrates the assignment of orientation and translation pairs to sub-pixels in pixel 5010. The orientation and translation pair from sub-domain 0 is assigned to sub-pixel 3, the orientation and translation pair from sub-domain 1 is assigned to sub-pixel 0, the orientation and translation pair from sub-domain 2 is assigned to sub-pixel 1, and the orientation and translation pair from sub-domain 3 is assigned to sub-pixel 2.

Once assigned to a sub-pixel, renderer 23 uses an orientation and translation pair to position a line sample within the sub-pixel (step 5040). Preferably, renderer 23 uses a line sample positioning technique described above to position the line sample, but other techniques are within the scope of the present invention.

Note that in alternative embodiments of the invention, the number of sub-domains is not equal to the number of sub-pixels included in each pixel. Instead, the number of sub-domains is equal to the number of line samples included in some other defined region of the image plane. For example, the number of sub-domains is equal to the number of line samples distributed within a set of pixels or the entire image plane. Additionally, in some embodiments of the invention, line samples are not restricted to separate regions of the image plane (e.g., sub-pixels). In these embodiments, orientation and translation pairs are assigned to line samples instead of sub-pixels as described above.

In still another embodiment of the invention, renderer 23 takes additional steps to assure a uniform distribution of line samples by employing best candidate techniques. Renderer 23 positions a line sample within a first sub-pixel by reference to a non-regular sequence of numbers. Renderer 23 then positions a set of line samples within a neighboring or adjacent sub-pixel by reference to a non-regular sequence of numbers. Renderer 23 then scores each line sample in the set of line samples by reference to the line sample positioned in the first sub-pixel. While the precise scoring technique can vary without departing from the scope of the invention, the scoring preferably ensures that neighboring or adjacent line samples are not too close together or too similarly oriented.

Renderer 23 then selects the line sample with the best score from the set of line samples and repeats this step for each sub-pixel. However, renderer 23 extends this scoring process to include each line sample selected from a group of sub-pixels, which may or may not extend beyond the border of a pixel. Thus, for a third line sample, the scoring process favors an orientation that is most different from the orientation of the first and second line sample and most distant from the first and second line sample.

Figure 6A:
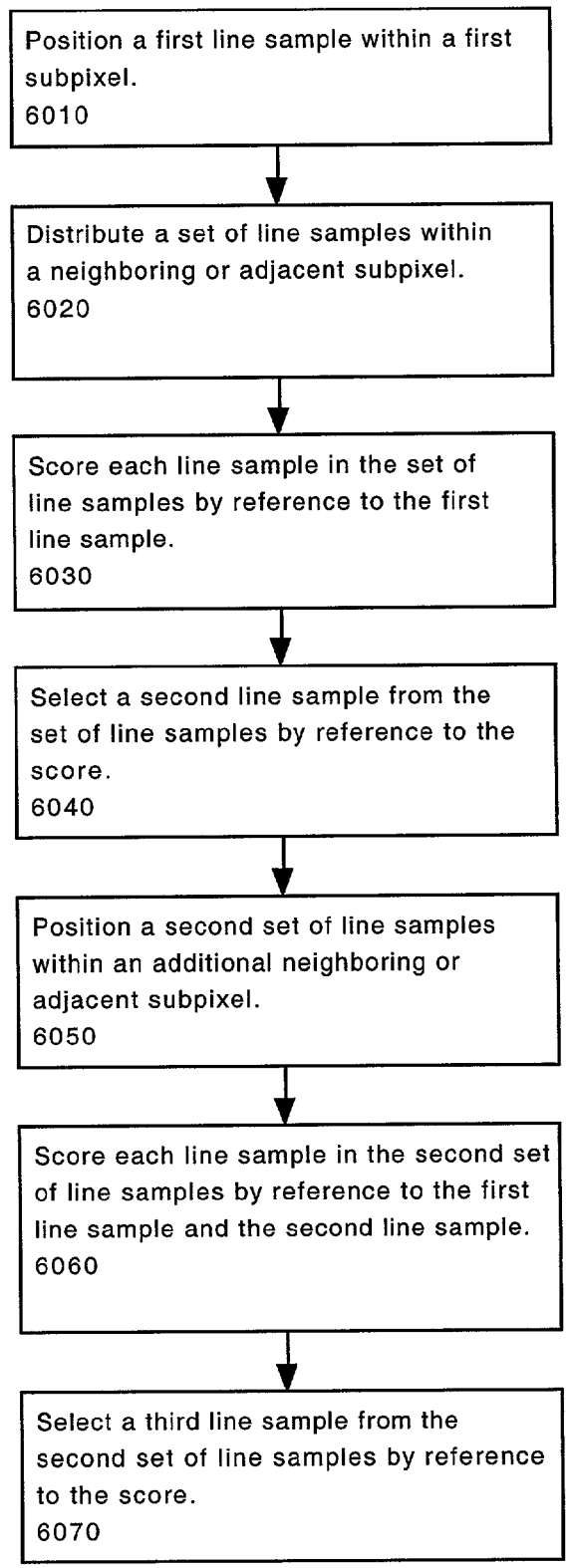
FIG. 6A illustrates processing steps that ensure a best candidate selection from a set of line samples in an embodiment of the invention.
Figure 6B:
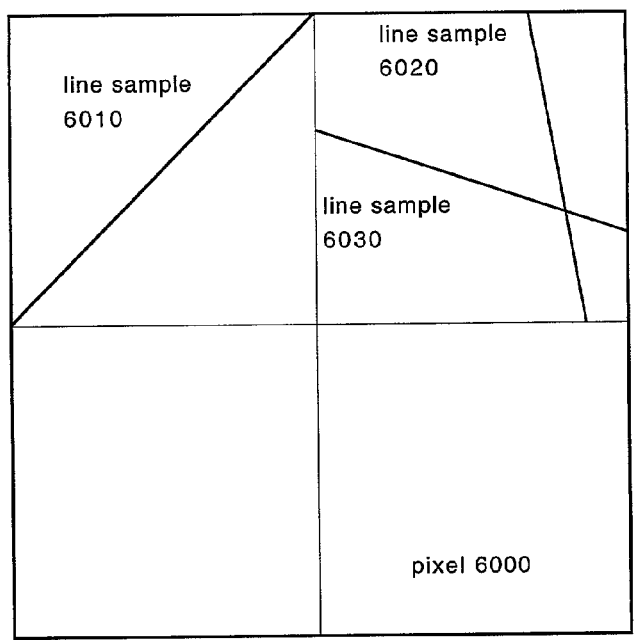
FIG. 6B illustrates a selected line sample and a distributed set of line samples in adjacent sub-pixels in an embodiment of the invention.

Attention now turns to a more detailed description of this embodiment. In a first processing step, renderer 23 positions a first line sample within a sub-pixel (step 6010, FIG. 6A). The precise technique used to position the line sample is variable without departing from the scope of the invention. However, renderer 23 selects an orientation and translation amount by reference to a non-regular sequence of numbers. FIG. 6B illustrates pixel 6000 subdivided to form four sub-pixels. Included in the upper, left sub-pixel is line sample 6010, selected in accordance with step 6010.

Renderer 23 then positions a set of line samples within a neighboring or adjacent sub-pixel (step 6020). A number of positioning techniques are possible without departing from the scope of the invention. For example, some embodiments of the invention use the stratified line sampling method described above. Instead of distributing the orientation and translation pairs to an equal number of sub-pixels as described above, however, renderer 23 uses all of the orientation and translation pairs to position the set of line samples in a single sub-pixel. Incorporating stratified line sampling in this manner eliminates the possibility of a clustered set of line samples. Also included in FIG. 6B is a set of line samples, consisting of line sample 6020 and line sample 6030 distributed in the upper, right sub-pixel of pixel 6000. In this example, the set of line samples comprises two line samples, but the invention is not so limited. The inclusion of more line samples will typically result in a more uniform distribution of line samples by broadening the selection of line samples.

Renderer 23 then scores each line sample in the set of line samples by reference to the first line sample positioned in step 6010 (step 6030). Again, the precise scoring technique can vary without departing from the scope of the invention, but the scoring preferably ensures that neighboring or adjacent line samples are not too close together or too similarly oriented. In a preferred embodiment, the scoring process includes comparing the orientation of the first line sample to the orientation of a line sample from the set of line samples.

If the first line sample is not perpendicular to the line sample from the set of line samples, there are necessarily two different angles between the two line samples. To determine the minimum angle of the two different angles, renderer 23 determines the difference between the selected orientation. If the result of this step is greater than 90-degrees, this result is the maximum angle between the two line samples. Renderer 23 subtracts 90-degrees from the maximum angle to get the minimum angle between the two orientations.

Figure 6C:
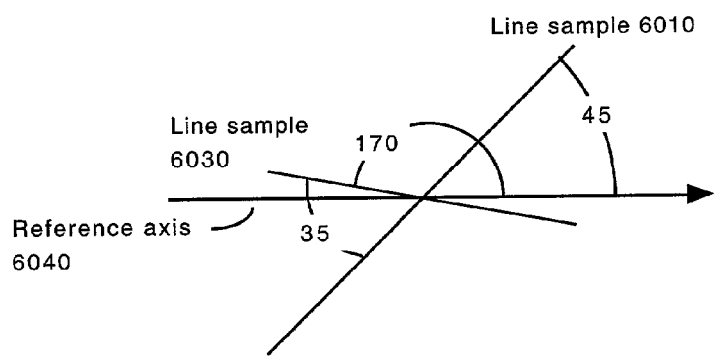
FIG. 6C illustrates a line sample orientation comparison.

To illustrate the comparison, FIG. 6C shows a first selected line sample, line sample 6010, superimposed over a line sample, line sample 6030, from a set of line samples distributed in an adjacent sub-pixel. The selected orientation of line sample 6010 and line sample 6030 sweeps each line sample away from reference axis 6040. As illustrated in FIG. 6C, the orientation of line sample 6010 is 45-degrees and the orientation of line sample 6030 is 170-degrees from reference axis 6040. The difference between these two orientations is 125-degrees. Because the difference is greater than 90-degrees, renderer 23 subtracts 90-degrees from this amount to arrive at 35-degrees, the minimum angle between line sample 6010 and line sample 6030.

Figure 6D:
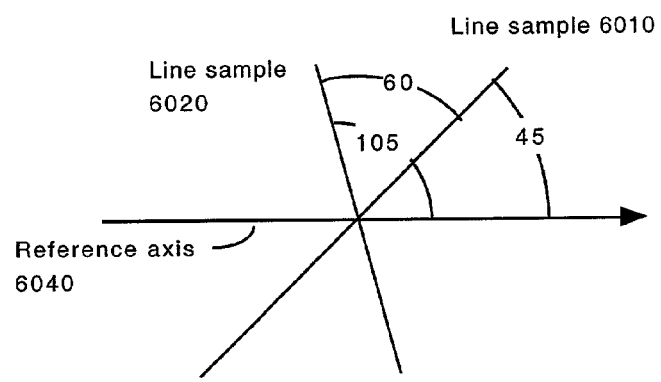
FIG. 6D illustrates a line sample orientation comparison.

In another illustration, FIG. 6D shows line sample 6010 superimposed over line sample 6020, another line sample from the set of line sample distributed in an adjacent sub-pixel. As illustrated in FIG. 6D, the orientation of line sample 6010 is 45-degrees and the orientation of line sample 6020 is 105-degrees from reference axis 6040. The difference between these two orientations is 60-degrees. 60-degrees is the minimum angle between line sample 6010 and line sample 6020 because it is less than or equal to 90-degrees.

In addition to comparing orientations, a preferred embodiment also includes a comparison of the distance between the first line sample and a line sample from the set of line samples. There are a number of techniques available for comparing the distance between two line samples without departing from the scope of the invention. In a preferred embodiment, renderer 23 determines the closest approach between the two line samples at any point along each line. In other embodiments, renderer 23 determines the closest approach by reference to a midway point along each line sample.

Preferably, renderer 23 normalizes both the closest approach and minimum angle to equalize the contribution of each to the overall score. Renderer 23 preferably divides the minimum angle by 90-degrees to obtain a value between zero and one since the minimum angle is between 0 and 90-degrees. Additionally, renderer 23 preferably divides the closest approach by the maximum distance between any two points in the relevant sub-pixels.

Renderer 23 then combines the minimum angle and closest approach by, for example, multiplying the two values. In other embodiments, renderer 23 adjusts one or both of the values so that one of the values is a more significant factor in the scoring process.

The following equation illustrates the scoring techniques described above:

$$score = a\left(\frac{angle_m}{90}\right) + b\left(\frac{dist}{max\ dist}\right) \qquad (19)$$

where
$angle_m$ is the minimum angle between the first line sample and a second line sample;
dist is the distance between the first line sample and a second line sample;
max dist is the maximum possible distance between the first line sample and a second line sample;
a is a factor that adjusts the contribution of the minimum angle to the score; and
b is a factor that adjusts the contribution of the distance to the score.

After scoring one or more line samples from the set of line samples distributed in step 6020, renderer 23 selects a line sample (step 6040). Because the preferred embodiments of the invention seek to maximize the distance and angle between line samples, renderer 23 selects the line sample with the highest score. But some embodiments do not require this since these embodiments emphasize different attributes in a distribution of line samples.

Depending on the needs of a particular embodiment of the invention, renderer 23 distributes a set of line samples within another sub-pixel (step 6050). As with the positioning of line samples in step 6020, renderer 23 preferably positions the line samples by applying the line sample positioning techniques described above.

Renderer 23 then scores each line sample in this set of line samples by reference to the first and second line samples positioned and selected in steps 6010 and 6040 respectively (step 6060). The scoring process is essentially the same as that described with reference to step 6030. However, combining the individual scores to determine an overall score is subject to a great deal of variation. Again, the general goal is to select a line sample having a maximum distance and orientation from the first and second line samples. An example of a variation is giving more weight to line samples positioned within sub-pixels that are closest to the sub-pixel containing the line sample being scored. Additionally, renderer 23 may assign relatively more weight to sub-pixels that share a pixel. The scoring process in preferred embodiments of the present invention thus includes line samples distributed within neighboring or adjacent pixels even though FIG. 6B illustrates only a single pixel. As described in greater detail below, renderer 23 preferably determines a color value for a pixel by combining color values for a plurality of line samples. The number of line samples used is variable. For example, some embodiments combine line samples from neighboring pixels to compute a color value for a given pixel. In these embodiments, renderer 23 preferably extends the scoring process to include all line samples included in the given pixel and its neighboring pixels. Other variations are possible without departing from the scope of the invention.

Accordingly, equation (19) is extended as follows:

$$score = c_1\left[a\left(\frac{angle_m}{90}\right) + b\left(\frac{dist}{\max dist}\right)\right]_1 + \\ c_2\left[a\left(\frac{angle_m}{90}\right) + b\left(\frac{dist}{\max dist}\right)\right]_2 + \ldots + \\ c_n\left[a\left(\frac{angle_m}{90}\right) + b\left(\frac{dist}{\max dist}\right)\right]_n \quad (20)$$

where
- c is a weight attributed to each line sample's contribution to the overall score;
- n is the number of line samples against which renderer 23 scores a candidate line sample.

Weight c is, depending on the embodiment, a reflection of the distance between a candidate line sample and an already-selected line sample, a reflection of whether the candidate line sample and an already-selected line sample are within the same pixel, or both.

After scoring one or more line samples from the set of line samples distributed in step 6050, renderer 23 selects a line sample (step 6070). Because preferred embodiments of the invention seek to maximize the distance and angle between line samples, renderer 23 selects the line sample with the best score. But some embodiments do not require this since they emphasize different attributes in a distribution of line samples.

In the above-described embodiment, each line sample is selected separately, in a linear fashion. That is, renderer 23 positions a first line sample, and selects a second line sample from a set of line samples by reference to the first line sample. Renderer 23 then selects a third line sample by reference to the first and second line samples. Renderer 23 extends this process as needed.

However, in alternative embodiments, sets of line samples are selected together, rather than individually. In these embodiments, renderer 23 distributes a set of line samples in a region (e.g., a set of pixels) of image plane 110. Renderer 23 then selects a subset of the set of line samples. For example, renderer 23 selects one line sample from each sub-region (e.g., a sub-pixel). Renderer 23 then scores the sub-set of line samples. The scoring process is similar to the scoring process described above. Essentially, the score reflects an average minimum angle and distance between each line sample in the subset of line samples. Renderer 23 then selects and scores a second subset of line samples from the set of line samples. Renderer 23 continues the selecting and scoring subsets until a suitable number of subsets are selected and scored. Renderer 23 then uses the subset having the best score. Note that various techniques are available to improve the efficiency of these embodiments. In particular, a great deal of work has been done on so-called "traveling salesman" problems, which involve computing a route between a set of cities. Typically, the work involves the application of heuristics. The problem of selecting line sample positions is stated such that the minimum angle and distance between two line samples is thought of as the cost of traveling between to cities. This embodiment of the invention is, therefore, preferably optimized with simulated annealing, which has known application to the traveling salesman problem.

In still another embodiment of the present invention, renderer 23 distributes line samples in time. As noted above, object scene data 21 maintains information about the movement of objects during a time period associated with an image frame. To simulate motion blur, renderer 23 selects a specific period of time for each line sample. More specifically, renderer 23 multiplies the period of time associated with the image frame by a number from a non-regular sequence of numbers. Each of the numbers in the non-regular sequence of numbers is between zero and one so the result of the multiplication is a fraction of the time period. Memory 20 maintains the selected time period for each line sample along with other information in association with each line sample. Note that in preferred embodiments, renderer 23 takes additional steps to assure a uniform distribution of selected times. Accordingly, renderer 23 takes steps analogous to those taken and described above when selecting a position for a line sample when selecting a time for the line sample.

After a set of line samples is distributed using an above-described or other embodiment of the present invention, renderer 23 projects objects from an object scene onto image plane 110 as illustrated in FIG. 1B (step 1030, FIG. 1C). As a preliminary step, renderer 23 determines whether an object is within a region that includes a line sample being processed.

Renderer 23 preferably encloses a candidate object in a bounding box before making this determination. Renderer 23 accesses object scene data 21 to determine the size and position of the object being processed.

The bounding box loosely follows the contours of the object. It is generally easier to determine whether the object is within a region of a line sample through the use of a bounding box because the bounding box lacks shape or surface complexity possessed by some objects. Typically, the region of a line sample includes the area that the pixel or sub-pixel containing the line sample overlaps. If the bounding box is not within a region of the line sample, renderer 23 processes a different candidate object.

As noted above, renderer 23 preferably distributes line samples in a period of time associated with an image frame. Accordingly, the movement of an object during this period of time complicates the step of determining whether a line sample, sub-pixel, or pixel overlaps an object. To address this movement, the bounding box actually stretches to enclose the object during its movement within the period of time associated with the image frame.

If the bounding box is within a region of the line sample, renderer 23 may convert the object to a grid of micropolygons. A grid of micropolygons is often easier to project onto image plane 110 and sample with line samples (as described below) than objects with complex surfaces (e.g., smoothly varying surfaces). Additionally, it is computationally less complex to enclose a grid of micropolygons tightly within a bounding box. In other words, renderer 23 is able to determine more precisely if a region around a line sample overlaps the object. Thus, renderer 23 may also take the step of enclosing the grid of micropolygons within a bounding box. Again, if the bounding box is not within a region of the line sample, renderer 23 processes a different candidate object.

Renderer 23 then transforms the object (possibly in the form of a grid of micropolygons) to the precise time of a line sample. Additionally, renderer 23 selects a lens position for the line sample being processed. Renderer 23 then transforms the object according to the lens position assigned to that line sample.

Figure 7:
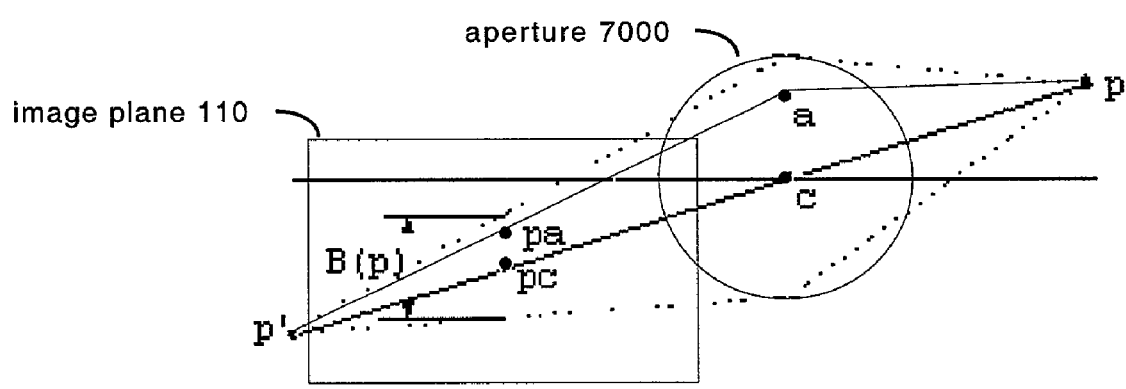
FIG. 7 illustrates the simulation of depth of field in a preferred embodiment of the present invention.

As noted above, renderer 23 simulates limited depth of field. To do so, renderer 23 associates a point a on aperture 7000 with each line sample on image plane 110 as illustrated in FIG. 7 (line sample not illustrated). Renderer 23 may choose the points using a regular pattern, through a stochastic process, or by way of stratification. Because a is a single point on the aperture, the image it forms on image plane 110 is a 'pinhole' image that renderer 23 computes using standard projection techniques.

Renderer 23 projects an object onto image plane 110 once through c, and then translates the object for each line sample that overlaps the object. Renderer 23 translates the object by (pc−pa), where pc is the position of the object on image plane 110 if projected through c and pa is the position of the object on image plane 110 if projected through a.

To compute (pc−pa), renderer 23 makes use of a function B(p), which defines a scaling factor of the circle of confusion (i.e., the area of image plane 110 into which renderer 23 projects p) associated with the point p relative to aperture 7000. Thus, (pc−pa) equal (a−c)*B(p).

In a traditional camera model, the camera is parameterized by its focal length, f, an aperture number, n, and a distance from the aperture at which the camera is focused, D. If the camera of the axis is aligned with the z axis, renderer 23 computes the circle of confusion for traditional camera model as $$C(p) = \frac{f}{n}\left(1 - \frac{Z}{p'_z}\right),$$

where $$Z = \frac{fD}{D - f}$$

is the distance from the aperture to image of the plane of focus, and $$p'_z = \frac{fp_z}{p_z - f}$$

is the distance along the camera axis from the aperture to p', the image of p. Because f/n defines the diameter of the aperture, for a traditional camera system renderer 23 might write the blur scaling function as $$B(p) = \left(1 - \frac{Z}{p'_z}\right) = \frac{D}{p_z}\frac{p_z - f}{D - f}.$$

The present invention is not, however, limited to traditional camera models. Instead, the present invention uses any smoothly-varying function of p to, for example, have multiple planes of focus.

Renderer 23 furthermore defines a function Fq(l,p) to 'filter' a value of a quantity (e.g. color) associated with a point or object p when p is viewed through point l on the aperture. Example uses of F include modifying the shape of the circle of confusion or changing the brightness of the circle of confusion as a function of aperture or object position, and so on.

After renderer 23 projects the object onto image plane 110, renderer 23 computes the view of an object scene along the line sample being processed (step 1040). Since a line sample can overlap multiple objects, renderer 23 must determine and mark each segment of the line sample that overlaps a portion of an object. Renderer 23 then stores this information in memory 20 in association with the line sample. Note that methods for efficiently storing, retrieving, and updating information in data structures are described in detail below in connection with FIGS. 10–19B. Renderer 23 repeats this step for each object projected on to image plane 110. Additionally, renderer 23 determines which of the objects overlapped by the line sample being processed are closest to image plane 110.

Figure 8A:
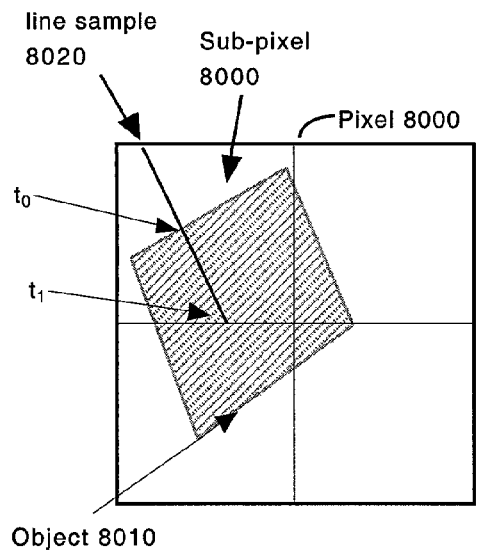
FIG. 8A illustrates the projection of an object from an object scene onto an image plane in a preferred embodiment of the present invention.
Figure 8C:
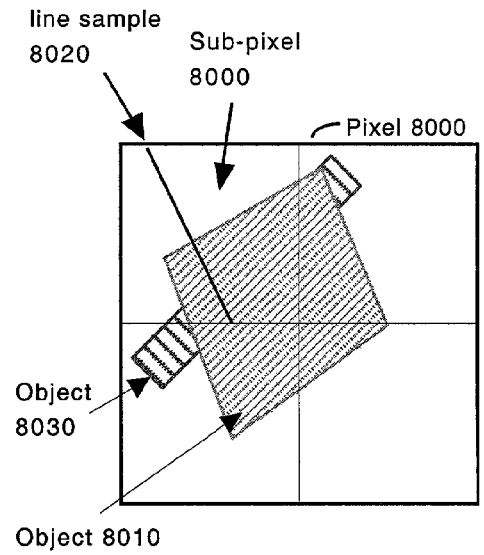
FIG. 8C illustrates the projection of an object from an object scene onto an image plane in a preferred embodiment of the present invention.

FIG. 8A illustrates the result of projecting object 8010 onto image plane 110 in the area of pixel 8000. In this particular illustration, renderer 23 is processing line sample 8020.

The sub-steps of step 1040 are described in greater detail with reference to FIG. 8B. In a first sub-step, renderer 23 isolates a new segment of line sample 8020 that overlaps object 8010 (step 8010). More specifically, renderer 23 determines the end-point coordinates $t_0$ and $t_1$ of a new segment as illustrated in FIG. 8A.

After determining end-point coordinates $t_0$ and $t_1$, renderer 23 calculates the distance of object 8010 from image plane 110 at the end-point coordinates $t_0$ and $t_1$ (step 8020). Additionally, renderer 23 obtains the transparency value and color value as described with reference to step 1010 (step 8022).

If the transparency value obtained in step 8022 indicates that the object associated with the new segment is transparent (step 8024—Yes), renderer 23 stores information related to the segment in memory 20 for subsequent processing as described in detail below (step 8080). In particular, step 8080 includes adding the segment to a transparency list also maintained in memory 20. Note that methods for efficiently storing, retrieving, and updating information in data structures are described in detail below in connection with FIGS. 10–19B. Renderer 23 then returns to step 1030 to project another object onto image plane 110.

If the transparency value obtained in step 8022 indicates that the object associated with the new segment is not transparent (step 8024—No), renderer 23 determines whether there is an overlap between an old segment (i.e., a segment already processed and stored in memory 20) and the new segment (step 8028). Renderer 23 accomplishes this by a comparison of end-point coordinates associated with the new segment and an old segment.

If there is no overlap between an old segment and the new segment (step 8032—No), renderer 23 stores information related to the new segment (e.g., end-point coordinates, transparency value, color value) in memory 20 (step 8080). Renderer 23 then returns to step 1030 to project another object onto image plane 110.

In the example illustrated in FIG. 8A, no other segments are present because object 8010 is the first object projected onto image plane 110.

After returning to step 1030, renderer 23 projects additional objects onto image plane 110 (step 1030). Renderer 23 executes steps 8010 through 8028 for additional objects projected onto image plane 110. If an additional object is not transparent and there is an overlap between a segment associated with the additional object and an old segment (step 8032—Yes), renderer 23 determines the state of occlusion between the object associated with the new segment and the object associated with the old segment (step 8028). Renderer 23 makes this determination by evaluating the end-point coordinates of each segment and the z-depth values of the objects associated with the two segments at those coordinates. Essentially, renderer 23 determines whether the object associated with the new segment or the object associated with the old segment occludes the other (i.e., is closer to image plane 110) where there is an overlap between the two segments and line sample 8020.

If the object associated with the old segment completely occludes the object associated with the new segment (step 8038—Yes), renderer 23 determines if the new segment overlaps another old segment (step 8070). If so (step 8070—Yes), renderer 23 returns to step 8028, which is described above. If not (step 8070—No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

If the object associated with the new segment completely occludes the object associated with the old segment (step 8038—No, step 8040—Yes), renderer 23 computes the z-depth values of the object associated with the new segment at positions overlapped by the end-point coordinates of the old segment and updates the old segment's information with the new z-depth values and other information related to the new segment (step 8050). Note that methods for efficiently storing, retrieving, and updating information in data structures are described in detail below in connection with FIGS. 10–19B.

Figure 8D:
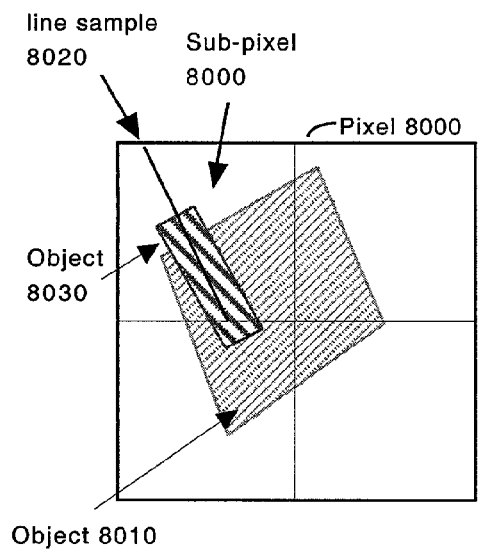
FIG. 8D illustrates the projection of an object from an object scene onto an image plane in a preferred embodiment of the present invention.

FIG. 8D illustrates object 8030 projected onto image plane 110 such that object 8030 completely occludes object 8010 where object 8030, object 8010, and line sample 8020 overlap. Accordingly, object 8010 is not visible along line sample 8020.

Renderer 23 then determines if the new segment overlaps another old segment (step 8070). If so (step 8070—Yes), renderer 23 returns to step 8028, which is described above. If not (step 8070—No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

If the new segment only partially occludes the old segment (step 8038—No, step 8040—No), renderer 23 adjusts an end-point of the old segment to reflect the intersection with the new segment (step 8060). Renderer 23 also sets the z-depth value associated with the adjusted end-point to reflect the z-depth value of the object associated with the old segment at the position marked by the adjusted end-point (step 8060 continued).

Figure 8E:
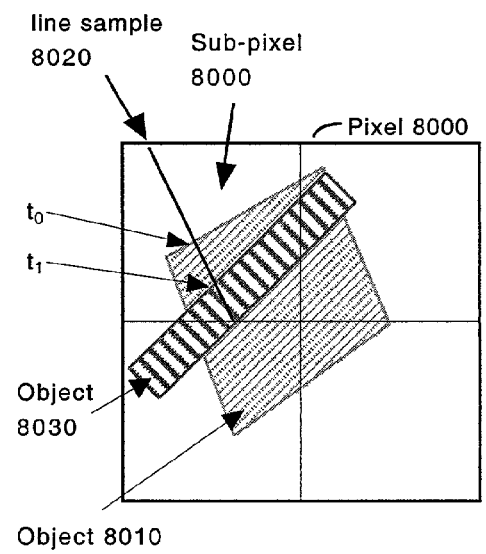
FIG. 8E illustrates the projection of an object from an object scene onto an image plane in a preferred embodiment of the present invention.
Figure 8B:
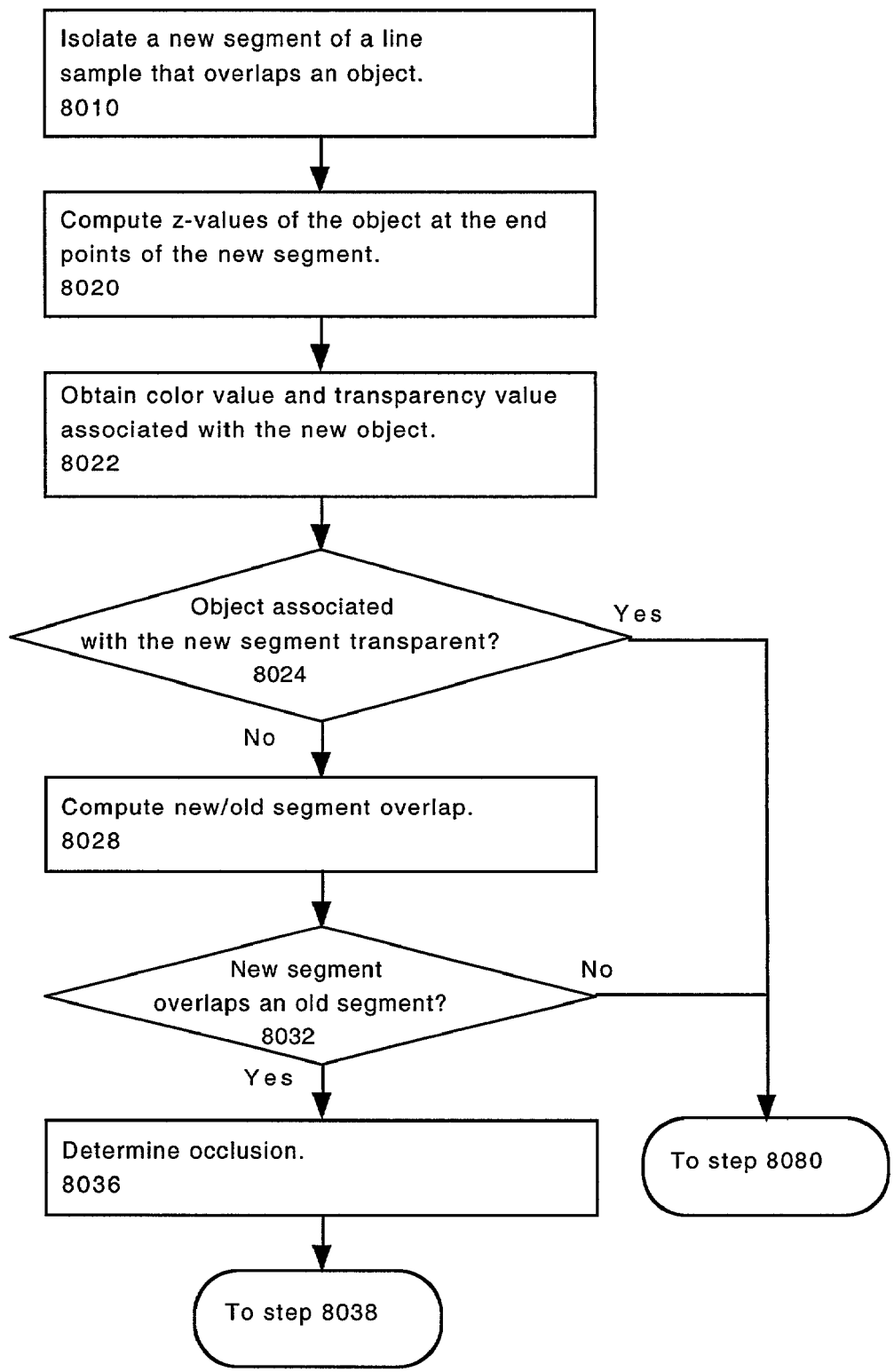
FIG. 8B illustrate processing steps used to develop an analytic representation of an object scene along a line sample.
Figure 8B:
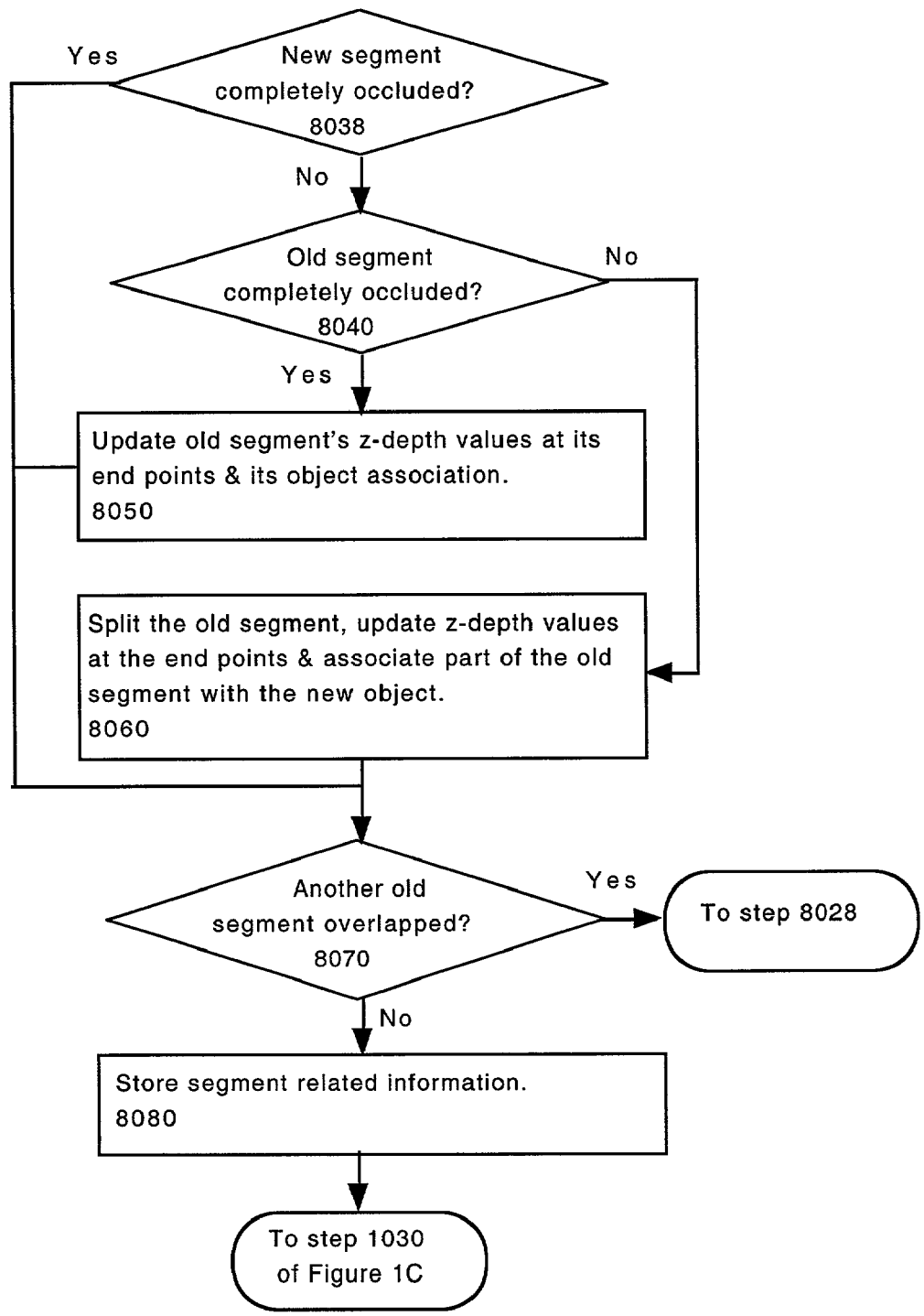

FIG. 8E illustrates object 8030 projected onto image plane 110 such that object 8030 only partially occludes object 8010. Accordingly, renderer 23 reduces the visibility of object 8010 along line sample 8020 but does not eliminate it. Note that end-point coordinate $t_1$, which is associated with object 8010, is in a new position in FIG. 8E to reflect the adjustment described with reference to step 8060.

Renderer 23 then determines if the new segment overlaps another old segment (step 8070). If so (step 8070—Yes), renderer 23 returns to step 8028, which is described above. If not (step 8070—No), renderer 23 stores in memory 20 information related to the portions of the new segment (e.g., end-point coordinates, transparency value, color value), if any, for which there is no overlap with an older segment in memory 20 (step 8080). Renderer 23 then returns to step 1030 to project another object onto image plane 110.

In another aspect of the present invention, renderer 23 updates a number of z-far values while processing objects projected onto image plane 110. More specifically, renderer 23 scans the isolated segments to determine the maximum distance of an object from image plane 110 that is associated with a segment of a line sample. Renderer 23 uses this value to update the z-far values associated with the line sample and various regions that include the line sample (e.g., sub-pixel, pixel, or image plane).

In preferred embodiments, however, renderer 23 adjusts the z-far value only if there is a valid association between substantially all of the line sample and one or more objects. Portions of a line sample that do not have an association with a segment lack a valid association with an object. In other words, these portions of a line sample do not overlap an object. Portions of a line sample that do not have an association with a segment that is consistent with adjacent segments also lack a valid association with an object. For example, if two segments are both associated with a first object and border a third segment, which is associated with a second object that is further away from image plane 110 than the first object, the third segment is possibly inconsistent. The third segment would be inconsistent if for example the first object has holes that allow an object behind it to be viewed. Renderer 23 determines whether this is the case by an examination of object scene data 21. Invalid associations with an object typically occur as a result of errors in object scene data 21 or the processing of object scene data 21 result in irregularities in the object scene. For example, a grid of micropolygons created to represent an object might have gaps between grid cells that are not representative of the object. As a result, small regions of a line sample might not be validly associated with an object. Accordingly, in preferred embodiments of the invention, renderer 23 adjusts the z-far value only if there is a valid association between substantially all of the line sample and one or more objects.

As noted above, renderer 23 stores transparent objects that a current line sample overlaps in memory 20. And again, methods for efficiently storing, retrieving, and updating information in data structures are described in detail below in connection with FIGS. 10–19B. After renderer 23 projects all objects within a region of the current line sample onto image plane 110, renderer 23 processes the segments included in the transparency list and the segments associated with opaque objects visible along the current line sample. The processing includes sorting the segments included in the transparency list according to their z-depth values, isolating unique combinations of segments along the current line sample, and computing a color for each unique combination.

In alternative embodiments, renderer 23 processes transparent objects as renderer 23 projects them onto image plane 110. Thus, in these embodiments, renderer 23 continually eliminates or sorts transparent objects and portions of transparent objects as described above. Thus, these embodiments do not require the sorting step described below at this point in the process.

Figure 9A:
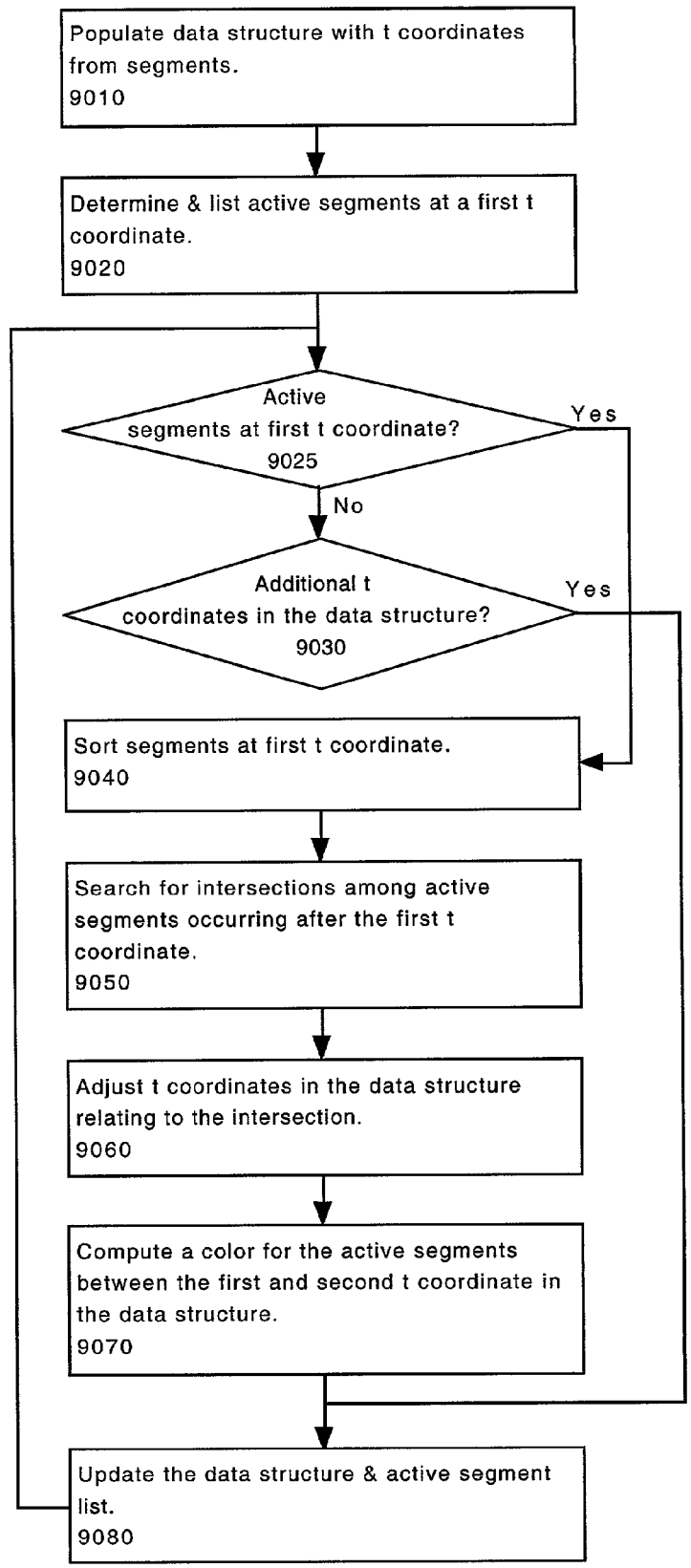
FIG. 9A illustrates processing steps that isolate unique sets of objects visible along and overlapped by a line sample sorted by distance from an image plane in a preferred embodiment of the present invention.
Figure 9B:
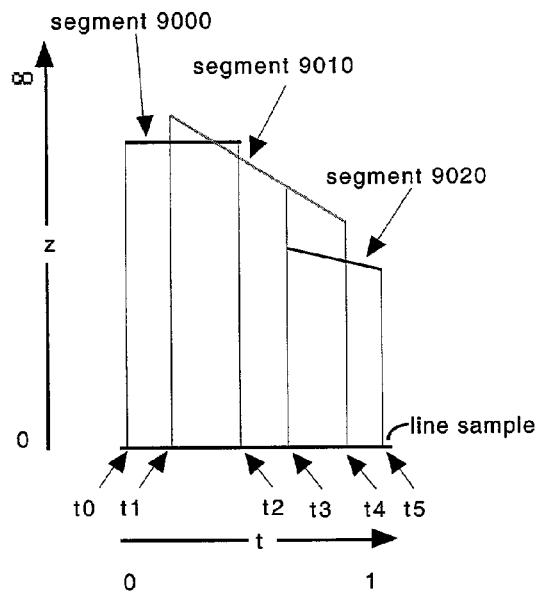
FIG. 9B illustrates objects visible along and overlapped by a line sample sorted by distance from an image plane in a preferred embodiment of the present invention.

Attention now turns to a more detailed description of an embodiment of this aspect of the invention. In a first processing step, renderer 23 populates a data structure with the end-point coordinates (i.e., t coordinates) of segments associated with the current line sample (step 9010, FIG. 9A). The data structure exists in memory 20 and comprises, for example, a linked list or an array. As noted above, the t coordinates indicate a distance from an end of a line sample. Renderer 23 preferably includes identifiers of the segments associated with each t coordinate in the data structure since a plurality of segments can share a t coordinate. Furthermore, renderer 23 preferably sorts the data structure by t coordinate value. FIG. 9B illustrates, among other things, the end-point coordinates of segments that a line sample overlaps (i.e., t0–t6).

Renderer 23 then determines and lists segments that share the first t coordinate in the data structure (step 9020). The first t coordinate is the lowest value of t at which a segment overlaps the current line sample. Renderer 23 accomplishes this step by examining the data structure, which as noted above maintains segment identifiers in association with each t coordinate. Each segment identified at the first t coordinate is an active segment, which means that the segment overlaps a portion of the line sample identified by the first t coordinate. In the example illustrated in FIG. 9B, only segment 9000 is present at the first t coordinate, which t0 marks.

If there are active segments for the current t coordinate (step 9025—Yes), renderer 23 sorts the active segments according to z-depth (step 9040). Thus, renderer 23 determines which segments are closest to the current line sample and image plane 110.

Figure 9C:
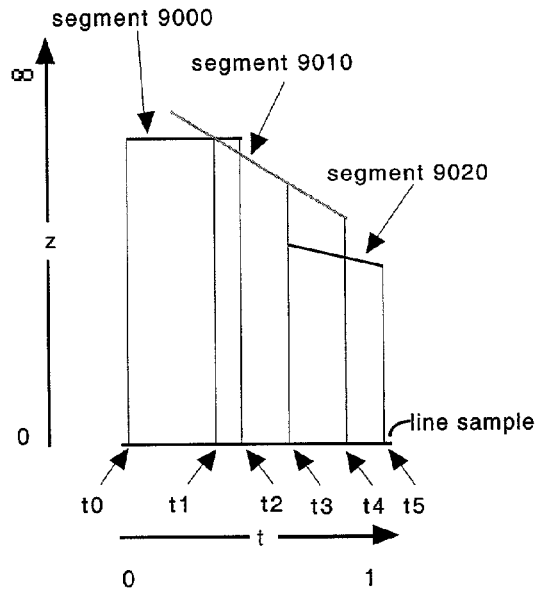
FIG. 9C illustrates objects visible along and overlapped by a line sample sorted by distance from an image plane after an intersection is processed in a preferred embodiment of the present invention.

Renderer 23 then searches along each active segment for intersections with other segments (step 9050). As illustrated in FIG. 9B, segment 9000 intersects with segment 9010. Renderer 23 therefore inserts a t coordinate marking the intersection into the data structure (step 9060). FIG. 9B illustrates this t coordinate as t3. Because renderer 23 detects an intersection, renderer 23 preferably determines whether the intersection affects the visibility of the intersecting objects. In the example illustrated in FIG. 9B, segment 9010 is transparent, but segment 9000 is opaque. According, the portion of segment 9010 between t2 and t3 is not visible. Accordingly, renderer 23 removes t coordinate t2 from the data structure (step 9060). FIG. 9C illustrates this example after adjusting the data structure as described above. In this example, therefore, only segment 9000 is active between t0 and t1 even though the current line sample overlaps a portion of segment 9010 over part of this range.

Renderer 23 then computes a color with standard computer graphics compositing formulas for the active segments along the line sample between the first t coordinate and the second t coordinate value in the data structure (step 9070). Renderer 23 maintains the color value in memory 20 along with information such as the values of the first and second t coordinates.

Figure 9D:
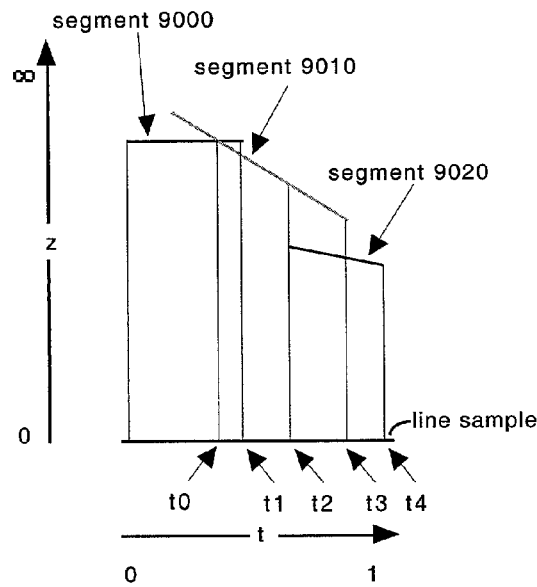
FIG. 9D illustrates objects visible along and overlapped by a line sample sorted by distance from an image plane after a data structure is adjusted in a preferred embodiment of the present invention.

Renderer 23 then updates the data structure and active segments (step 9080). Part of this step includes removing the first t coordinate from the data structure. Accordingly, renderer 23 creates a 'new' first t coordinate. FIG. 9D illustrates the example illustrated in FIG. 9C after adjusting the data structure as described.

Additionally, renderer 23 updates the active segments. As noted above, end-point coordinates of segments are added to the data structure. Accordingly, the second t coordinate in the data structure is often an end-point coordinate of a segment marking the end (as opposed to the beginning) of the segment. Since the segment has no further affect on the color of the line sample, it is no longer active.

Further, the second t coordinate is often an end-point coordinate of a segment marking the beginning of the segment. Thus, this segment is now an active segment if visible from image plane 110.

Similarly, the second t coordinate can mark an intersection between two segments. Because some or all of the segments are possibly transparent, both segments are often visible before and after the intersection. However, the ordering of transparent segments does affect color values, so renderer 23 does separately compute a color value for two transparent objects before and after an intersection between the two. Additionally, one of the intersecting segment is not visible before or after an intersection. Renderer 23 therefore separately computes a color value before and after the intersection between the two segments.

In the example illustrated in FIG. 9D, only segment 9000 is visible before and after the intersection with segment 9010, so it remains an active segment. Segment 9010 is, however, visible only after the intersection with segment 9000. Accordingly, segment 9010 becomes active.

Renderer 23 then returns to step 9025 to determine whether there is an active segment to process. In the example illustrated in FIG. 9D, segment 9000 and segment 9010 are active (step 9025—Yes), so renderer 23 proceeds to step 9040.

If there are no active segments to process (step 9025—No), renderer 23 determines whether there are additional t coordinates in the data structure (step 9030). If not (step 9030—No), render 23 combines the color value of each cross section of segments to determine a color value for the line sample. Preferably, renderer 23 weights the contribution of each cross section to the final color value of the line sample by reference to the length of each cross section.

If there are additional t coordinates in the data structure (step 9030—Yes), renderer 23 updates the data structure and active segment list (step 9080). In this case, there is a portion of the current line sample with which no segment is associated. It is possible that certain portions of the image scene lack definition (i.e., objects). Additionally, this is possibly a result of an error in the processing of the object scene data 21.

In some embodiments, renderer 23 updates the data structure by removing the current first t coordinate, thereby creating a new t coordinate. Renderer 23 also determines which segments, if any, are now active. Renderer 23 then returns to step 9025. Thus in these embodiments, renderer 23 ignores the portions of the line sample that lack an active segment. Further, these portions of the line sample are not a factor in the calculation of a color value for the line sample.

In other embodiments, renderer 23 takes certain steps to eliminate these portions before computing the color of the line sample as described above. As described above, some portions of a line sample lack a valid association with an object. In other words, renderer 23 did not define a segment for these portions of the line sample. Again, these portions are often the result of processing errors. In such cases, renderer 23 preferably extends the segments bordering such a portion of the line sample to create two new segments.

Figure 9E:
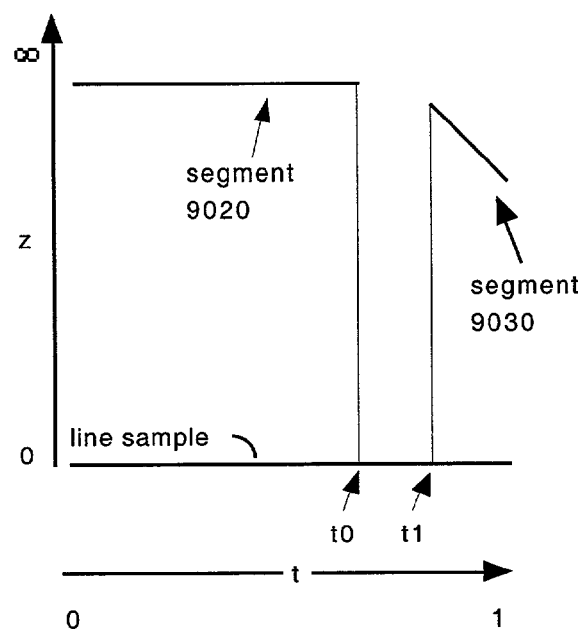
FIG. 9E illustrates objects visible along and overlapped by a line sample sorted by distance from an image plane with a gap between the segments in a preferred embodiment of the present invention.

FIG. 9E illustrates a portion of the line sample that lacks a valid association with an object. Consistent with the process described above, t coordinates mark a beginning and an end of a segment. Specifically, t0 marks the end of segment 9020 and t1 marks the beginning of segment 9030.

Figure 9F:
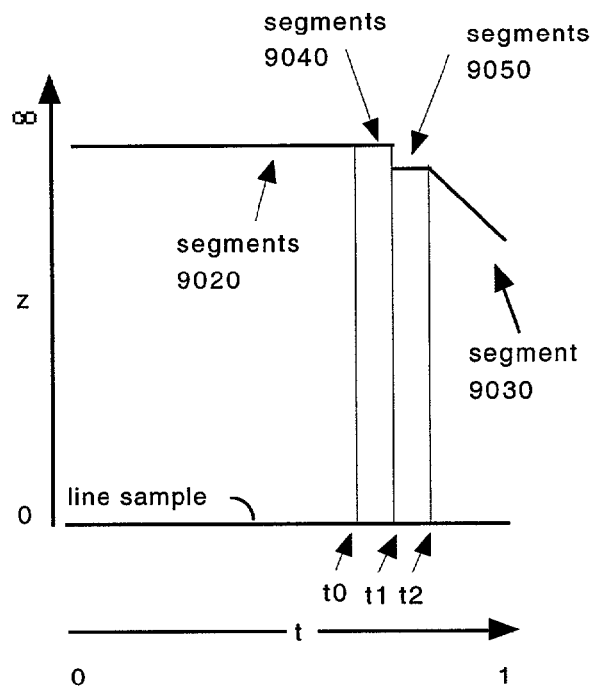
FIG. 9F illustrates objects visible along and overlapped by a line sample sorted by distance from an image plane with a gap between the segments corrected in a preferred embodiment of the present invention.

FIG. 9F illustrates segment 9040 and segment 9050 inserted by renderer 23. Renderer 23 extends the values of segment 9020 to a position between segment 9020 and 9030, which t1 marks as illustrated in FIG. 9F. Thus, segment 9040 maintains the z-depth, color, and transparency values of segment 9020 at a position marked by t0 between t0 and t1. Similarly, segment 9050 maintains the z-depth, color, and transparency values of segment 9020 at a position marked by t2 between t1 and t2. As indicated above, renderer 23 also added t coordinate t1, which marks the intersection of segment 9040 and segment 9050, to the data structure as illustrated in FIG. 9F.

In this particular embodiment, renderer 23 does not maintain the trajectory of segment 9030; however, some embodiments of the invention do so. Additionally, in other embodiments, renderer 23 does not extend the two segments to a central point in the invalid portion. For example, in some embodiments, one of the end-point properties of one of the adjacent segments is randomly selected and extended across the entire invalid portion.

After adjusting the data structure and inserting segments as needed, renderer 23 returns to step 9025.

After computing a color value for a number of line samples, renderer 23 combines the color values of the line samples to produce a color value for a pixel (step 1050). In some embodiments, renderer 23 uses only those line samples distributed within a given pixel to compute a color value for that pixel. In preferred embodiments, however, renderer 23 uses line samples distributed outside the boundary of a given pixel to compute a color value for that pixel. For example, renderer 23 might also use line samples distributed within pixels bordering a given pixel to compute a color value for that pixel. In these embodiments, renderer 23 preferably weights the contribution of each line sample to the computation of a color value according to each line sample's distance from the center of the pixel for which renderer 23 is computing a color value.

As described above, some embodiments of the invention distribute line samples by selecting an orientation and translation amount by reference to a non-regular sequence of numbers. In these embodiments, smaller regions of sub-pixels or pixels are over sampled. This means that there is an overabundance of relatively short line samples. To minimize the effect of such an overabundance of relatively short line samples, the contribution of each line sample is weighted according to a length of the line sample.

In embodiments that distribute line samples by selecting an orientation and area by reference to a non-regular sequence of numbers, the contribution of a line sample to the color of a pixel is not weighted according to its length. As described above, there is not an overabundance of short line samples in these embodiments.

In alternative embodiments, renderer 23 uses an image function to define a color value for points across image plane 110. The function permits renderer 23 to determine a color value for each point from the line samples through interpolation or extrapolation. Thus, in these embodiments, renderer 23 does not combine the line samples per se. Instead, renderer 23 uses the set of line samples to predict a color value at a set of points on the image plane. Renderer 23 then combines the set of points to compute a color value for each pixel.

After computing a color value for each pixel, an image frame or view of an object scene is complete.

In some embodiments, renderer 23 computes the view of an object scene along only a selected portion of each line sample. In these embodiments, renderer 23 preferably uses a non-regular sequence of numbers to select the size and location of a portion of a line sample. Additionally, in some embodiments, renderer 23 subdivides a pixel to form a plurality of sub-pixels, but places a line sample in only a subset of the sub-pixels. In these embodiments, renderer 23 preferably uses a non-regular sequence of numbers to select the sub-pixels that form the subset.

Attention now turns to a detailed discussion of methods for efficiently storing, retrieving, and updating information in data structures. Parts of the following discussion may revisit some aspects of embodiments of the invention described in detail above. These parts are meant to expand, augment, and/or restate that which is described in detail above.

Again, reconstructing a view of a three dimensional object scene includes projecting objects or geometry onto a two dimensional image plane. Additionally, some embodiments of the present invention include line sampling. In line sampling, randomly distributed line samples may be used to represent the three dimensional geometry analytically. Each line sample is parameterized in t from zero to one and is divided into segments where each segment represents an object part that is in the scene. An opaque segment represents part of an opaque object and a semitransparent segment represents part of a semitransparent object.

A segment is defined by a range of t values (t range) having two endpoints, a starting endpoint t0 and an ending endpoint t1. The t range of a segment spans from t0 (inclusive) to t1 (exclusive unless t1 equals 1, then inclusive). Each segment endpoint (t0 and t1) has associated data corresponding to object parameter values of the object part that the segment represents. In a preferred embodiment, the starting endpoint t0 and the ending endpoint t1 have associated object parameter values for depth (the distance from the object part to a predefined viewpoint), color, and transparency and an associated object depth range. The object depth range spans from the depth value at the starting endpoint t0 to the depth value at the ending endpoint t1, inclusive.

In an alternative embodiment, each segment endpoint (t0 and t1) also has an associated value for reflectivity (an indication of shininess). In another embodiment, each segment endpoint has an associated object identifier value that uniquely identifies the object that the segment partially represents. The object identifier values may be used, for example, to determine which objects are visible in each pixel. In accordance with the present invention, each segment endpoint may have any associated data corresponding to any parameter of the object part that the segment represents.

In a further embodiment, each segment may have a single associated value for an object parameter rather than a pair of associated values for an object parameter, one value being associated with each segment endpoint. By doing so, a piecewise constant approximation of an object parameter is applied to each segment rather than a piecewise linear approximation. This embodiment may be implemented, for example, by associating an object parameter value with only one of the endpoints, t0 or t1, of a segment.

Since most object parameters, such as color and transparency, typically do not vary significantly over the extent of a segment, a piecewise constant approximation would not introduce significant error in the approximation of object parameters. In addition, storing a single value for an object parameter for each segment consumes less memory and processing resources.

In another embodiment, a quadratic approximation of an object parameter may be implemented using three associated values for each segment. Using quadratic interpolation, a quadratic approximation can then be constructed using the three associated values, as is well known in the art. This embodiment may be implemented, for example, by associating a first value with the starting endpoint t0 of a segment, a second value with the ending endpoint t1 of a segment, and a third value with the starting or ending endpoint (t0 or t1) of a segment. The first value may correspond to an object parameter value at the starting endpoint t0 of the segment, the second value may correspond to an object parameter value at the ending endpoint t1 of the segment, and the third value may correspond to an object parameter value at a mid-point between the starting endpoint t0 and the ending endpoint t1 of the segment.

In yet another embodiment, a cubic approximation of an object parameter may be implemented using, for example, four associated values for each segment. By using four associated values for each segment, the four degrees of freedom needed to approximate a cubic function can be provided. Using a cubic interpolation such as Lagrange or Hermite interpolation, a cubic approximation can then be constructed using the four associated values, as is well known in the art.

As another example, a cubic approximation for an object parameter may be implemented by associating a first and second value with the starting endpoint t0 of a segment and by associating a third and fourth value with the ending endpoint t1 of a segment. The first value may correspond to an object parameter value at the starting endpoint t0 of the segment, the second value may correspond to an object parameter value at a one-third point between the starting endpoint t0 and the ending endpoint t1 of the segment, the third value may correspond to an object parameter value at a two-thirds point between the starting endpoint t0 and the ending endpoint t1 of the segment, and the fourth value may correspond to an object parameter value at the ending endpoint t1 of the segment.

Alternatively, a cubic approximation of an object parameter may be implemented using two associated values and two associated derivative values for each segment. Using Hermite interpolation, a cubic approximation can then be constructed using the two associated values and the two associated derivative values, as is well known in the art. As an example, this embodiment may be implemented by associating a first value and a first derivative value with the starting endpoint t0 of a segment and by associating a second value and a second derivative value with the ending endpoint t1 of a segment. The first value may correspond to an object parameter value at the starting endpoint t0 of the segment, the first derivative value may correspond to a derivative of the object parameter value at the starting endpoint t0 of the segment, the second value may correspond to an object parameter value at the ending endpoint t1 of the segment, and the second derivative value may correspond to a derivative of the object parameter value at the ending endpoint t1 of the segment.

Figure 10:
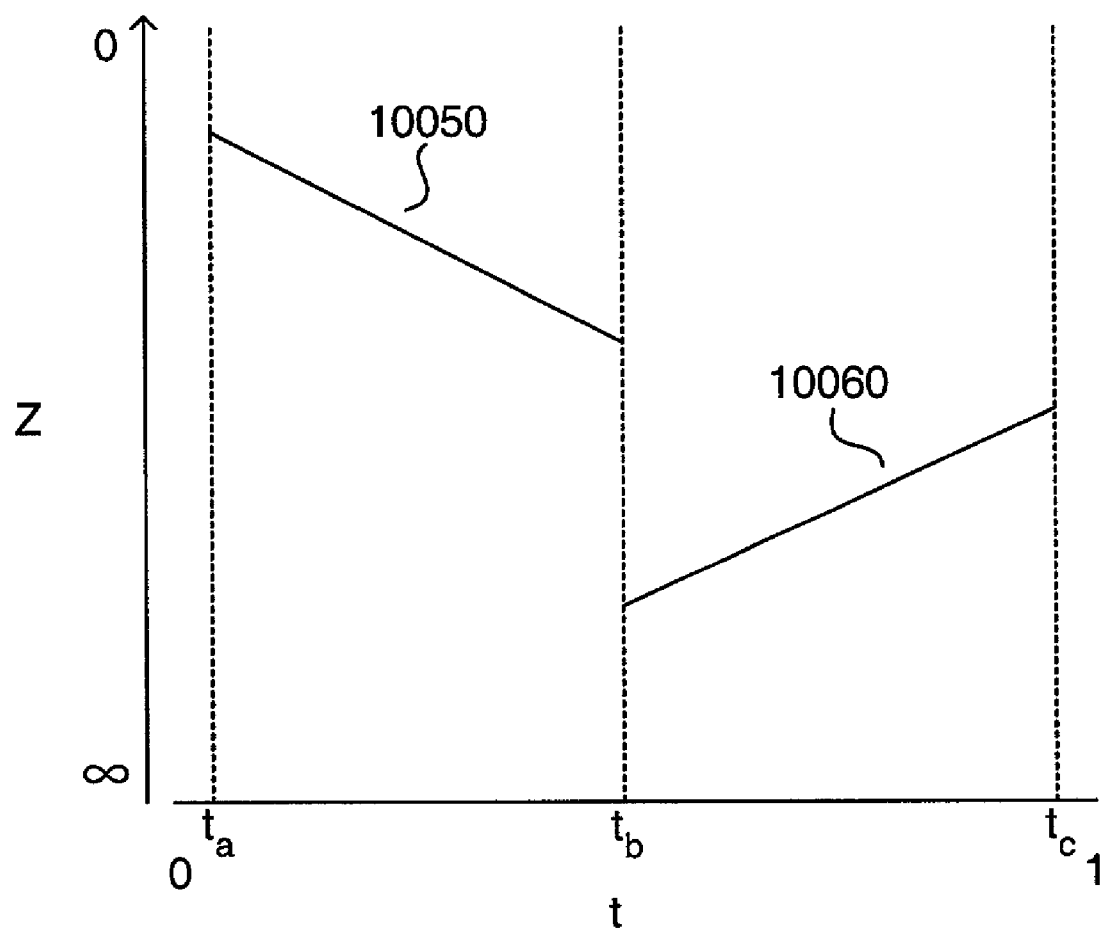
FIG. 10 is a graph showing an example of two segments of a line sample parameterized in t.

FIG. 10 shows a graph of two segments of a line sample parameterized in t where the y axis represents depth (z) from a predefined viewpoint. As shown, a first segment 10050 has a starting endpoint value $t_a$ and an ending endpoint value $t_b$ and spans the t range from $t_a$ to $t_b$. A second segment 10060 has a starting endpoint value $t_b$ and an ending endpoint value $t_c$ and spans the t range from $t_b$ to $t_c$. Throughout its t range, the first segment 10050 has lesser associated depth (z) values compared to the second segment 10060. Therefore, the first segment 10050 represents an object part that is closer to a predefined viewpoint than the second segment 10060.

Storing Data Sets in a Line Tree Data Structure

Figures 11A, 11B:
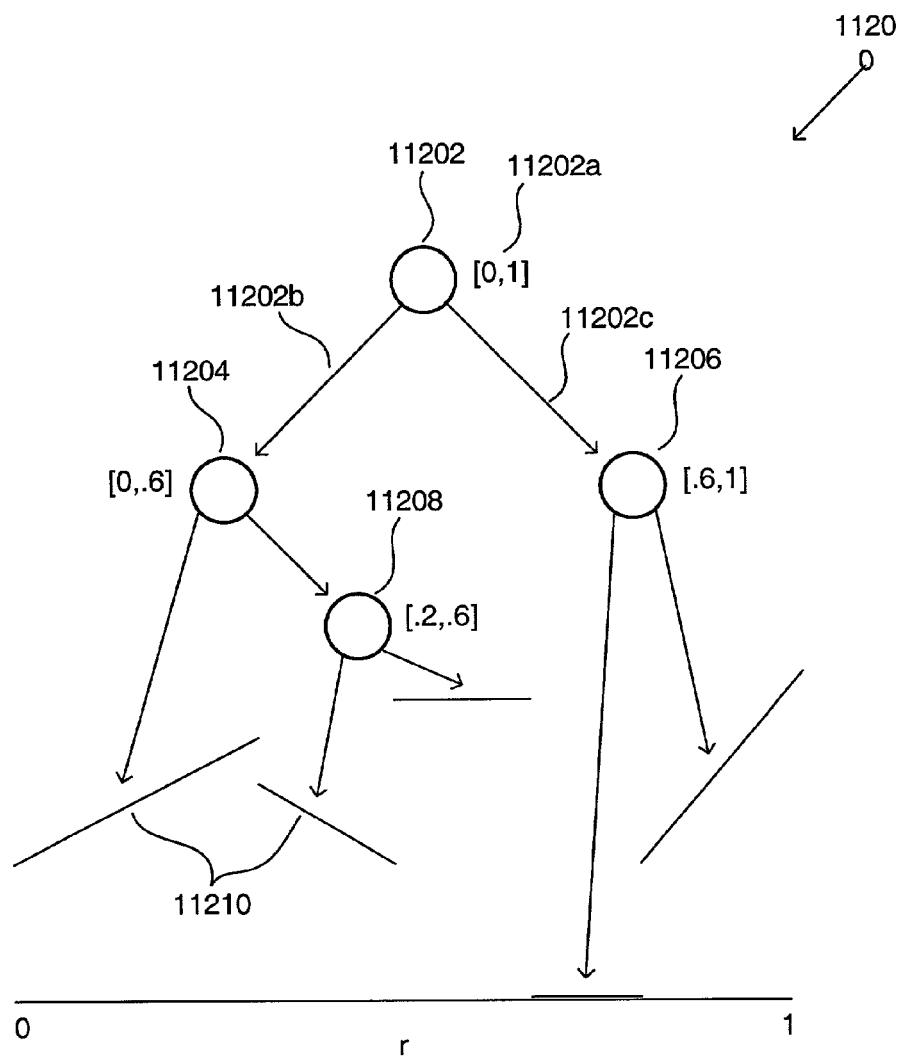
FIG. 11A is a block diagram showing an example of a line tree data structure in accordance with the present invention.
FIG. 11B depicts exemplary data contained in a data set stored in the line tree data structure in accordance with a preferred embodiment.

FIG. 11A shows an example of a line tree data structure 11200 for a line sample in accordance with the present invention. The line tree data structure consists of a root node 11202 and a plurality of subordinate nodes 11204, 11206, 11208, and 11210. A root node is a node without a superordinate node while a subordinate node may be a parent node, a child node, or a leaf node. A parent node contains a subordinate child node. A child node is any node with a parent node and is immediately subordinate to the parent node (i.e., one level below the parent node). Child nodes of a node include any nodes subordinate to the node. A leaf node 11210 stores a data set associated with a specific segment of the line sample.

A data set is stored in a leaf node and is associated with a specific segment of a line sample. In the following discussion, data set and leaf node are used interchangeably. A data set is defined by a range of reference values (®) range) having two endpoints, a starting endpoint reference r0 and an ending endpoint reference r1. The data set is ordered by the starting endpoint reference r0. The data set stores data set values at the starting endpoint reference r0 and the ending endpoint reference r1 including data set values for depth, color, and transparency that correspond to the object parameter values for depth, color, and transparency of the associated segment. The data set also stores a data set depth range that corresponds to the object depth range of the associated segment. The data set depth range spans from the data set value for depth at r0 to the data set value for depth at r1, inclusive.

In a preferred embodiment, the r range of the data set corresponds to the t range of the segment with which the data set is associated. Thus, in the preferred embodiment, the starting endpoint reference r0 of the data set corresponds to the starting endpoint t0 of the associated segment and the ending endpoint reference r1 of the data set corresponds to the ending endpoint t1 of the associated segment. In addition, the data stored at the starting endpoint reference r0 of the data set corresponds to the data related to the starting endpoint t0 of the associated segment and the data stored at the ending endpoint reference r1 of the data set corresponds to the data related to the ending endpoint t1 of the associated segment. Preferably, the data stored at the endpoint references of a data set includes data set values for object parameters such as depth, color, transparency, and depth range. Alternatively, such data may include data set values for object parameters such as reflectivity or an object identifier value. In accordance with the present invention, the values stored at the endpoint references of a data set may also include any values relating to any object parameter of the associated segment.

In a preferred embodiment, each data set stores a pair of values for each object parameter, one value being stored at each endpoint reference, r0 and r1. By storing a pair of values for each object parameter, a linear approximation for each object parameter can be provided.

In an alternative embodiment, a data set may store a single value for each object parameter to provide a constant approximation of the object parameter. This embodiment may be implemented, for example, by storing object parameter values at only the starting endpoint reference r0 of a data set or by storing object parameter values at only the ending endpoint reference r1 of a data set. The single value that is stored for each object parameter may be determined, for example, by taking the average of an object parameter value at the starting endpoint t0 of the associated segment and an object parameter value at the ending endpoint t1 of the associated segment. Alternatively, the single value that is stored for each object parameter may be set to equal an object parameter value at the starting endpoint t0 of the associated segment or may be set to equal an object parameter value at the ending endpoint t1 of the associated segment.

In another embodiment, a data set may store three values for each object parameter to provide a quadratic approximation of the object parameter. This embodiment may be implemented, for example, by storing a first value at the starting endpoint reference r0 of a data set, a second value at the ending endpoint reference r1 of a data set, and a third value at the starting or ending endpoint reference (r0 or r1) of a data set. The first value may correspond to an object parameter value at the starting endpoint t0 of the associated segment, the second value may correspond to an object parameter value at the ending endpoint t1 of the associated segment, and the third value may correspond to an object parameter value at a mid-point between the starting endpoint t0 and the ending endpoint t1 of the associated segment.

In yet another embodiment, a data set may store four values for each object parameter to provide a cubic approximation of the object parameter. This embodiment may be implemented, for example, by storing a first and second value at the starting endpoint reference r0 of a data set and by storing a third and fourth value at the ending endpoint reference r1 of a data set. The first value may correspond to an object parameter value at the starting endpoint t0 of the associated segment, the second value may correspond to an object parameter value at a one-third point between the starting endpoint t0 and the ending endpoint t1 of the associated segment, the third value may correspond to an object parameter value at a two-thirds point between the starting endpoint t0 and the ending endpoint t1 of the associated segment, and the fourth value may correspond to an object parameter value at the ending endpoint t1 of the associated segment.

Alternatively, a cubic approximation of an object parameter may be implemented by storing two associated values and two associated derivative values for each object parameter. This alternative embodiment of the cubic approximation may be implemented, for example, by storing a first value and a first derivative value at the starting endpoint reference r0 of a data set and by storing a second value and a second derivative value at the ending endpoint reference r1 of a data set. The first value may correspond to an object parameter value at the starting endpoint t0 of the associated segment, the first derivative value may correspond to a derivative of the object parameter value at the starting endpoint t0 of the associated segment, the second value may correspond to an object parameter value at the ending endpoint t1 of the associated segment, and the second derivative value may correspond to a derivative of the object parameter value at the ending endpoint t1 of the associated segment.

FIG. 11B depicts exemplary data contained in a data set 11250 stored in a leaf node (11210 of FIG. 11A) of the line tree data structure in accordance with a preferred embodiment. The data set 11250 contains data stored at a starting endpoint reference r0 270 and an ending endpoint reference r1 272. The data set, for example, includes the starting endpoint t0 and ending endpoint t1 values 11252 of the associated segment. The data set also includes data fields relating to the starting endpoint t0 and the ending endpoint t1 of the associated segment such as object parameter values for depth (z) 11254, color 11256, transparency 11258, and depth range 11260. For the transparency data field 11258, a transparency value of 0 indicates that the associated segment is opaque and a transparency value of 1 indicates that the associated segment is completely transparent. For the depth range data field 11260, the depth range values span from the depth value at the starting endpoint t0 of the associated segment to the depth value at ending endpoint t1 of the associated segment, inclusive. In an alternative embodiment, three values may be stored for the color data field 11256, for example, as a red-green-blue alpha triplet, at each data set endpoint reference rather than a single value being stored for color at each data set endpoint reference.

Referring back to FIG. 11A, except for leaf nodes, each node of the tree is represented as a circle that stores the r range 11202a (shown in brackets) spanned by all the child nodes of the node as well as pointers 11202b, 11202c to its child nodes.

Retrieving Targeted Data Sets from the Line Tree Data Structure

Given a group of data sets previously stored in a line tree data structure (hereinafter referred to as a group of old data sets), the line tree data structure must then be updated as new objects are projected onto the image plane. When it is determined that a new object part overlaps all or a portion of a particular line sample, a new segment(s) that represents the object part and a primary new data set(s) associated with the new segment is generated. If the new segment and the primary new data set overlap any old data sets stored in the line tree data structure, the overlapped old data sets may need to be updated. As used herein, a segment is said to overlap a data set in the line tree data structure if the segment contains a t range that overlaps the r range of the data set. Also as used herein, a first data set is said to overlap a second data set in the line tree data structure if the first data set contains an r range that overlaps the r range of the second data set.

Any old data sets that overlap the primary new data set are designated as targeted data sets. For each targeted data set, a secondary new data set is created from the primary new data set, the secondary new data set spanning only the r range of the primary new data set that overlaps the targeted data set (as described below). After a secondary new data set is created, it is compared to its corresponding targeted data set. Depending on the results of the comparison, the targeted data set remains in the line tree data structure unchanged, the secondary new data set replaces the targeted data set, or modified data sets are required to be created and inserted into the line tree data structure.

Figure 12:
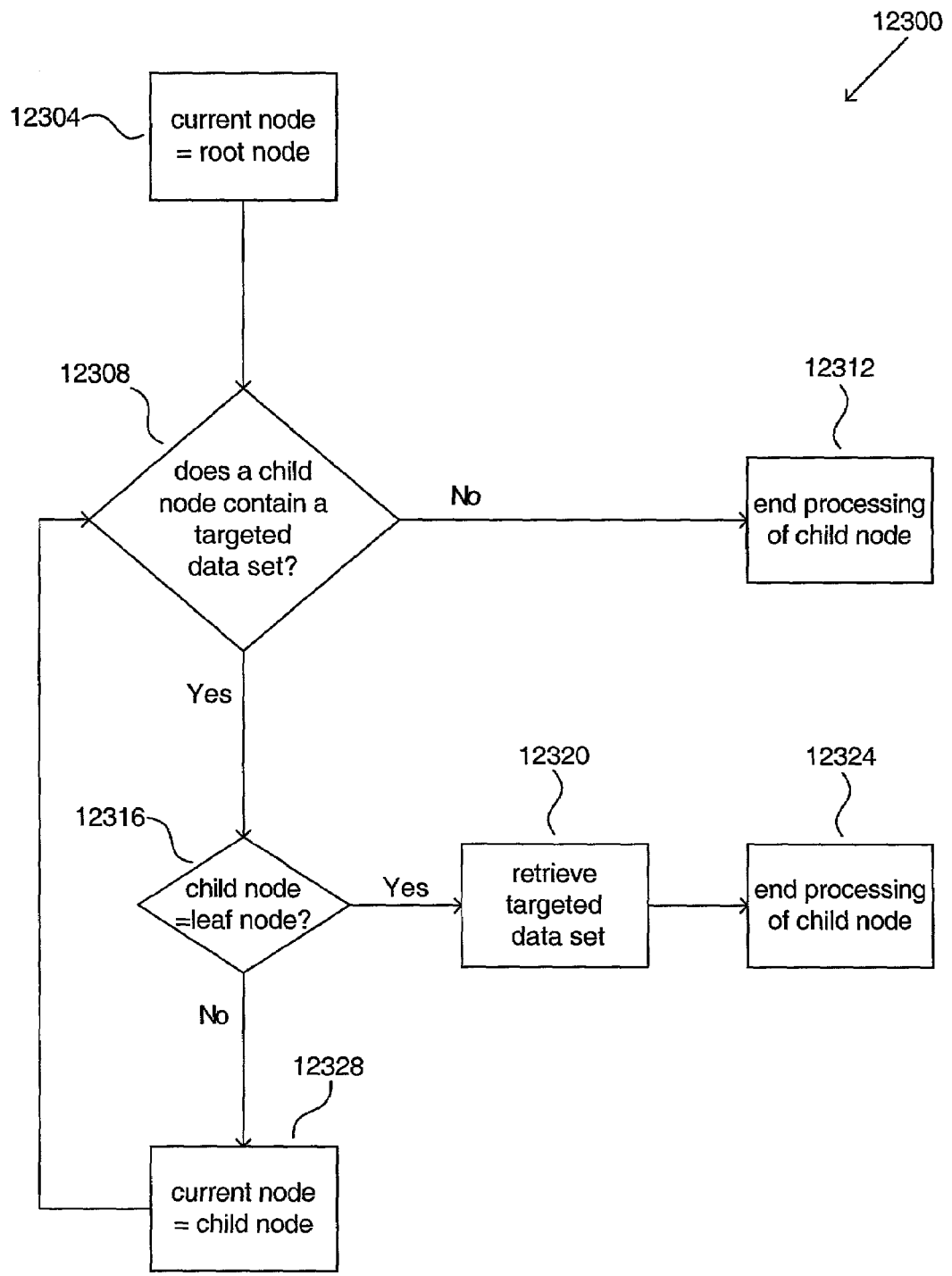
FIG. 12 is a flow chart of a data set retrieval procedure that locates and retrieves targeted data sets in accordance with the present invention.

Before any comparisons between a secondary new data set and a targeted data are made, however, the targeted data sets should first be located and retrieved from the line tree data structure. FIG. 12 shows a flow chart of a data set retrieval procedure 12300 that locates and retrieves targeted data sets. The data set retrieval procedure 12300 begins by setting the root node of the line tree data structure as an initial current node at step 12304. Using the r range stored in the child node, each child node of a current node is checked to determine whether the child node contains any targeted data sets at step 12308. If the child node does not contain any targeted data sets (i.e., the child node does not contain any old data sets that overlap the primary new data set), processing of that child node ends at step 12312. Otherwise, the child node is checked to determine if it is a leaf node at step 12316.

If the child node is a leaf node, a targeted data set has been located. Therefore, the targeted data set stored in the leaf node is retrieved at step 12320 and processing of the child node ends at step 12324. If the child node is not a leaf node (step 12316—No), the child node is set as a current node at step 12328 and processing of the current node continues at step 12308.

The processing shown in steps 12308 to 12328 is completed for each child node of a current node until all targeted data sets have been located and retrieved.

Updating the Line Tree Data Structure

Having located and retrieved all targeted data sets, a secondary new data set is then created from the primary new data set for each targeted data set. A secondary new data set spans only the r range of the primary new data set that overlaps the corresponding targeted data set. If the primary new data set has an r range that is a superset of the r range of a targeted data set, the r range of the corresponding secondary new data set spans the entire r range of the targeted data set. If the r range of the primary new data set does not completely span the r range of a targeted data set, the r range of the corresponding secondary new data set does not span the entire r range of the targeted data set but only spans the r range of the targeted data set that is overlapped by the primary new data set.

For example, if the primary new data set has an r range [0.2, 0.6] and a targeted data set has an r range [0.3, 0.4], the primary new data set has an r range that is a superset of the r range of the targeted data set. The r range of the corresponding secondary new data set, therefore, would be [0.3, 0.4]. On the other hand, if the r range of a targeted data set is [0.1, 0.4], the r range of the primary new data set would not completely span the r range of the targeted data set. The r range of the corresponding secondary new data set, therefore, would be [0.2, 0.4].

The r range assigned to a secondary new data set also provides the secondary new data set with a starting endpoint reference r0 and an ending endpoint reference r1. The secondary new data set also stores data at the starting endpoint reference r0 and the ending endpoint reference r1 including object parameter values for depth, color, transparency, and depth range (which spans from the depth value at the starting endpoint reference r0 to the depth value at the ending endpoint reference r1, inclusive).

The object parameter values at the endpoint references of the secondary new data set can be determined, for example, from the object parameter values at the endpoints of the associated new segment or the object parameter values at the endpoint references of the primary new data set using linear interpolation techniques. Alternatively, other interpolation techniques may be used depending on the type of approximation applied to the object parameters. For example, quadratic interpolation may be used to determine object parameter values at the endpoint references of the secondary new data set if a quadratic approximation has been applied to the object parameters, or a cubic interpolation, such as Lagrange or Hermite interpolation, may be used if a cubic approximation has been applied to the object parameters. If a constant approximation has been applied to the object parameters, then no interpolation technique would be required since the object parameter values at the endpoint references of the secondary new data set can simply be set to equal the object parameter values at the endpoints of the associated new segment or the endpoint references of the primary new data set.

In a preferred embodiment, the depth-range data fields (11260 of FIG. 11B) of a targeted data set and a corresponding secondary new data set are compared. The depth range data field is designated as a determining data field. The comparison of the depth range values between a targeted data set and a corresponding secondary new data set is done over the targeted data set's entire r range (from r0 to r1).

In a preferred embodiment, the line tree data structure stores only one data set for a given r range based on a comparison of the determining data field of any data sets overlapping the given r range. The preferred embodiment pertains to data sets associated with opaque segments. A general rule for data sets associated with opaque segments is that a first data set with a lower depth range is retained in the line tree data structure over a second data set with a higher depth range when the first and second data sets contain overlapping r ranges.

If the first data set contains a lower depth range than the second data set, the first data set represents an object part that is closer to a predefined viewpoint than an object part represented by the second data set. Therefore, if the first data set contains a lower depth range than the second data set, first data set is said to occlude the second data set. If the first data set contains a lower depth range than the second data set throughout the second data set's entire r range, the first data set is said to fully occlude the second data set. If a first data set fully occludes a second data set, this indicates that no portion of the object part represented by second data set is visible. If a first data set occludes a second data set through only a portion of the second data set's r range, the first data set is said to partially occlude the second data set. If a first data set partially occludes a second data set, this indicates that a portion of the object part represented by second data set is still visible. In a preferred embodiment, the line tree data structure only stores data sets that are not occluded by other data sets.

FIGS. 13A, 13B, 13C, 14A, 14B, and 14C depict examples of possible situations (left side) and results (right side) that can arise from a depth range field comparison. In FIGS. 13A, 13B, 13C, 14A, 14B, and 14C, the secondary new data set is represented by a dashed line and the targeted data set is represented by a solid line.

Figure 13A:
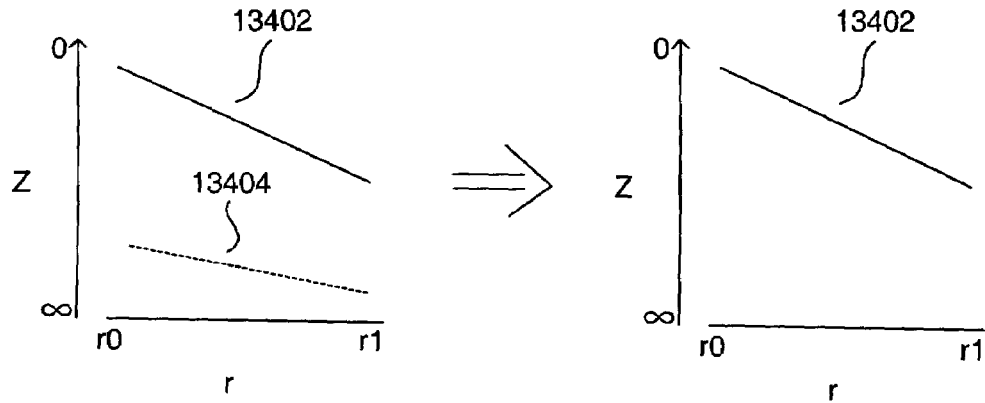
FIG. 13A is a graph showing an example where an r range of a secondary new data set spans the entire r range of a targeted data set and the targeted data set fully occludes the secondary new data set.
Figure 13B:
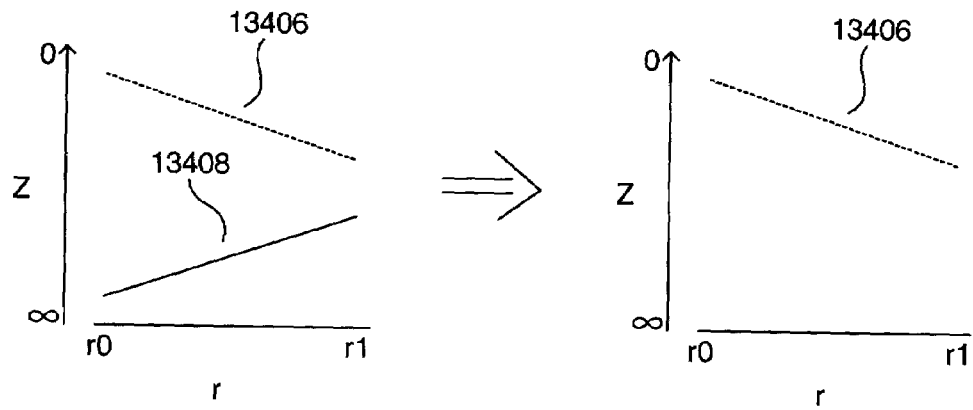
FIG. 13B is a graph showing an example where an r range of a secondary new data set spans the entire r range of a targeted data set and the secondary new data set fully occludes the targeted data set.
Figure 13C:
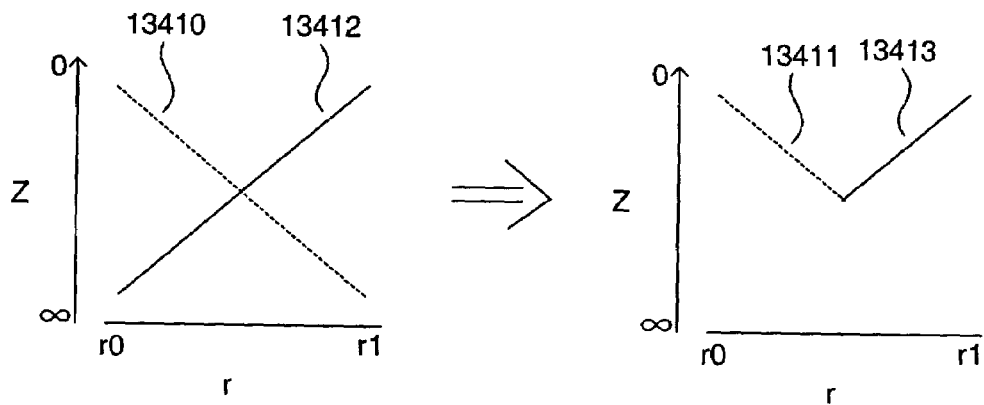
FIG. 13C is a graph showing an example where an r range of a secondary new data set spans the entire r range of a targeted data set and neither the targeted data set nor the secondary new data set fully occludes the other.

FIGS. 13A, 13B, and 13C show examples where the r range of the secondary new data set spans the entire r range of the targeted data set.

In FIG. 13A, the targeted data set 13402 fully occludes the secondary new data set 13404. Therefore, the targeted data set 13402 remains in the line tree data structure and the secondary new data set 13404 is discarded.

In FIG. 13B, the secondary new data set 13406 fully occludes the targeted data set 13408. Therefore, the secondary new data set 13406 replaces the targeted data set 13408 in the line tree data structure.

In FIG. 13C, the secondary new data set 13410 and the targeted data set 13412 contain intersecting depth ranges and therefore neither data set fully occludes the other. In this situation, a modified new data set 13411 and a modified targeted data set 13413 are created and inserted into the line tree data structure. The modified new data set 13411 and the modified targeted data set 13413 contain only the r range portions of the secondary new data set 13410 and the targeted data set 13412, respectively, that are not occluded.

Figure 14A:
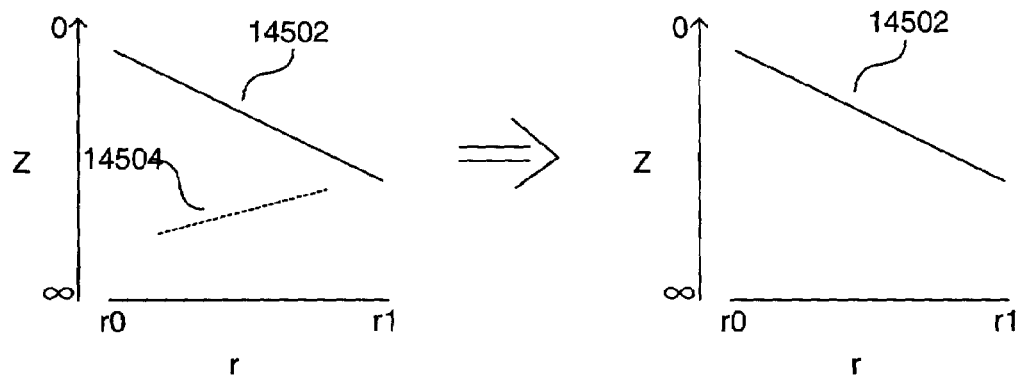
FIG. 14A is a graph showing an example where an r range of a secondary new data set does not span the entire r range of a targeted data set and the targeted data set fully occludes the secondary new data set.
Figure 14B:
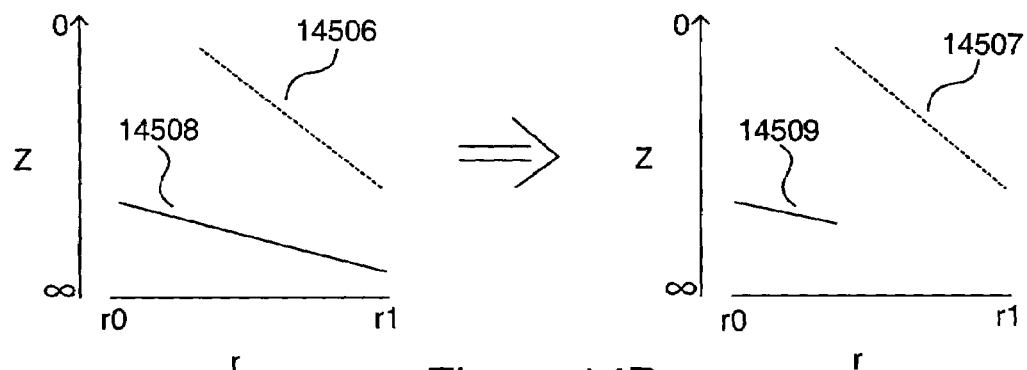
FIG. 14B is a graph showing an example where an r range of a secondary new data set does not span the entire r range of a targeted data set and the secondary new data set partially occludes the targeted data set.
Figure 14C:
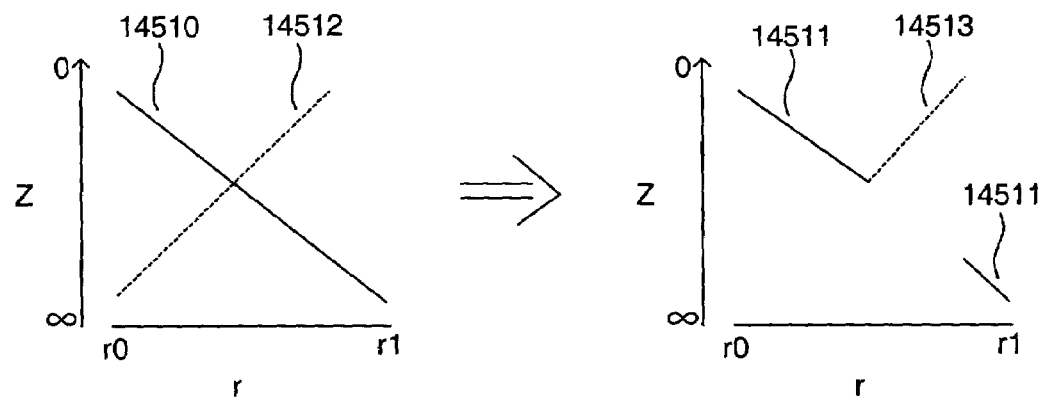
FIG. 14C is a graph showing an example where an r range of a secondary new data set does not span the entire r range of a targeted data set and neither the targeted data set nor the secondary new data set fully occludes the other.

FIGS. 14A, 14B, and 14C show examples where the r range of the secondary new data set does not span the entire r range of a targeted data set.

In FIG. 14A, the targeted data set 14502 fully occludes the secondary new data set 14504. Therefore, the targeted data set 14502 remains in the line tree data structure and the secondary new data set 14504 is discarded.

In FIG. 14B, the secondary new data set 14506 partially occludes the targeted data set 14508. Therefore, a modified new data set 14507 and a modified targeted data set 14509 are created and inserted into the line tree data structure. The modified new data set 14507 and the modified targeted data set 14509 contain only the r range portions of the secondary new data set 14506 and the targeted data set 14508, respectively, that are not occluded.

In FIG. 14C, the secondary new data set 14512 and the targeted data set 14510 contain intersecting depth ranges and therefore neither data set fully occludes the other. Therefore, a modified new data set 14513 and modified targeted data sets 14511 are created and inserted into the line tree data structure. The modified new data set 14513 and the modified targeted data sets 14511 contain only the r range portions of the secondary new data set 14512 and the targeted data set 14510, respectively, that are not occluded.

Figure 15:
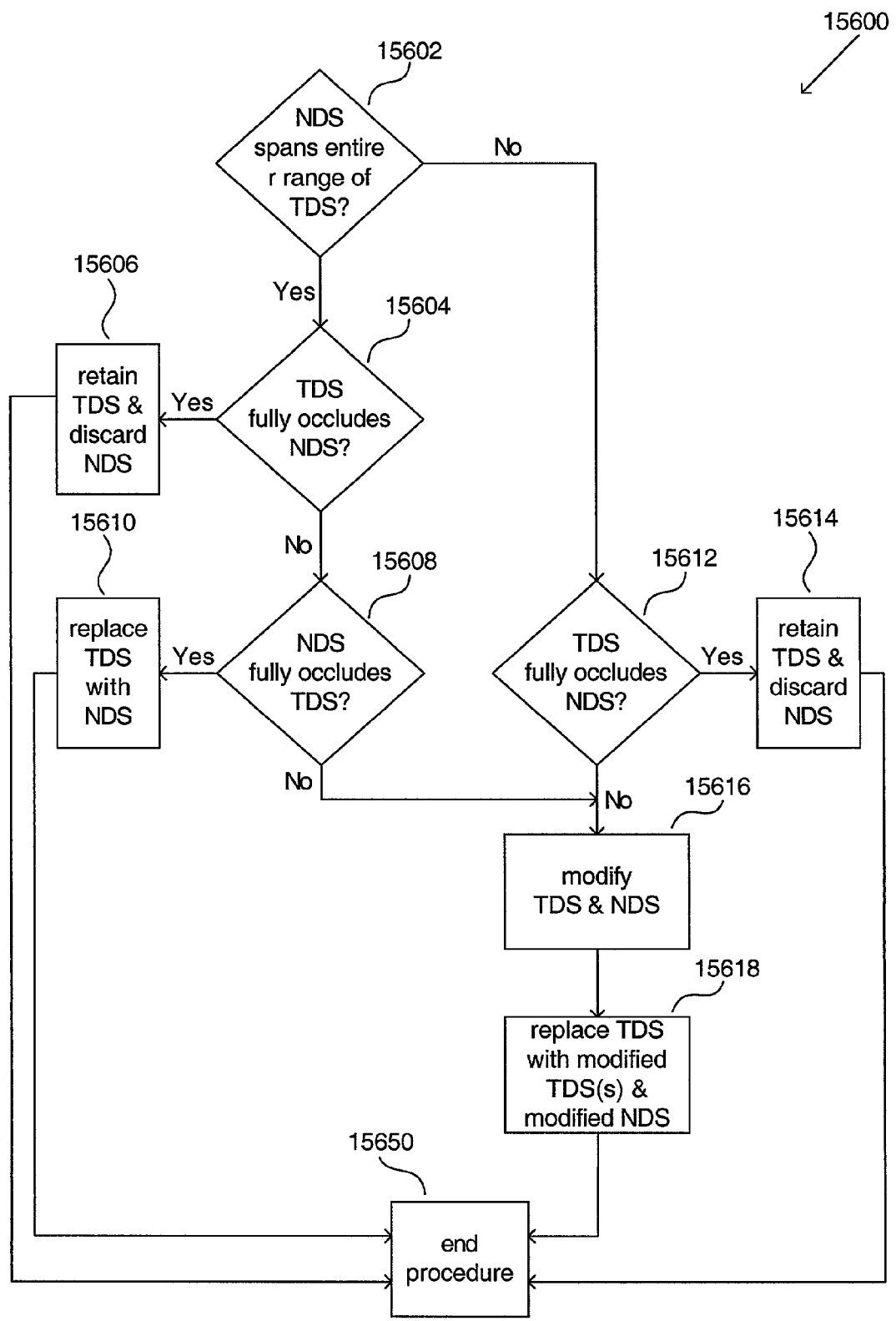
FIG. 15 is a flow chart of a data set update procedure used to update data sets in the line tree data structure in accordance with the present invention.

FIG. 15 shows a flow chart illustrating a data set update procedure 15600 used to update data sets in the line tree data structure in accordance with the present invention. The data set update procedure 15600 is used to compare a targeted data set with a corresponding secondary new data set and update the line tree data structure accordingly. The data set update procedure 15600 begins by determining, at step 15602, whether the r range of the secondary new data set (NDS) spans the entire r range of the targeted data set (TDS). If so, it is then determined, at step 15604, if the targeted data set fully occludes the secondary new data set (as shown in FIG. 13A). If so, the targeted data set is retained in the line tree data structure and the secondary new data set is discarded at step 15606 and the procedure ends at step 15650.

If the targeted data set does not fully occlude the secondary new data set (step 15604—No), it is determined if the secondary new data set fully occludes the targeted data set (as shown in FIG. 13B) at step 15608. If so, the secondary new data set replaces the targeted data set in the line tree data structure at step 15610 and the procedure ends at step 15650. In embodiments employing a balanced line tree data structure, additional steps are taken after step 15610—such as steps for balancing tree data structures described in T. Cormen, et al., Introduction to Algorithms, MIT Press, 1990, incorporated herein by reference.

If the secondary new data set does not fully occlude the targeted data set (step 15608—No), the targeted data set and the secondary new data set are modified to create a modified targeted data set and a modified new data set at step 15616. It should be noted that reaching step 15616 in the data update procedure 15600 indicates that a situation such as one the shown in FIGS. 13C, 14B, or 14C has occurred. Reaching step 15616 through step 15608 indicates that a situation such as the one shown in FIG. 13C has occurred: the secondary new data set and the targeted data set contain intersecting depth ranges and therefore neither data set fully occludes the other.

In step 15616, a modified targeted data set is created by reducing the r range of the targeted data set by removing the portion of the r range that is occluded by the secondary new data set. Likewise, a modified new data set is created by reducing the r range of the secondary new data set by removing the portion of the r range that is occluded by the targeted data set. The reduced r ranges for the modified targeted data set and the modified new data set have a starting endpoint reference r0 and an ending endpoint reference r1. The modified targeted data set and modified new data set both store data at each endpoint reference such as object parameter values for depth, color, transparency, and depth range.

The object parameter values at the endpoint references of the modified targeted data set and the modified new data set can be calculated from the object parameter values at the endpoint references of the targeted data set and the secondary new data set, respectively, using linear interpolation. Alternatively, other interpolation techniques may be used depending on the type of approximation applied to the object parameters. For example, quadratic interpolation may be used to determine object parameter values at the endpoint references if a quadratic approximation has been applied to the object parameters, or a cubic interpolation, such as Lagrange or Hermite interpolation, may be used if a cubic approximation has been applied to the object parameters. If a constant approximation has been applied to the object parameters, then no interpolation technique would be required since the object parameter values at the endpoint references of the modified targeted data set and the modified new data set can simply be set to equal the object parameter values at the endpoint references of the targeted data set and the secondary new data set, respectively.

The targeted data set is then replaced by the modified targeted data set and the modified new data set in the line tree data structure at step 15618 and the procedure ends at step 15650. In embodiments employing a balanced line tree data structure, additional steps are taken after step 15618—such as steps for balancing tree data structures described in T. Cormen, et al., Introduction to Algorithms, MIT Press, 1990.

If the r range of the secondary new data set does not span the entire r range of the targeted data set (step 15602—No), it is then determined if the targeted data set fully occludes the secondary new data set (as shown in FIG. 14A) at step 15612. If so, the targeted data set remains in the line tree data structure and the secondary new data set is discarded at step 15614 and the procedure ends at step 15650.

If the targeted data set does not fully occlude the secondary new data set (step 15612—No), the targeted data set and the secondary new data set are modified to create a modified targeted data set and a modified new data set at step 15616. It should be noted that by reaching step 15616 through step 15612 in the data update procedure 15600, a situation such as the one shown in FIG. 14B or FIG. 14C has occurred. In the situation shown in FIG. 14B, the secondary new data set partially occludes the targeted data. In the situation shown in FIG. 14C, the secondary new data set and the targeted data set contain intersecting depth ranges and therefore neither data set fully occludes the other.

In either situation shown in FIG. 14B and FIG. 14C, the targeted data set and the secondary new data set are modified to create a modified targeted data set and a modified new data set (as described above). In creating the modified targeted data set and the modified new data set in step 15616, for purposes of determining occlusion, the depth value for the secondary new data set is considered to be infinity for the r range portions of the targeted data set not overlapped by the secondary new data set.

If the modified targeted data set contains a noncontinuous range of r values (as shown in FIG. 14C), then two modified targeted data sets are created so that each modified targeted data set contains a continuous range of r values. For example, if the r range of a targeted data set was reduced from [0.3, 0.9] to two noncontinuous r ranges, [0.3, 0.6] and [0.8, 0.9], a first modified targeted data set with an r range of [0.3, 0.6] and a second modified targeted data set with an r range of [0.8, 0.9] would be created.

The targeted data set is then replaced by the modified targeted data set(s) and the modified new data set in the line tree data structure at step 15618 and the procedure ends at step 15650.

Line Tree Data Structure Performance

The line tree data structure allows data sets to be stored, retrieved, and updated efficiently. In the worst case, a primary new data set overlaps all old data sets stored in the line tree data structure thereby requiring processing of all the old data sets to update the line tree data structure. If the line tree data structure remains balanced (not all embodiments of the present invention require balanced line tree data structures), certain guarantees can be made about the worst-case time behavior for performing operations on the line tree data structure. A general background on balanced binary trees can be found, for example, in T. Cormen, et al., Introduction to Algorithms, Chapter 13: "Binary Search Trees", MIT Press, 1990.

The efficiency or performance of the line tree data structure can be measured by the time required to insert a new data set into the line tree data structure. For the following description of performance, it should be appreciated that the notation O( ) is used to explain the growth of complexity in the computer science field and is well known in the art. If the line tree data structure uses O(n) storage and can be constructed in O(n log n) time, standard balanced tree algorithms guarantee that the time required to update the tree is O(k+log n) where n is the total number of data sets in the line tree data structure and k is the number of targeted data sets, i.e., the number of old data sets that overlap the new data set. This performance result shows that the line tree data structure is output-sensitive: the running time to update the line tree data structure is closely tied to the number of old data sets that overlap the new data set.

There is a logarithmic relationship between the time required to update the line tree data structure and the total number of data sets stored in the line tree data structure. For example, if it took 1 unit of time to update a line tree data structure containing 8 total data sets, it may take 3 units of time to update the line tree data structure if it contained 32 total data sets and just 7 units of time to update the line tree data structure if it contained 1024 total data sets.

Compared to a conventional linked list, the line tree data structure is more efficient at updating data sets. For conventional linked lists, there is a linear relationship between the time required to update the linked list and the total number of data sets stored in the linked list. For example, if it took 1 unit of time to update a conventional linked list containing 8 total data sets, it would take 4 units of time to update the linked list if it contained 32 total data sets and take 128 units of time to update the linked list if it contained 1024 total data sets.

A further description on the performance of line tree data structures can be found, for example, in M. de Berg, et al., Computational Geometry: Algorithms and Applications, pages 94–97, Springer, Berlin, 2000, incorporated herein by reference.

Improving Line Tree Data Structure Performance

Figure 16A:
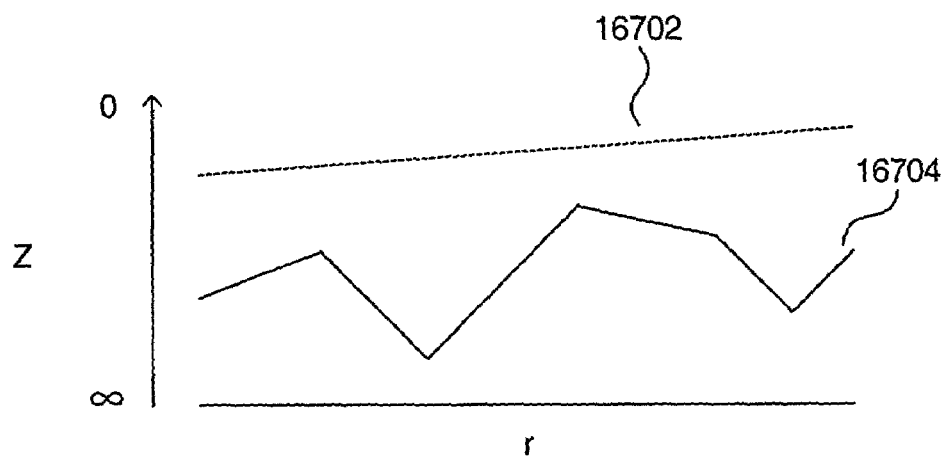
FIG. 16A shows a graph where a portion of a primary new data set occludes a contiguous series of old data sets.
Figure 16B:
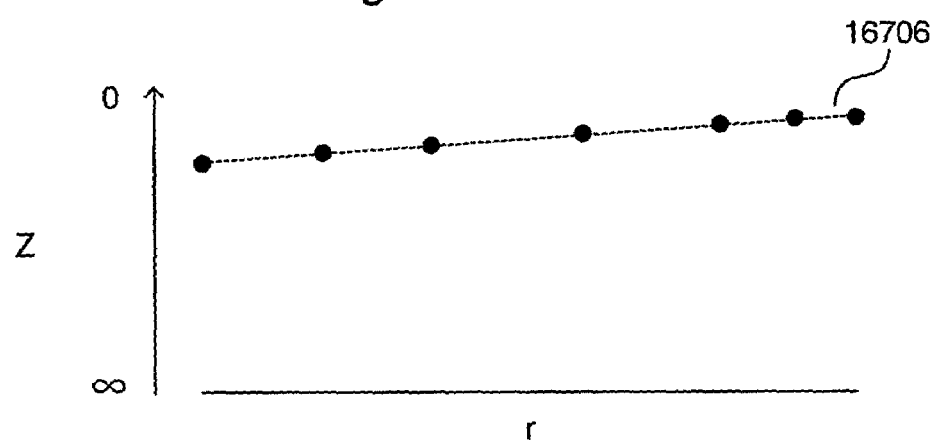
FIG. 16B is a graph showing an application of the data set update procedure of the present invention to the situation shown in FIG. 16A.

Although data sets stored in the line tree data structure can be efficiently retrieved and updated in the embodiments described above, there are certain situations where the performance of the line tree data structure is better in preferred embodiments of the present invention. FIG. 16A shows a graph where a portion of a primary new data set 16702 (dashed) overlaps and occludes a contiguous series of targeted data sets 16704 (solid). FIG. 16B shows the results of the data set update procedure (15600 of FIG. 15) as applied to the situation shown in FIG. 16A. In accordance with the data set update procedure (15600 of FIG. 15), a secondary new data set is created and stored for each targeted data set. As a result, a large number of secondary new data sets 16706 (the endpoint references of each secondary new data set being marked by black dots) are stored in the line tree data structure. As such, application of the data set update procedure (15600 of FIG. 15) to the situation shown in FIG. 16A leads to unnecessary memory usage.

Figure 16C:
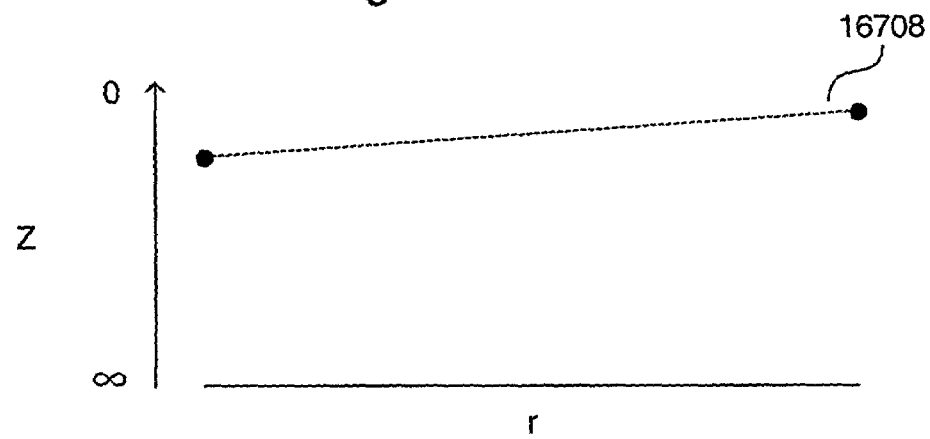
FIG. 16C is a graph showing an application of an alternative embodiment to the situation shown in FIG. 16A.

In the preferred embodiments, when a primary new data set or a portion a primary new data set overlaps and occludes a contiguous series of targeted data sets, the contiguous series of targeted data sets is merged into a single secondary new data set. The single secondary new data set is then inserted into the line tree data structure and the contiguous series of targeted data sets is discarded. By doing so, the overall running time and memory usage of the line tree data structure is improved. FIG. 16C shows an application of this alternative embodiment whereby the contiguous series of targeted data sets is merged into a single secondary new data set 16708.

Figure 17A:
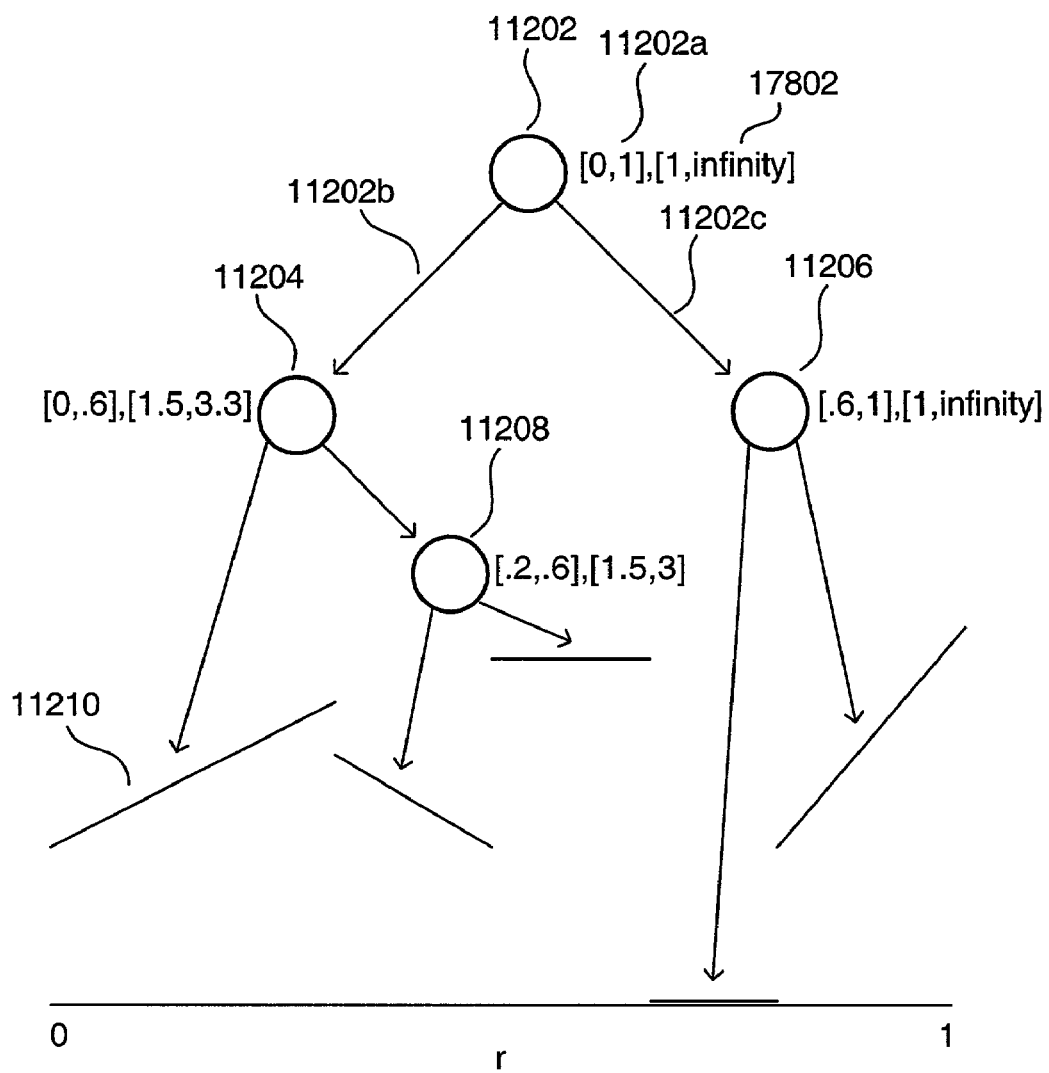
FIG. 17A shows an augmented version of the line tree data structure shown in FIG. 11A in accordance with an alternative embodiment of the present invention.

The performance of the line tree data structure is also better in preferred embodiments of the present invention because additional information is stored at the nodes of the line tree data structure, which increases the efficiency of data set retrieval and updating. In some of these preferred embodiments, the nodes of the line tree data structure are augmented with additional data fields such as the depth range field. FIG. 17A shows such an augmented version of the line tree data structure shown in FIG. 11A. As shown in FIG. 17A, each node of the line tree data structure stores the depth range 17802 spanned by the child nodes of the node (shown in a second set of brackets) in addition to the r range 11202a spanned by the child nodes of the node (shown in a first set of brackets). If part of the r range beneath a node is not overlapped by a data set, the high end of the depth range is set to infinity for that node.

By augmenting the nodes of the line tree data structure with depth ranges, targeted data sets can be retrieved more efficiently and the line tree data structure can be updated more efficiently. For example, after a primary new data set is generated, targeted data sets in the line tree data structure need to be retrieved and compared to the primary new data set. In retrieving the targeted data sets in the line tree data structure, the primary new data set's minimum depth value may be compared with the maximum depth value of a node of the line tree data structure. If the maximum depth value of the node is less than the minimum depth value of the primary new data set, it can be immediately determined that all of the child nodes of the node occlude the primary new data set. Therefore, further processing of the node is not needed and retrieval of any targeted data sets contained under the node can be avoided. In addition, comparison of any targeted data sets contained under the node to corresponding secondary new data sets can also be avoided. As such, the processing time and processing resources required to retrieve targeted data sets from a line tree data structure can be reduced.

In retrieving the targeted data sets in the line tree data structure, the primary new data set's maximum depth value may also be compared with the minimum depth value of a node. If the primary new data set's maximum depth value is less than the minimum depth value of the node, it can be immediately determined that the primary new data set occludes all of the child nodes of the node. Therefore, all targeted data sets contained under the node can be retrieved from the line tree data structure at once without having to locate and retrieve each such targeted data set individually. As such, the processing time and processing resources required to retrieve targeted data sets from a line tree data structure can be further reduced.

In a further embodiment, if the primary new data set's maximum depth value is determined to be less than the minimum depth value of a child node (i.e., the primary new data set occludes all of the child nodes of a child node), the targeted data sets contained under the child node may be automatically replaced in the line tree data structure by corresponding secondary new data sets. This would avoid the extra processing time of the data set update procedure (15600 of FIG. 15) for those targeted data sets.

Figure 17B:
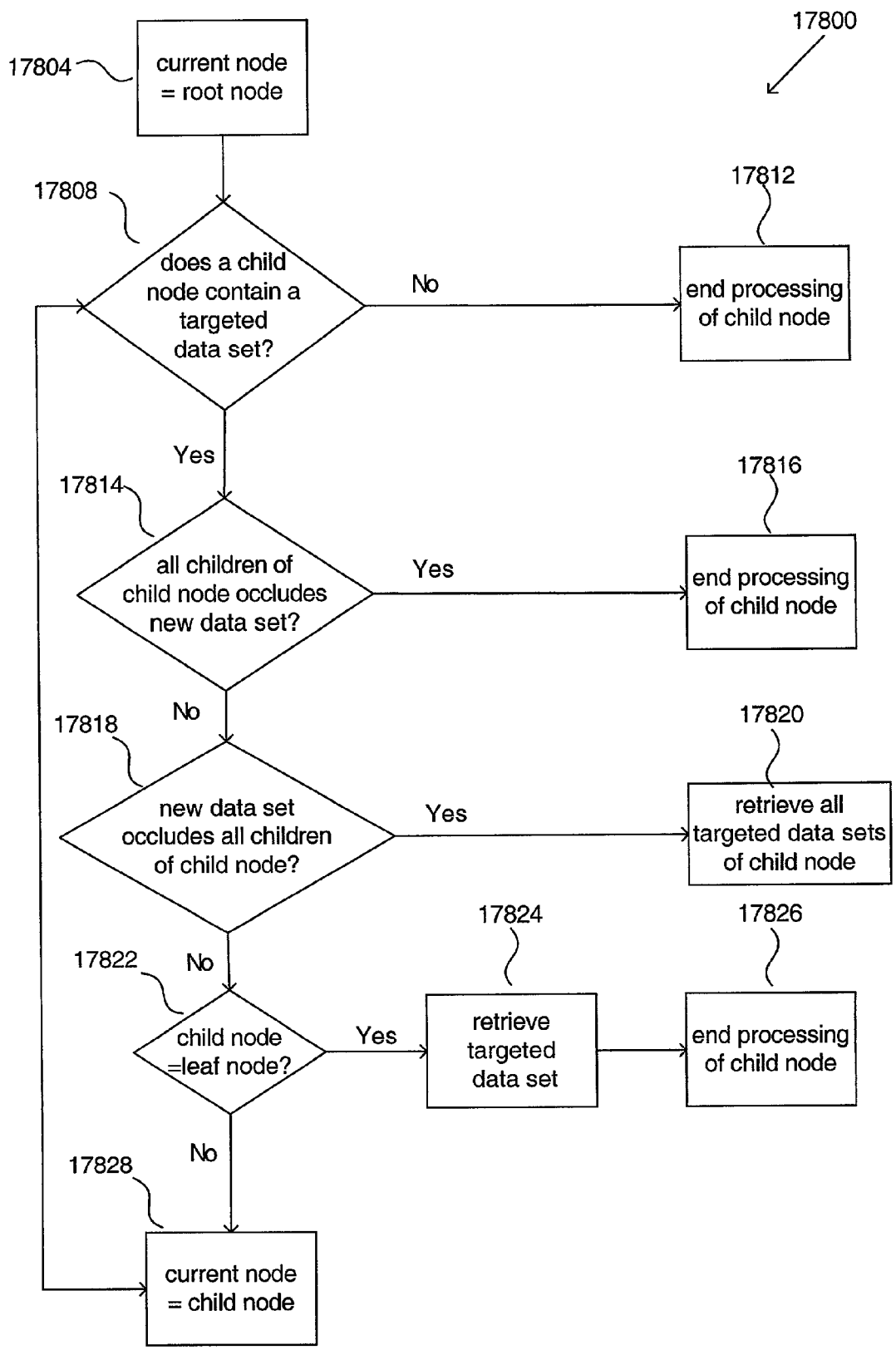
FIG. 17B is a flow chart of an alternative data set retrieval procedure for an augmented version of the line tree data structure as shown in FIG. 17A.

FIG. 17B shows a flow chart of a data set retrieval procedure 17800 in preferred embodiments of the present invention. The data set retrieval procedure 17800 is used with a line tree data structure containing nodes that store the r range and the depth range spanned by their child nodes. The data set retrieval procedure 17800 may be used to locate and retrieve targeted data sets in the line tree data structure shown in FIG. 17A.

The data set retrieval procedure 17800 begins by setting the root node of the line tree data structure as an initial current node at step 17804. Using the r ranges stored in the nodes, each child node of a current node is checked to determine whether the child node contains any targeted data sets at step 17808. If the child node does not contain any targeted data sets (i.e., the child node does not contain any old data sets that overlap the primary new data set), processing of that child node ends at step 17812. Otherwise, using the depth range stored in the child node, the primary new data set's minimum depth value is compared with the maximum depth value of the child node at step 17814.

At step 17814, it is determined that all the child nodes of the child node occludes the primary new data set if the maximum depth value of the child node is less than the minimum depth value of the primary new data set. If all the child nodes of the child node occlude the primary new data set, processing of that child node ends at step 17816. Otherwise, the primary new data set's maximum depth value is compared with the minimum depth value of the child node at step 17818.

At step 17818, it is determined that the primary new data set occludes all the child nodes of the child node if the maximum depth value of the primary new data set is less than the minimum depth value of the child node. If the primary new data set occludes all the child nodes of the child node, all targeted data sets contained under the child node are retrieved at step 17820. Otherwise, the child node is checked to determine if it is a leaf node at step 17822.

If the child node is a leaf node, this indicates that a targeted data set has been located. Therefore, the targeted data set stored in the leaf node is retrieved at step 17824 and processing of the child node ends at step 17826. If the child node is not a leaf node (step 17822—No), the child node is set as a current node at step 17828 and processing of the current node continues at step 17808. The processing shown in steps 17808 to 17828 is completed for each child node of a current node.

Fixed Number of Sub-Regions for a Line Sample

In an alternative embodiment, each line sample is divided into a fixed number of sub-regions (e.g., with t ranges [0, 0.2], [0.2, 0.4], [0.4, 0.6], [0.6, 0.8], and [0.8, 1]), where each sub-region is defined by a fixed starting endpoint and a fixed ending endpoint. If there is a limited amount of memory for representing the line tree data structure, dividing a line sample into a fixed number of sub-regions will reduce memory usage. Hardware applications implementing a line tree data structure, in particular, may have a limited amount of memory to represent the line tree data structure.

For each sub-region of a line sample, the line tree data structure stores a fixed data set spanning an r range corresponding to the t range of the associated sub-region (e.g., with r ranges [0, 0.2], [0.2, 0.4], [0.4, 0.6], [0.6, 0.8], and [0.8, 1]). A fixed data set of a particular line sample sub-region is defined by a fixed starting endpoint reference and a fixed ending endpoint reference. Object parameter values for an associated segment having a t range within the particular line sample sub-region are stored at the fixed starting endpoint reference and the fixed ending endpoint reference. The data set values stored at the fixed starting endpoint reference and the fixed ending endpoint reference of the fixed data set correspond to the object parameter values of the line sample at the fixed starting endpoint and the fixed ending endpoint, respectively, of the particular line sample sub-region.

Alternatively, the fixed data sets may be stored in a single-array data structure, which is a special type of a line tree data structure. More specifically, a single-array data structure is a line tree data structure comprising just leaf nodes. In embodiments employing these types of line tree data structures, the fan-out from the root node (the one and only parent node), varies from 2 to infinity (theoretically).

Preferably, the single-array data structure has a predefined number of fixed data sets, the fixed data sets spanning an r range corresponding to the t ranges of the sub-regions of the line sample. The advantages of a single-array data structure are its simplicity and ease of implementation in hardware.

Figure 18A:
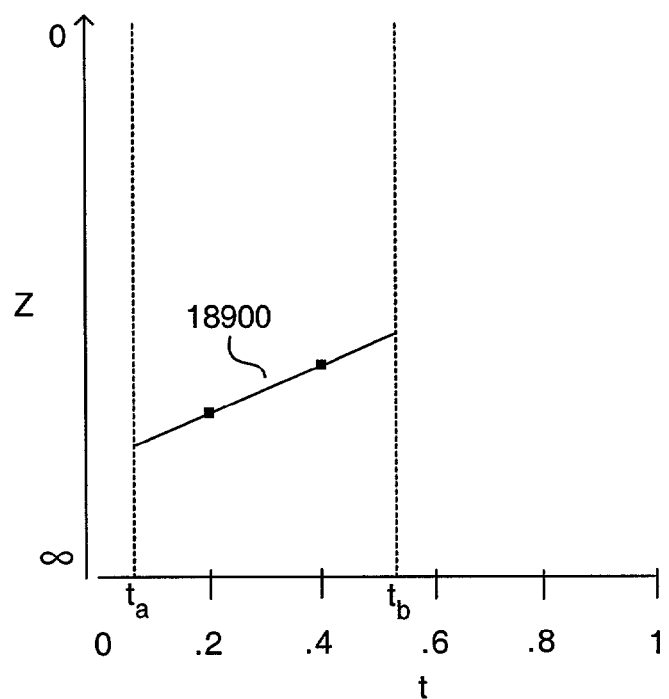
FIG. 18A is a graph showing an example of a segment of a line sample that has been divided into a fixed number of sub-regions.

FIG. 18A shows an example of a segment 18900 of a line sample that has been divided into a fixed number of sub-regions with t ranges [0, 0.2], [0.2, 0.4], [0.4, 0.6], [0.6, 0.8], and [0.8, 1]. The segment 18900 spans the t range from a starting endpoint $t_a$ to an ending endpoint $t_b$ and overlaps the sub-regions with t ranges [0, 0.2], [0.2, 0.4], and [0.4, 0.6]. The fixed starting and ending endpoints of each sub-region of the segment are indicated by black dots.

Figure 18B:
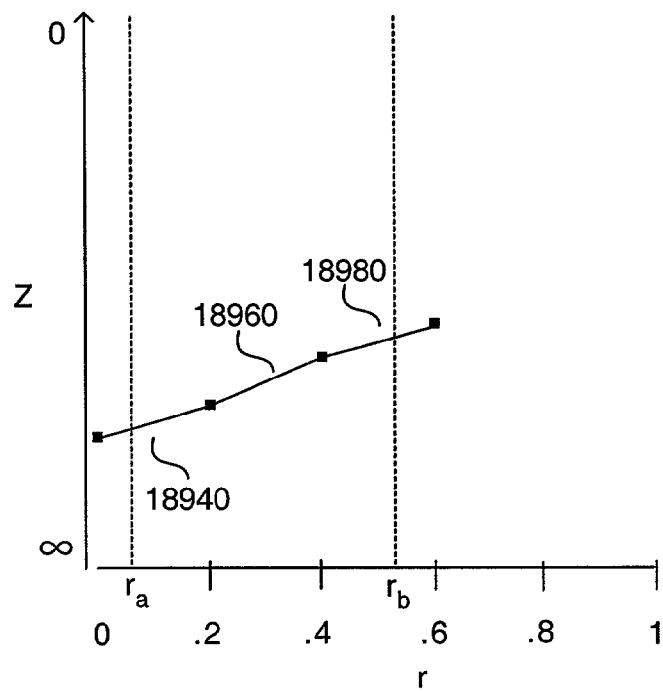
FIG. 18B is a graph showing a group of fixed data sets associated with the segment shown in FIG. 18A.

FIG. 18B shows an example of fixed data sets that may be associated with the segment 18900 of the line sample of FIG. 18A. The fixed data sets have r ranges [0, 0.2], [0.2, 0.4], [0.4, 0.6], [0.6, 0.8], and [0.8, 1] corresponding to the t ranges of the line sample sub-regions. The object parameter values of the segment (18900 of FIG. 18A) of the line sample are stored in a first fixed data set 18940, a second fixed data set 18960, and a third fixed data set 18980 that span the r ranges [0, 0.2], [0.2, 0.4], and [0.4, 0.6], respectively. The fixed starting and ending endpoint references of the fixed data sets are indicated by black dots.

If a segment overlaps a particular sub-region but does not extend to a fixed endpoint of the sub-region, object parameter values at the fixed endpoint of the sub-region are determined for the segment. The object parameter values at the fixed endpoint of the sub-region are preferably determined by copying the object parameter values from the segment endpoint(s) closest to the fixed endpoint(s). In other embodiments, the object parameter values at the fixed endpoint of the sub-region may be determined, for example, by applying linear interpolation using the known object parameter values of the segment. Other interpolation methods may also be used (e.g., quadratic or cubic interpolation) depending on the type of approximation applied to the object parameters (e.g., quadratic or cubic approximation).

After determining the object parameter values of the segment at the fixed endpoints of an overlapped sub-region, the object parameter values are stored at the fixed endpoint references of a fixed data set corresponding to the overlapped sub-region. A fractional overlap value reflecting the proportion of the sub-region overlapped by the segment may also be stored at either fixed endpoint reference of the corresponding fixed data set. For example, the fractional overlap value may be a floating-point number from zero to one.

For example, FIG. 18B shows that the t range of the associated segment (18900 of FIG. 18A) extends only to a corresponding point $r_a$ in the first fixed data set 18940. Therefore, the object parameter values of the segment (18900 of FIG. 18A) have been determined as described above using the known values of the segment. The object parameter values are stored at a fixed starting endpoint reference (at r=0) and a fixed ending endpoint reference (at r=0.2) the first fixed data set 18940. Likewise, the t range of the associated segment (18900 of FIG. 18A) extends only to a corresponding point $r_b$ in the third fixed data set 18980. Therefore, the object parameter values of the segment (18900 of FIG. 18A) have been determined as described above using the known values of the segment. The object parameter values are stored at a fixed starting endpoint reference (at r=0.4) and a fixed ending endpoint reference (at r=0.6) the third fixed data set 18980.

Figure 18C:
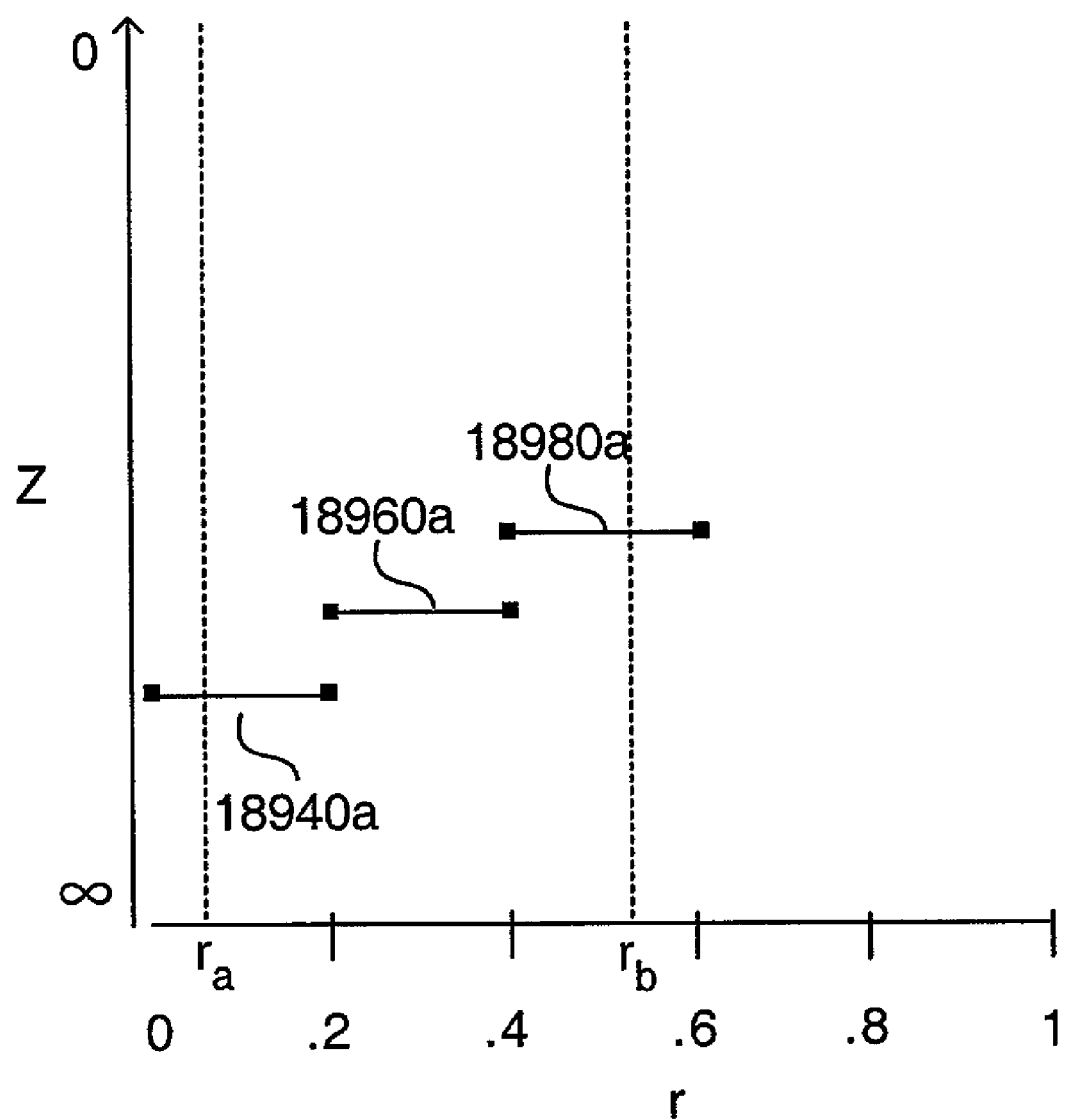
FIG. 18C is a graph showing a group of fixed data sets each storing a constant approximation of the object parameter values of the segment shown in FIG. 18A.

In an alternative embodiment, a constant approximation is applied to the object parameters of a line sample that has been divided into a fixed number of sub-regions. This embodiment may be implemented, for example, by storing a single value for each object parameter at only one of the fixed endpoint references of the fixed data set. The single value that is stored for each object parameter may be determined, for example, by taking the average of the object parameter values at the fixed endpoints of the associated sub-region. As stated above, if the t range of a segment does not extend to a fixed endpoint of an overlapped sub-region, the object parameter value at the fixed endpoint of the overlapped sub-region may be determined, for example, by linear interpolation using known object parameter values of the segment. Alternatively, the single value that is stored may be set to equal the object parameter value at the fixed starting endpoint of the overlapped sub-region or be set to equal the object parameter value at the fixed ending endpoint of the overlapped sub-region. Examples of this embodiment are shown in FIG. 18C where each fixed data set 18940*a*, 18960*a*, 18980*a* stores an object parameter value at only one of the fixed endpoint references (the fixed endpoint references being indicated by black dots).

In additional embodiments, a quadratic or cubic approximation is applied to each object parameter of a line sample that has been divided into a fixed number of sub-regions. These approximations may be implemented, for example, by storing one or more values of an object parameter at each fixed endpoint reference of a fixed data set. The implementations of the quadratic and cubic approximations are similar to the implementations for quadratic and cubic approximations in relation to data sets associated with line samples not divided into sub-regions, as discussed above.

When a new segment is generated and overlaps a particular sub-region, the object parameter values previously stored in the corresponding fixed data set (hereinafter referred to as old object parameter values) may need to be updated by the object parameter values of the new segment (hereinafter referred to as new object parameter values). The old object parameter values are updated based on a comparison of a determining object parameter, such as depth range, of the old object parameter values and the new object parameter values. If depth range is used as the determining object parameter, there are several possible situations and outcomes for updating the old object parameter values of a fixed data set associated with a particular sub-region.

If the depth range of the old object parameter values is less than the depth range of the new object parameter values throughout the associated sub-region, the old object parameter values are retained in the fixed data set and the new object parameter values are discarded. If the depth range of the new object parameter values is less than the depth range of the old object parameter values throughout the associated sub-region, the new object parameter values replace the old object parameter values in the fixed data set.

Figure 19A:
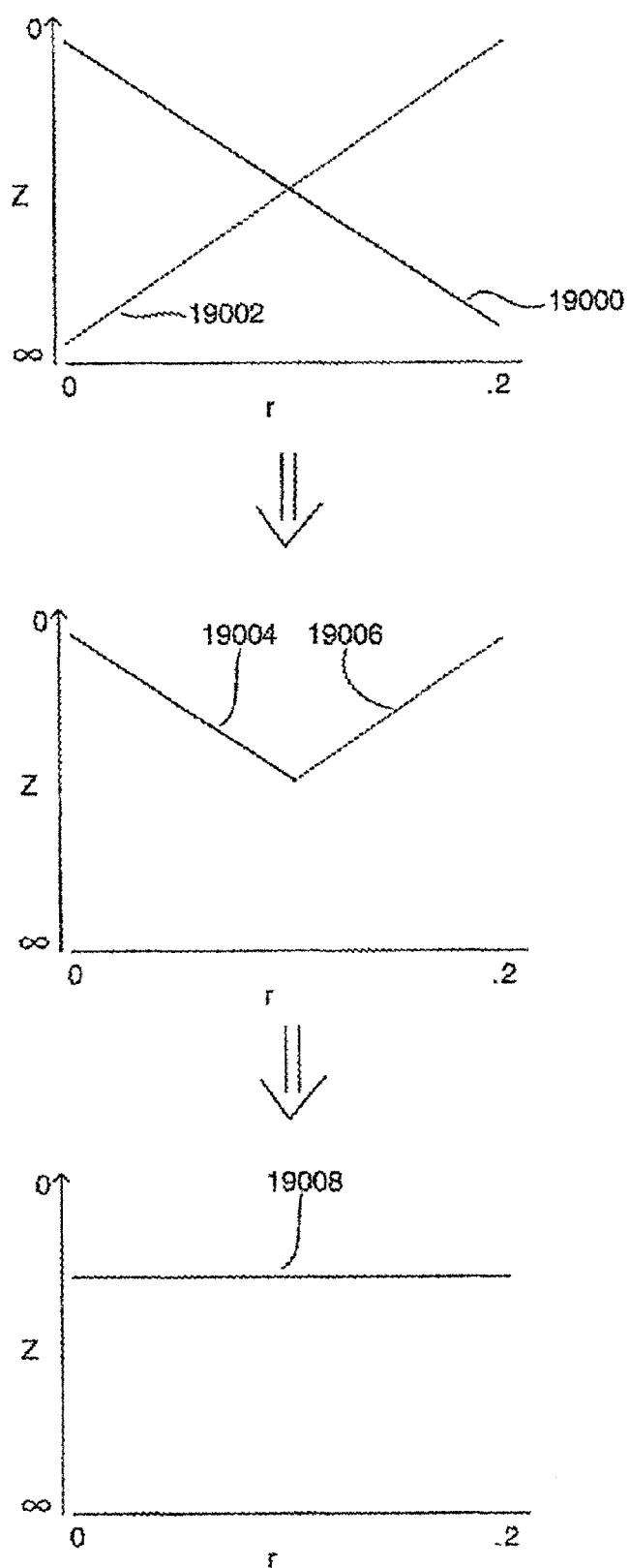
FIG. 19A is a graph showing an example where a linear approximation has been applied to object parameters and a depth range of new object parameter values has intersected a depth range of old object parameter values.

A special situation occurs, however, if the depth range of the new object parameter values intersects the depth range of the old object parameter values within the associated sub-region. In this situation, the outcome depends on the type of approximation applied to the object parameters. FIG. 19A shows an example where a linear approximation has been applied to the object parameters and the depth range of the new object parameter values 19002 (dashed line) has intersected the depth range of the old object parameter values 19000 (solid line) within the sub-region [0, 0.2] (top graph).

In the situation shown in FIG. 19A, a portion of the old object parameter values 19004 containing a depth range that is less than the depth range of the new object parameter values 19002 is determined (middle graph). A portion of the new object parameter values 19006 containing a depth range that is less than the depth range of the old object parameter values 19000 is also determined (middle graph). Modified object parameter values 19008 can then be determined from the two resulting portions 19004, 19006 (bottom graph). The modified object parameter values 19008 can be determined, for example, by a linear-least-squares algorithm or any other algorithm that can calculate a single line that is a linear fit for a given set of lines.

Figure 19B:
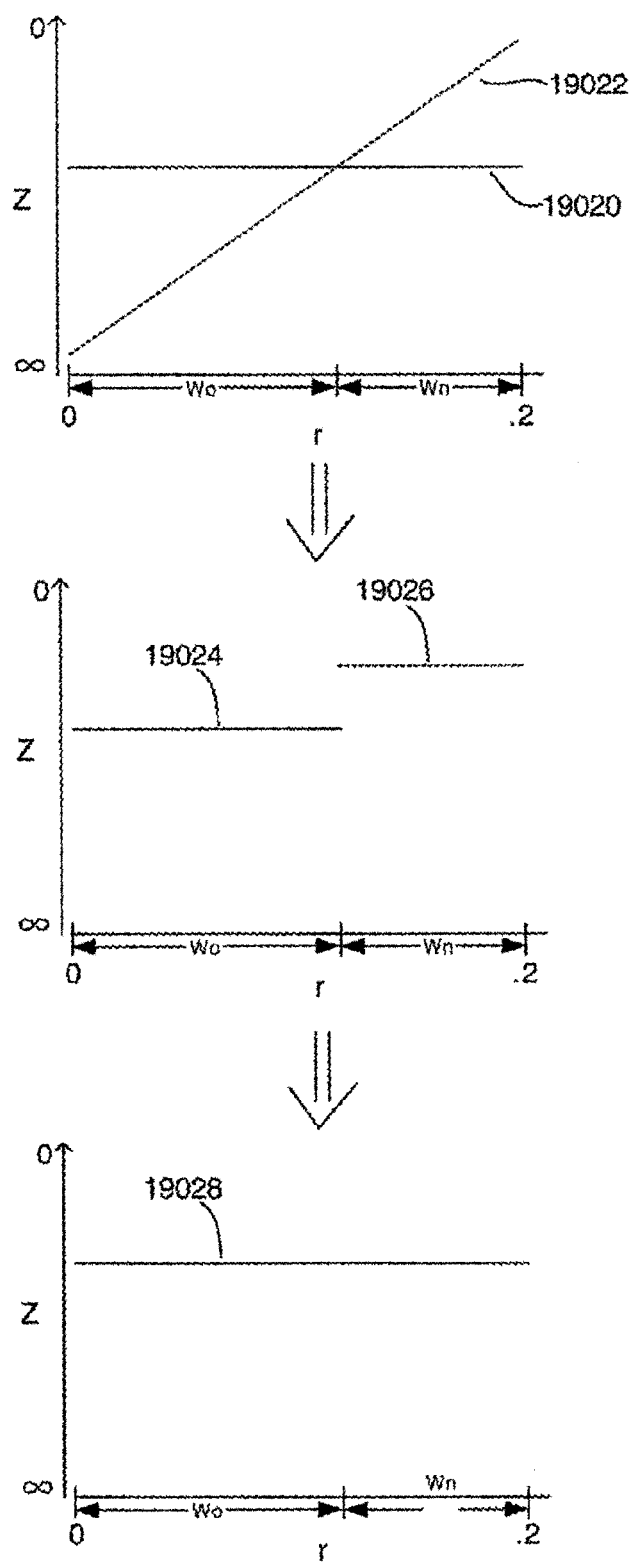
FIG. 19B is a graph showing an example where a constant approximation has been applied to object parameters and a depth range of new object parameter values has intersected a depth range of old object parameter values.

FIG. 19B shows an example where a constant approximation has been applied to the object parameters and the depth range of the new object parameter values 19022 (dashed line) has intersected the depth range of the old object parameter values 19020 (solid line) within the sub-region [0, 0.2] (top graph). Note that a constant approximation has been applied only to the old object parameter values 19020 since the new object parameter values 19022 have not yet been stored in the data structure and are still in linear form.

In this situation, a portion of the old object parameter values 19024 containing a depth range that is less than the depth range of the new object parameter values 19022 is determined (middle graph). The portion of the old object parameter values 19024 has an associated weight value $W_o$ that reflects the proportion of the sub-region [0, 0.2] that the portion 19024 overlaps. A portion of the new object parameter values 19026 containing a depth range that is less than the depth range of the old object parameter values 19020 is also determined (middle graph). The portion of the new object parameter values 19026 has an associated weight value $W_n$ that reflects the proportion of the sub-region [0, 0.2] that the portion 19026 overlaps. For example, the associated weight values, $W_o$ and $W_n$, may be floating-point numbers from zero to one.

Modified object parameter values 19028 may then be determined from the two resulting portions 19024, 19026 (bottom graph). The modified object parameters values 19028 can be determined, for example, by taking a weighted average of the old object parameter values and the new object parameter values using the associated weight values, $W_o$ and $W_n$, respectively.

A special situation also occurs where the old object parameter values have a fractional overlap value of less than one, the new object parameter values also have a fractional overlap value of less than one, and the two fractional overlap values do not sum to one. For example, if the old object parameter values have a fractional overlap value of 0.5 and the new object parameter values have a fractional overlap value of 0.2, the fractional overlap values sum to 0.7.

When this occurs, it is not possible to determine if the segment associated with the new object parameter values overlaps the segment(s) associated with the old object parameter values since the position of a segment within a sub-region is not stored in a corresponding fixed data set. In this situation, it is preferably assumed that the segment associated with the new object parameter values does not overlap the segment(s) associated with the old object parameter values. The new object parameter values may then be combined with the old object parameter values to form a set of intermixed object parameter values. The intermixed object parameter values preferably have a fractional overlap value that is equal to the sum of the fractional overlap values of the new object parameter values and the old object parameter values.

If this assumption (i.e., that the segment associated with the new object parameter values does not overlap the segment(s) associated with the old object parameter values) is not made, it is possible that the segment tree data structure will falsely indicate that it is possible to see objects that are actually occluded. Persons skilled in the art recognize that this error creates more visual artifacts than incorrectly assuming that the segment associated with the new object parameter values does not overlap the segment(s) associated with the old object parameter values. By assuming that the new object parameter and the old object parameters are valid for the greatest possible amount of the sub-region, the impact of an object that is not actually visible is reduced—since the sub-region will be more heavily weighted towards the intermixed object parameter values.

The intermixed object parameter values may be determined, for example, by taking an average of the new object parameter values and old object parameter values at each fixed endpoint of the associated sub-region. Therefore, the intermixed object parameter values at the fixed starting endpoint of the associated sub-region can be determined by taking the average of the new object parameter values and the old object parameter values at the fixed starting endpoint of the associated sub-region. A similar method would apply for determining the intermixed object parameter values at the fixed ending endpoint of the associated sub-region. Recall that if the t range of the new segment does not extend to a fixed endpoint of the associated sub-region, the new object parameter value at the fixed endpoint of the associated sub-region may be determined, for example, by linear interpolation using known object parameter values of the new segment.

Alternatively, the intermixed object parameter values may be determined by taking a weighted average of the new object parameter values and old object parameter values at each fixed endpoint of the associated sub-region. In determining the weighted average values for the intermixed object parameter values, the new object parameter values and the old object parameter values may be weighted by their respective fractional overlap values.

In a further embodiment, the intermixed object parameter value for depth may be set to equal whichever depth value is less between the depth value of the new object parameter values and the depth value of the old object parameter values at each fixed endpoint of the associated sub-region. Therefore, the intermixed object parameter value for depth at the fixed starting endpoint of the associated sub-region may be set to equal whichever depth value is less between the depth value of the new object parameter values and the depth value of the old object parameter values at the fixed starting endpoint of the associated sub-region. A similar method would apply for determining the intermixed object parameter value for depth at the fixed ending endpoint of the associated sub-region.

Fixed Number of Nodes in the Line Tree Data Structure

In an alternative embodiment, the line tree data structure contains a fixed number of nodes. Having a fixed number of nodes in the line tree data structure is also useful when there is a fixed or limited amount of memory for representing the line tree data structure such as in hardware applications implementing a line tree data structure.

If more nodes are required by the line tree data structure as new data sets are generated, adjacent leaf nodes (i.e., leaf nodes with adjacent r ranges) containing old data sets with similar object parameter values may be merged. Adjacent leaf nodes are merged by first determining a particular pair of adjacent leaf nodes to merge. The chosen pair of adjacent leaf nodes are then merged into a single combined leaf node without introducing significant error in the resulting combined object parameter values of the combined leaf node.

To determine which adjacent leaf nodes to merge, a numeric error estimate may be computed for all pairs of adjacent leaf nodes in the line tree data structure. The numeric error estimate reflects the amount of error introduced by merging a particular pair of adjacent leaf nodes into a single combined leaf node. The numeric error estimate may be computed, for example, by determining the maximum deviation or the total deviation of the object parameter values of the combined leaf node from the object parameter values of the original pair of adjacent leaf nodes. Alternatively, any other method of calculating a numeric error estimate may be used.

It should be noted, however, that there is a trade-off between spending valuable processing time in selecting a pair of adjacent leaf nodes to be merged and the reduction in error gained from determining the optimal pair of adjacent leaf nodes to be merged. In some situations, therefore, it may be advantageous to avoid computing a numeric error estimate for all pairs of adjacent leaf nodes in the line tree data structure. As an alternative embodiment, a numeric error estimate may be determined only for a predefined number of adjacent leaf node pairs that have been randomly or pseudo randomly chosen. As a further embodiment, a pair of adjacent leaf nodes may be randomly or pseudo randomly chosen and merged into a single combined leaf node without any determination of a numeric error estimate. By determining a numeric error estimate for a fewer number of adjacent leaf node pairs or by not determining a numeric error estimate for any adjacent leaf node pairs, the processing time in selecting the adjacent leaf node pair to be merged can be greatly reduced. The trade off of such an approach, however, is that the error may be increased. If numeric error estimates have been determined for pairs of adjacent leaf nodes, the pair of adjacent leaf nodes with the lowest numeric error estimate is chosen to be merged into a single combined leaf node.

In yet another embodiment, information about the leaf nodes is separately maintained to assist with the merger selection. In particular, an identifier of the leaf node with the smallest t range is maintained. When a merger is required, this leaf node is selected. Leaf nodes adjacent to this leaf node (when there are two instead of one) are then checked to determine which of the two covers the smallest t range. The selected, adjacent leaf node and the leaf node with the smallest t range are then merged.

Adjacent leaf nodes may be merged by combining the object parameter values of a first adjacent leaf node and a second adjacent leaf node and storing the combined object parameter values into a combined leaf node, wherein the first adjacent leaf node has an r range that is less than the r range of the second adjacent leaf node. In a preferred embodiment, the object parameter values at the starting endpoint reference of the first adjacent leaf node are stored at the starting endpoint reference of the combined leaf node and the object parameter values at the ending endpoint reference of the second adjacent leaf node are stored at the ending endpoint reference of the combined leaf node.

In an alternative embodiment, combined object parameter values of the combined leaf node may be computed by applying a linear-least-squares algorithm to the object parameter values of the first and second adjacent leaf nodes. The linear-least-squares algorithm is applied to determine values for a single line that is a best linear fit for the set of lines given by the values of the first and second adjacent leaf nodes. The object combined parameter values determined by the linear-least-squares algorithm can then be stored at the endpoint references of the combined leaf node.

In a further embodiment, a single combined object parameter value is stored in the combined leaf node for each object parameter. The single combined object parameter value may be computed, for example, by taking the average of four object parameter values of the first and second adjacent leaf nodes, one object parameter value being retrieved at each endpoint reference of the first and second adjacent leaf nodes. In another embodiment, the single combined object parameter value may be computed by taking the weighted average of four object parameter values of the first and second adjacent leaf nodes, one object parameter value being retrieved at each endpoint reference of the first and second adjacent leaf nodes. The weight of an object parameter value may be based on the relative r range length of the adjacent leaf node in which the object parameter value is stored. The resulting combined object parameter value can then be stored at either the starting or ending endpoint reference of the combined leaf node.

Data Sets Associated with Semitransparent Segments

As described in a preferred embodiment above, if a group of data sets associated with a group of opaque segments overlaps the same r range, only one data set in the group is stored in the line tree data structure for the given r range. In an alternative embodiment, the line tree data structure stores more than one data set for a given r range. For example, if a group of data sets associated with a group of semitransparent segments overlaps the same r range, each data set in the group would be stored in the line tree data structure for the given r range. Since a first semitransparent segment placed closer to the predefined viewpoint than a second semitransparent segment would not block the visibility of the second semitransparent segment, it is useful to retain both data sets associated with the semitransparent segments in the line tree data structure.

The data sets associated with the semitransparent segments of a line sample may be maintained in the same line tree data structure used for maintaining the data sets associated with the opaque segments of the line sample. Alternatively, data sets associated with the semitransparent segments may be maintained in a separate line tree data structure or another type of data structure.

In accordance with an alternative embodiment of the present invention, data sets associated with semitransparent segments are not stored in a line tree data structure but in an unordered list, without any structure being imposed on the data sets as they are stored. As such, adding a new data set to the unordered list is very efficient. However, there is a potential loss of memory efficiency in that data sets associated with semitransparent segments that are occluded by newly generated opaque segments are not discarded. Insofar as segments are generally generated in front-to-back order (i.e., from a low depth value to a high depth value), this is less problematic.

In a further embodiment, the data sets associated with semitransparent segments are stored in a segment tree data structure. The line tree data structure can be used as the basic structure for the segment tree data structure. Similar to the line tree data structure, the segment tree data structure stores data sets in leaf nodes. In addition, the other nodes of the segment tree data structure also stores data sets wherein the data sets are stored in the most superordinate node possible. Segment tree data structures are well known in the art and therefore are not described in detail here. A further description of segment tree data structures can be found, for example, in M. de Berg, et al., Computational Geometry: Algorithms and Applications, pages 223–229, Springer, Berlin, 2000, incorporated herein by reference.

A semitransparent segment is determined by the transparency data field (11258 of FIG. 11B) of the associated data set. The transparency data field contains the transparency value of the associated segment. Opaque segments have an associated transparency data field value of zero, or alternatively, have no associated transparency data field at all. Accordingly, a completely transparent segment has an associated transparency data field value of one. Alternatively, the transparency data field (11258 of FIG. 11B) contains the opacity value of the associated segment. The opacity value of a segment is defined as one minus the transparency value of the segment. Therefore, an opaque segment has an opacity value of one and a completely transparent segment has an opacity value of zero.

When a semitransparent segment overlaps the t range of other semitransparent segments, a combined transparency value of the overlapping semitransparent segments may be determined. The combined transparency value may be determined by multiplying the associated transparency values of the overlapping semitransparent segments or by any other appropriate mathematical function. Alternatively, a combined opacity value of the overlapping semitransparent segments can be determined by first determining the combined transparency value and then subtracting the combined transparency value from one. A background on the general processes used in computing opacity and color values for a set of overlapping semitransparent objects can be found, for example, in T. Porter and T. Duff, Compositing Digital Images, Proceedings of SIGGRAPH, 1984, pp. 253–259, incorporated herein by reference.

As more overlapping semitransparent segments are inserted into the segment tree data structure, the combined opacity value of the overlapping semitransparent segments increases. When the combined opacity value becomes equal to or greater than a predefined value (e.g., 0.999), it has reached an opacity threshold. The maximum depth value of the overlapping semitransparent segments at which the opacity threshold is reached is defined as the opacity depth threshold. In a preferred embodiment, it is assumed that segments beyond the opacity depth threshold are occluded by the group of overlapping semitransparent segments and are not visible. In other words, a group of overlapping semitransparent segments with a combined opacity value equal to or greater than the predefined opacity threshold is treated as an opaque segment with a transparency value equal to zero or an opacity value equal to one.

In a preferred embodiment, the nodes of the segment tree data structure stores the r range and depth range spanned by the child nodes of the node as well as a minimum combined opacity value of the overlapping child nodes of the node. Within the r range spanned by a node, there are several sub-areas of overlapping semitransparent segments each with an associated combined opacity value. The associated combined opacity value with the lowest value is stored as the minimum combined opacity value in the node.

If the minimum combined opacity value of a node reaches the predefined opacity threshold, it is assumed that any segments (opaque or semitransparent) with a depth range greater than the maximum depth range of the node are occluded. In a preferred embodiment, if the minimum combined opacity value of a node has reached the predefined opacity threshold, any new data sets with an r range enclosed by the node and with a depth range greater than the maximum depth range of the node are discarded. By discarding old or new data sets associated with segments that are occluded by a group of semitransparent segments considered to be equivalent to an opaque segment (e.g., compacting the segment tree data structure), memory resources can be saved.

In preferred embodiments, the segment tree data structure is compacted each time a segment is added to the tree data structure. Again, compacting includes both removing opaque segments that are hidden by closer opaque segments and also removing segments that are hidden by closer transparent segments with a combined opacity value greater than or equal to the opacity threshold. In other embodiments, the segment tree data structure is not compacted each time a segment is added to the segment tree data structure. These embodiments may include "lazily" updating the minimum combined opacity value stored in non-leaf nodes of the segment tree data structures. In these embodiments, the minimum combined opacity value is updated after a defined number semi-transparent segments are added to the segment tree data structures. After the opacities are updated, the segment tree data structure is compacted.

In alternative embodiments, a segment tree data structure storing semitransparent segments of a line sample is compacted when it can be guaranteed that no opaque or semi-transparent segments will be further generated containing a particular depth range. Under such conditions, the segment tree data structure may be compacted by partially resolving any old data sets within the particular depth range and by replacing the old data sets with a single representative data set.

The present invention can be implemented as a computer program product that includes a computer program mechanism embedded in a computer readable storage medium. For instance, the computer program product could contain the memory elements shown in FIG. 1A. These memory elements may be stored on a CD-ROM, magnetic disk storage product, or any other computer readable data or program storage product. The memory elements in the computer program product may also be distributed electronically, via the Internet or otherwise, by transmission of a computer data signal (in which the software modules are embedded) on a carrier wave.

While the present invention has been described with reference to specific embodiments, the description is illustrative of the invention and is not to be construed as limiting the invention. Various modifications may occur to those skilled in the art without departing from the true spirit and scope of the invention as defined by the appended claims.

What is claimed is:

1. A method for maintaining data sets comprising:
storing the data sets in a line tree data structure wherein the line tree data structure includes a root node and a plurality of subordinate nodes, the plurality of subordinate nodes including a plurality of leaf nodes wherein each leaf node stores a data set, the data set containing object parameter values of an associated segment of a sampling line that analytically represents a part of an object;
retrieving targeted data sets using a data set retrieval procedure wherein the targeted data sets are any data sets stored in the line tree data structure meeting a predefined condition; and
updating the line tree data structure using a data set update procedure upon receiving a new data set not already stored in the line tree data structure.

2. The method of claim 1, wherein:
the data set is defined by a reference range with a starting endpoint reference r0 and an ending endpoint reference r1, the reference range corresponding to a parameterized t range spanned by the associated segment, the t range having a starting t value t0 corresponding to the starting endpoint reference r0 and an ending t value t1 corresponding to the ending endpoint reference r1; and
the targeted data sets are any data sets stored in the line tree data structure containing a reference range overlapping a reference range of the new data set.

3. The method of claim 2, wherein the data set stores data at the starting endpoint reference r0 and the ending endpoint reference r1 including data set values for depth, color, and transparency that correspond to object parameter values for depth, color, and transparency of the associated segment and a data set depth range that corresponds to an object depth range of the associated segment, the data set depth range spanning from the data set value for depth at r0 to the data set value for depth at r1.

4. The method of claim 2, wherein each node of the line tree data structure stores the reference range spanned by all its child nodes.

5. The method of claim 4, wherein the data set retrieval procedure comprises:
setting the root node as a current node;
checking each child node of a current node to determine whether the child node contains any targeted data sets;
retrieving a targeted data set from the child node upon determining that the child node contains a targeted data set and that the child node is a leaf node;
resetting the child node as a current node upon determining that the child node contains a targeted data set and that the child node is not a leaf node; and
repeating the checking, retrieving, and resetting for each child node of a current node until all targeted data sets contained in the line tree data structure are retrieved.

6. The method of claim 3, wherein the data set update procedure comprises:
comparing the data set depth range of a targeted data set and the data set depth range of the new data set;
retaining the targeted data set in the line tree data structure and discarding the new data set upon determining that the data set depth range of the targeted data set is less than the data set depth range of the new data set throughout the reference range of the new data set;
replacing the targeted data set with the new data set in the line tree data structure upon determining that the data set depth range of the new data set is less than the data set depth range of the targeted data set throughout the reference range of the targeted data set; and creating a modified data set or modified data sets to replace the targeted data set in the line tree data structure when the condition for retaining and the condition for replacing are not found.

7. The method of claim 6, wherein the creating comprises:

forming a modified targeted data set by eliminating the portion of the reference range of the targeted data set containing a higher data set depth range than the data set depth range of the new data set in a given reference range;

making a modified new data set by eliminating the portion of the reference range of the new data set that contains a higher data set depth range than the data set depth range of the targeted data set in a given reference range; and calculating data set values for each endpoint reference of the modified targeted data set and the modified new data set and a data set depth range for the modified targeted data set and the modified new data set.

8. The method of claim 7, wherein constant approximation is applied to the object parameter values and the calculating comprises setting data set values for each endpoint reference of the modified targeted data set and the modified new data set to equal the data set values at the endpoint references of the targeted data set and the new data set, respectively.

9. The method of claim 7, wherein linear approximation is applied to the object parameter values and the calculating comprises computing the data set values at each endpoint reference of the modified targeted data set and the modified new data set using linear interpolation.

10. The method of claim 7, wherein quadratic approximation is applied to the object parameter values and the calculating comprises computing the data set values at each endpoint reference of the modified targeted data set and the modified new data set using quadratic interpolation.

11. The method of claim 7, wherein cubic approximation is applied to the object parameter values and the calculating comprises computing the data set values at each endpoint reference of the modified targeted data set and the modified new data set using cubic interpolation.

12. The method of claim 3, further comprising:

substituting a series of targeted data sets having a contiguous series of reference ranges with a single new data set in the line tree data structure upon detecting that the new data set has a lower data set depth range than the series of the targeted data sets throughout the contiguous series of reference ranges.

13. The method of claim 3, wherein each node of the line tree data structure stores the data set depth range spanned by all its child nodes.

14. The method of claim 13, wherein the data set retrieval procedure comprises:

setting the root node as a current node;

checking the child node to determine whether the child node contains any targeted data sets;

comparing the data set depth range of a child node of the current node to the data set depth range of the new data set;

ending processing of the child node upon determining that the maximum data set value for depth of the child node is less than the minimum data set value for depth of the new data set;

retrieving a targeted data set from the child node upon determining that the child node contains a targeted data set and that the child node is a leaf node;

resetting the child node as a current node upon determining that the child node contains a targeted data set and that the child node is not a leaf node; and repeating the comparing, ending, checking, retrieving, and resetting for each child node of a current node until all targeted data sets contained in the line tree data structure are retrieved.

15. The method of claim 13, wherein the data set retrieval procedure comprises:

setting the root node as a current node;

checking the child node to determine whether the child node contains any targeted data sets;

comparing the data set depth range of a child node of the current node to the data set depth range of the new data set;

collecting all targeted data sets of the child node upon determining that the maximum data set value for depth of the new data set is less than the minimum data set value for depth of the child node;

retrieving a targeted data set from the child node upon determining that the child node contains a targeted data set and that the child node is a leaf node;

resetting the child node as a current node upon determining that the child node contains a targeted data set and that the child node is not a leaf node; and repeating the comparing, ending, checking, retrieving, and resetting for each child node of a current node until all targeted data sets contained in the line tree data structure are retrieved.

16. The method of claim 3, wherein the reference range of each data set is uniform in length and the line sample is divided into a fixed number of line sample sub-regions, each line sample sub-region having a fixed starting endpoint and a fixed ending endpoint.

17. The method of claim 16, wherein a data set for a particular line sample sub-region contains data set values at a fixed starting endpoint reference and a fixed ending endpoint reference that correspond to the object parameter values at the fixed starting endpoint and the fixed ending endpoint, respectively, of the particular line sample sub-region.

18. The method of claim 17, wherein the data set contains a fractional overlap value reflecting the proportion of a line sample sub-region that is overlapped by a segment.

19. The method of claim 17, wherein constant approximation is applied to the object parameter values and data set values are contained at only one fixed endpoint reference of the data set.

20. The method of claim 19, wherein the data set values are determined by taking the average of the object parameter values at the fixed starting endpoint and the fixed ending endpoint of the particular line sample sub-region.

21. The method of claim 17, wherein linear approximation is applied to the object parameter values and the data set values at the fixed starting endpoint reference and the fixed ending endpoint reference are computed using linear interpolation.

22. The method of claim 17, wherein quadratic approximation is applied to the object parameter values and the data set values at the fixed starting endpoint reference and the fixed ending endpoint reference are computed using quadratic interpolation.

23. The method of claim 17, wherein cubic approximation is applied to the object parameter values and the data set values at the fixed starting endpoint reference and the fixed ending endpoint reference are computed using cubic interpolation.

* * * * *